(12) United States Patent
Parsons et al.

(10) Patent No.: US 7,396,000 B2
(45) Date of Patent: Jul. 8, 2008

(54) PASSIVE SENSORS FOR AUTOMATIC FAUCETS AND BATHROOM FLUSHERS

(75) Inventors: Natan E. Parsons, Brookline, MA (US); Fatih Guler, Winchester, MA (US); Kay Herbert, Winthrop, MA (US); Xiaoxiong Mo, Lexington, MA (US); Haiou Wu, West Roxbury, MA (US); Yue Zhang, Nashua, NH (US)

(73) Assignee: Arichell Technologies Inc, W. Newton, MA (US)

( * ) Notice: Subject to any disclaimer, the term of this patent is extended or adjusted under 35 U.S.C. 154(b) by 208 days.

(21) Appl. No.: 11/145,524

(22) Filed: Jun. 3, 2005

(65) Prior Publication Data

US 2006/0289819 A1  Dec. 28, 2006

Related U.S. Application Data

(63) Continuation of application No. PCT/US03/038730, filed on Dec. 4, 2003, which is a continuation-in-part of application No. 10/421,359, filed on Apr. 23, 2003, now Pat. No. 6,948,697, and a continuation-in-part of application No. PCT/US02/41576, filed on Dec. 26, 2002, and a continuation-in-part of application No. PCT/US02/38757, filed on Dec. 4, 2002, and a continuation-in-part of application No. PCT/US02/38758, filed on Dec. 4, 2002, which is a continuation of application No. 10/011,423, filed on Dec. 4, 2001, now Pat. No. 6,619,320, which is a continuation of application No. 10/012,252, filed on Dec. 4, 2001, now Pat. No. 6,691,979, and a continuation of application No. 10/012,226, filed on Dec. 4, 2001, now Pat. No. 6,619,614.

(60) Provisional application No. 60/513,722, filed on Oct. 22, 2003, provisional application No. 60/391,282, filed on Jun. 24, 2002, provisional application No. 60/424,378, filed on Nov. 6, 2002, provisional application No. 60/362,166, filed on Mar. 5, 2002, provisional application No. 60/343,618, filed on Dec. 26, 2001.

(51) Int. Cl.
*F16K 31/02* (2006.01)
(52) U.S. Cl. .......................... 251/129.04; 4/623; 4/304
(58) Field of Classification Search ............ 251/129.04; 4/623, 302, 304, 313, DIG. 3
See application file for complete search history.

(56) References Cited

U.S. PATENT DOCUMENTS 207,482 A  8/1878  Blessing ..................... 137/188

(Continued)

FOREIGN PATENT DOCUMENTS

DE         29717352         1/1998

(Continued)

OTHER PUBLICATIONS

International Search Report issued in PCT Application PCT/US03/41303 on May 4, 2004 (5 pages).

(Continued)

*Primary Examiner*—John K. Fristoe, Jr.
(74) *Attorney, Agent, or Firm*—Ivan David Zitkovsky

(57) ABSTRACT

The present invention is directed to novel optical sensors and novel methods for sensing optical radiation. The novel optical sensors and the novel optical sensing methods are used, for example, for controlling the operation of automatic faucets and flushers. The novel sensors and flow controllers (including control electronics and valves) require only small amounts of electrical power for sensing users of bathroom facilities, and thus enable battery operation for many years. A passive optical sensor includes a light detector sensitive to ambient (room) light for controlling the operation of automatic faucets or automatic bathroom flushers.

28 Claims, 44 Drawing Sheets

U.S. PATENT DOCUMENTS

| | | | |
|---|---|---|---|
| 1,501,331 A | 7/1924 | Gulick | 137/245 |
| 2,619,122 A | 11/1952 | Hunter | 251/120 |
| 2,619,986 A | 12/1952 | Goepfrich et al. | 251/129.17 |
| 2,685,301 A | 8/1954 | Dreier | 137/386 |
| 2,827,073 A | 3/1958 | Owens | 137/426 |
| 2,842,400 A | 7/1958 | Booth et al. | 239/569 |
| 2,877,791 A | 3/1959 | Rich | 137/487 |
| 2,923,314 A | 2/1960 | Badger, Jr. et al. | 137/414 |
| 2,986,155 A | 5/1961 | Doyle | 137/218 |
| 2,999,191 A | 9/1961 | Muradian et al. | 361/195 |
| 3,019,453 A | 2/1962 | Radcliffe | 4/249 |
| 3,034,151 A | 5/1962 | Filliung | 4/249 |
| 3,056,143 A | 10/1962 | Foster | 4/249 |
| 3,058,485 A | 10/1962 | McQueen | 137/403 |
| 3,098,635 A | 7/1963 | Delaporte et al. | 251/54 |
| 3,166,291 A | 1/1965 | Specht | 251/285 |
| 3,242,940 A | 3/1966 | Sirotek | 137/218 |
| 3,254,664 A | 6/1966 | Delaney et al. | 137/244 |
| 3,318,565 A | 5/1967 | Cutler | 251/45 |
| 3,369,205 A | 2/1968 | Hamrick | 335/177 |
| 3,373,449 A | 3/1968 | Rusnok | 4/305 |
| 3,386,462 A | 6/1968 | Walters | 137/244 |
| 3,400,731 A | 9/1968 | McCormack | 137/245 |
| 3,495,803 A | 2/1970 | Schoepe et al. | 251/25 |
| 3,495,804 A | 2/1970 | Muller et al. | 251/36 |
| 3,559,675 A | 2/1971 | Schoepe et al. | 137/436 |
| 3,606,241 A | 9/1971 | Bornholdt | 251/52 |
| 3,693,649 A | 9/1972 | Gordon et al. | 137/414 |
| 3,740,019 A | 6/1973 | Kessell et al. | 251/129.17 |
| 3,763,881 A | 10/1973 | Jones | 137/414 |
| 3,778,023 A | 12/1973 | Billeter | 251/30.01 |
| 3,791,619 A | 2/1974 | Pett | 251/45 |
| 3,802,462 A | 4/1974 | Trösch | 137/556 |
| 3,812,398 A | 5/1974 | Kozel et al. | 251/331 |
| 3,821,967 A | 7/1974 | Sturman | 137/624.15 |
| 3,842,857 A | 10/1974 | McCornack | 137/242 |
| 3,864,567 A | 2/1975 | Bez | 250/338.1 |
| 3,895,645 A | 7/1975 | Johnson | 137/403 |
| 4,010,769 A | 3/1977 | De Lorenzo et al. | 137/312 |
| 4,011,553 A | 3/1977 | Delgado | 4/314 |
| 4,065,095 A | 12/1977 | Johnson | 251/118 |
| 4,097,786 A | 6/1978 | Lund | 318/282 |
| 4,105,186 A | 8/1978 | Eby | 251/35 |
| 4,114,647 A | 9/1978 | Sturman et al. | 137/624.2 |
| 4,135,696 A | 1/1979 | Saarem et al. | 251/30.02 |
| 4,141,091 A | 2/1979 | Pulvari | 4/313 |
| 4,206,901 A | 6/1980 | Williams | 251/35 |
| 4,231,287 A | 11/1980 | Smiley | 92/94 |
| 4,272,052 A | 6/1981 | Gidner | 251/29 |
| 4,280,680 A | 7/1981 | Payne | 251/175 |
| 4,295,485 A | 10/1981 | Waterfield | 137/74 |
| 4,295,631 A | 10/1981 | Allen | 251/30.03 |
| 4,295,653 A | 10/1981 | Coles | 277/320 |
| 4,304,391 A | 12/1981 | Yamaguchi | 251/129.05 |
| 4,309,781 A | 1/1982 | Lissau | 4/304 |
| 4,383,234 A | 5/1983 | Yatsushiro et al. | 335/253 |
| 4,505,451 A | 3/1985 | Jonas | 251/285 |
| 4,570,272 A | 2/1986 | Kawaguchi et al. | 4/302 |
| 4,604,735 A | 8/1986 | Parsons | 367/93 |
| 4,609,178 A | 9/1986 | Baumann | 251/229 |
| 4,611,356 A | 9/1986 | Lin | 4/301 |
| 4,671,485 A | 6/1987 | Saarem | 251/60 X |
| 4,672,206 A | 6/1987 | Suzuki et al. | 250/347 |
| 4,709,427 A | 12/1987 | Laverty, Jr. | 4/427 |
| 4,729,342 A | 3/1988 | Loctin | 119/163 |
| 4,756,031 A | 7/1988 | Barrett | 4/407 |
| 4,787,411 A | 11/1988 | Moldenhauer | 137/244 |
| 4,793,588 A | 12/1988 | Laverty, Jr. | 251/30.03 |
| 4,795,908 A | 1/1989 | Morimoto et al. | 250/353 |
| 4,796,658 A | 1/1989 | Caple | 137/312 |
| 4,796,662 A | 1/1989 | Hoffmann et al. | 137/596.16 |
| 4,805,247 A | 2/1989 | Laverty, Jr. | 4/304 |
| 4,823,414 A | 4/1989 | Piersimoni et al. | 4/623 |
| 4,823,825 A | 4/1989 | Buchl | 137/1 |
| 4,826,132 A | 5/1989 | Moldenhauer | 251/129.17 |
| 4,832,263 A | 5/1989 | Poynor | 239/197 |
| 4,832,582 A | 5/1989 | Buffet | 417/413.1 |
| 4,839,039 A | 6/1989 | Parsons et al. | 210/143 |
| 4,891,864 A | 1/1990 | Laverty, Jr. | 91/399 |
| 4,893,645 A | 1/1990 | Augustinas et al. | 137/315.03 |
| 4,894,698 A | 1/1990 | Hijikigawa et al. | 257/254 |
| 4,894,874 A | 1/1990 | Wilson | 4/623 |
| 4,910,487 A | 3/1990 | Kleinhappl | 335/234 |
| 4,911,401 A | 3/1990 | Holcomb et al. | 251/30.03 |
| 4,921,208 A | 5/1990 | LaMarca | 251/30.04 |
| 4,921,211 A | 5/1990 | Novak et al. | 251/129.04 |
| 4,932,430 A | 6/1990 | Fernstrom | 137/85 |
| 4,941,215 A | 7/1990 | Liu | 4/406 |
| 4,941,219 A | 7/1990 | Van Marcke | 4/623 |
| 4,944,487 A | 7/1990 | Holtermann | 251/129.17 |
| 4,977,929 A | 12/1990 | Chinnock et al. | 137/863 |
| 4,988,074 A | 1/1991 | Najmolhoda | 251/129.08 |
| 4,998,673 A | 3/1991 | Pilolla | 239/67 |
| 5,025,516 A | 6/1991 | Wilson | 4/623 |
| 5,027,850 A | 7/1991 | Peterson et al. | 137/245 |
| 5,032,812 A | 7/1991 | Banick et al. | 335/17 |
| 5,036,553 A | 8/1991 | Sanderson | 4/313 |
| 5,074,520 A | 12/1991 | Lee et al. | 251/40 |
| 5,086,526 A | 2/1992 | Van Marcke | 4/623 |
| 5,109,886 A | 5/1992 | Takata et al. | 137/596.17 |
| 5,125,621 A | 6/1992 | Parsons et al. | 251/30.03 |
| 5,127,625 A | 7/1992 | Kleinhappl | 251/129.17 |
| 5,133,987 A * | 7/1992 | Spence et al. | 427/581 |
| 5,169,118 A | 12/1992 | Whiteside | 251/30.03 |
| 5,188,337 A | 2/1993 | Mertens et al. | 251/129.17 |
| 5,195,720 A | 3/1993 | Nortier et al. | 251/129.04 |
| 5,213,303 A | 5/1993 | Walker | 251/30.02 |
| 5,213,305 A | 5/1993 | Whiteside et al. | 251/40 |
| 5,224,685 A | 7/1993 | Chiang et al. | 251/129.04 |
| 5,232,194 A | 8/1993 | Saadi et al. | 251/40 |
| 5,244,179 A | 9/1993 | Wilson | 251/30.03 |
| 5,251,188 A | 10/1993 | Parsons et al. | 367/140 |
| 5,265,594 A | 11/1993 | Olsson et al. | 128/204.18 |
| 5,265,843 A | 11/1993 | Kleinhappl | 251/129.17 |
| 5,295,655 A | 3/1994 | Wilson et al. | 251/40 |
| 5,313,673 A | 5/1994 | Saadi et al. | 4/313 |
| 5,315,719 A | 5/1994 | Tsutsui et al. | 4/300 |
| 5,335,694 A | 8/1994 | Whiteside | 137/625.37 |
| 5,375,811 A | 12/1994 | Reinicke | 251/129.16 |
| D354,113 S | 1/1995 | Nortier et al. | D23/233 |
| D355,478 S | 2/1995 | Allen et al. | D23/249 |
| D357,976 S | 5/1995 | Allen et al. | D23/249 |
| 5,412,816 A | 5/1995 | Paterson et al. | 4/623 |
| 5,431,181 A | 7/1995 | Saadi et al. | 137/15.11 |
| 5,433,245 A | 7/1995 | Prather et al. | 137/554 |
| 5,456,279 A | 10/1995 | Parsons et al. | 137/245 |
| 5,474,303 A | 12/1995 | Coles | 277/317 |
| 5,481,187 A | 1/1996 | Marcott et al. | 324/207.16 |
| 5,508,510 A | 4/1996 | Laverty et al. | 250/221 |
| 5,548,119 A | 8/1996 | Nortier | 4/623 |
| 5,555,912 A | 9/1996 | Saadi et al. | 137/801 |
| 5,566,702 A | 10/1996 | Philipp | 137/1 |
| 5,574,617 A | 11/1996 | Shimanuki et al. | 361/154 |
| 5,583,434 A | 12/1996 | Moyers et al. | 324/207.16 |
| 5,584,465 A | 12/1996 | Ochsenreiter | 251/65 |
| 5,586,746 A | 12/1996 | Humpert et al. | 4/623 |
| 5,600,237 A | 2/1997 | Nippert | 324/207.16 |
| 5,636,601 A | 6/1997 | Moriya et al. | 123/90.11 |
| 5,651,384 A | 7/1997 | Rudrich | 137/1 |
| 5,668,366 A | 9/1997 | Mauerhofer | 250/221 |
| 5,680,879 A | 10/1997 | Sheih et al. | 137/240 |
| 5,708,355 A | 1/1998 | Schrey | 323/282 |
| 5,709,245 A | 1/1998 | Miller | 137/625.64 |
| 5,716,038 A | 2/1998 | Scarffe | 251/30.03 |

| | | | |
|---|---|---|---|
| 5,747,684 A | 5/1998 | Pace et al. | 73/119 A |
| 5,749,521 A | 5/1998 | Lattery | 239/64 |
| D396,090 S | 7/1998 | Marcichow et al. | D23/233 |
| 5,780,854 A | 7/1998 | Lin | 250/347 |
| 5,787,915 A | 8/1998 | Byers et al. | 137/1 |
| 5,787,924 A | 8/1998 | Cewers et al. | 137/487.5 |
| 5,797,360 A | 8/1998 | Pischinger et al. | 123/90.11 |
| 5,804,962 A | 9/1998 | Kather et al. | 324/207.16 |
| 5,815,362 A | 9/1998 | Kahr et al. | 361/153 |
| 5,819,336 A | 10/1998 | Gilliam et al. | 4/623 |
| 5,855,356 A | 1/1999 | Fait | 251/129.04 |
| 5,881,993 A | 3/1999 | Wilson et al. | 251/40 |
| 5,887,848 A | 3/1999 | Wilson | 251/40 |
| 5,901,384 A | 5/1999 | Sim | 4/302 |
| 5,905,625 A | 5/1999 | Schebitz | 361/154 |
| 5,915,417 A * | 6/1999 | Diaz et al. | 137/624.11 |
| 5,918,855 A | 7/1999 | Hamanaka et al. | 251/129.04 |
| 5,927,603 A | 7/1999 | McNabb | 239/63 |
| 5,941,505 A | 8/1999 | Nagel | 251/335.2 |
| 5,943,712 A | 8/1999 | Van Marcke | 4/623 |
| 5,950,983 A | 9/1999 | Jahrling | 4/313 |
| 5,964,192 A | 10/1999 | Ishii | 123/90.11 |
| 5,966,076 A | 10/1999 | Cantrell | 251/262 |
| 5,967,182 A | 10/1999 | Wilson | 137/544 |
| 5,979,500 A | 11/1999 | Jahrling et al. | 137/624.12 |
| 5,984,262 A * | 11/1999 | Parsons et al. | 251/129.04 |
| 5,996,965 A | 12/1999 | Eichholz et al. | 251/30.05 |
| 6,000,674 A | 12/1999 | Cheng | 251/26 |
| 6,024,059 A | 2/2000 | Kamimaru et al. | 123/90.11 |
| 6,044,814 A | 4/2000 | Fuwa | 123/90.11 |
| 6,056,261 A | 5/2000 | Aparicio et al. | 251/129.03 |
| 6,065,735 A | 5/2000 | Clark | 251/292 |
| 6,127,671 A | 10/2000 | Parsons et al. | 250/221 |
| 6,155,231 A | 12/2000 | Adachi et al. | 123/399 |
| 6,158,715 A | 12/2000 | Kirschbaum | 251/129.06 |
| 6,161,726 A | 12/2000 | Parsons et al. | 222/52 |
| 6,182,689 B1 | 2/2001 | Lauer et al. | 137/550 |
| 6,202,980 B1 | 3/2001 | Vincent et al. | 251/129.04 |
| 6,212,697 B1 | 4/2001 | Parsons et al. | 4/302 |
| 6,250,601 B1 * | 6/2001 | Kolar et al. | 251/129.04 |
| 6,932,316 B2 | 8/2005 | Herbert et al. | 251/30.02 |
| 6,948,697 B2 | 9/2005 | Herbert et al. | 251/129.04 |

FOREIGN PATENT DOCUMENTS

| | | |
|---|---|---|
| EP | 0337367 | 10/1989 |
| WO | WO85/05648 | 12/1985 |

OTHER PUBLICATIONS

International Search Report issued in PCT Application PCT/US 03/38730 on May 12, 2004 (6 pages).

International Search Report issued in PCT Application PCT/US 03/20117 on Dec. 18, 2003.

* cited by examiner

PASSIVE SENSORS FOR AUTOMATIC FAUCETS AND BATHROOM FLUSHERS

This application is a continuation of PCT Application PCT/US03/038730 filed Dec. 4, 2003, entitled "Passive Sensors for Automatic Faucets and Bathroom Flushers" which claims priority from U.S. Provisional Application Ser. No. 60/513,722, filed on Oct. 22, 2003 and entitled "Automatic Faucets with Novel Flow Control Sensors." The PCT Application PCT/US03/038730 is also continuation-in-part of PCT Application Serial No. PCT/US02/38757, filed on Dec. 4, 2002 and entitled "Electronic Faucets for Long Term Operation," and continuation-in-part of PCT Application Serial No. PCT/US02/38758, filed on Dec. 4, 2002 and entitled "Automatic Bathroom Flushers," and a continuation-in-part of PCT Application Serial No. PCT/US02/41576, filed on Dec. 26, 2002 and entitled "Automatic Bathroom Flushers." This application is also a continuation-in-part of U.S. application Ser. No. 10/421,359, filed on Apr. 23, 2003 now U.S. Pat. No. 6,948,697, entitled "Apparatus and Method for Controlling Fluid Flow." The above-cited applications are incorporated by reference.

The present invention is directed to novel optical sensors. The present invention is, more specifically, directed to novel optical sensors for controlling operation of automatic faucets and bathroom flushers, and in particular, to novel flow control sensors for providing control signals to electronics used in such faucets and flushers.

BACKGROUND OF THE INVENTION

Automatic faucets and bathroom flushers have been used for many years. An automatic faucet typically includes an optical or other sensor that detects the presence of an object, and an automatic valve that turns water on and off, based on a signal from the sensor. An automatic faucet may include a mixing valve connected to a source of hot and cold water for providing a proper mixing ratio of the delivered hot and cold water after water actuation. The use of automatic faucets conserves water and promotes hand washing, and thus good hygiene. Similarly, automatic bathroom flushers include a sensor and a flush valve connected to a source of water for flushing a toilet or urinal after actuation. The use of automatic bathroom flushers generally improves cleanliness in public facilities.

In an automatic faucet, an optical or other sensor provides a control signal and a controller that, upon detection of an object located within a target region, provides a signal to open water flow. In an automatic bathroom flusher, an optical or other sensor provides a control signal to a controller after a user leaves the target region. Such systems work best if the object sensor is reasonably discriminating. An automatic faucet should respond to a user's hands, for instance, it should not respond to the sink at which the faucet is mounted, or to a paper towel thrown in the sink. Among the ways of making the system discriminate between the two it has been known to limit the target region in such a manner as to exclude the sink's location. However, a coat or another object can still provide a false trigger to the faucet. Similarly, this could happen to automatic flushers due to a movement of bathroom doors, or something similar.

An optical sensor includes a light source (usually an infrared emitter) and a light detector sensitive to the IR wavelength of the light source. For faucets, the emitter and the detector (i.e., a receiver) can be mounted on the faucet spout near its outlet, or near the base of the spout. For flushers, the emitter and the detector may be mounted on the flusher body or on a bathroom wall. Alternatively, only optical lenses (instead of the emitter and the receiver) can be mounted on these elements. The lenses are coupled to one or several optical fibers for delivering light from the light source and to the light detector. The optical fiber delivers light to and from the emitter and the receiver mounted below the faucet.

In the optical sensor, the emitter power and/or the receiver sensitivity is limited to restrict the sensor's range to eliminate reflections from the sink, or from the bathroom walls or other installed objects. Specifically, the emitting beam should project on a valid target, normally clothing, or skin of human hands, and then a reflected beam is detected by the receiver. This kind of sensor relies on the reflectivity of a target's surface, and its emitting/receiving capabilities. Frequently, problems arise due to highly reflective doors and walls, mirrors, highly reflective sinks, the shape of different sinks, water in the sink, the colors and rough/shiny surfaces of fabrics, and moving users who are walking by but not using the facility. Mirrors, doors, walls, and sinks are not valid targets, although they may reflect more energy back to the receiver than rough surfaces at the right angle incidence. The reflection of valid targets such as various fabrics varies with their colors and the surface finish. Some kinds of fabrics absorb and scatter too much energy of the incident beam, so that less of a reflection is sent back to the receiver.

A large number of optical or other sensors are powered by a battery. Depending on the design, the emitter (or the receiver) may consume a large amount of power and thus deplete the battery over time (or require large batteries). The cost of battery replacement involves not only the cost of batteries, but more importantly the labor cost, which may be relatively high for skilled personnel.

There is still a need for an optical sensor for use with automatic faucets or automatic bathroom flushers that can operate for a long period of time without replacing the standard batteries. There is still a need for reliable sensors for use with automatic faucets or automatic bathroom flushers.

SUMMARY OF THE INVENTION

The present invention is directed to novel optical sensors and novel methods for sensing optical radiation. The novel optical sensors and the novel optical sensing methods are used, for example, for controlling the operation of automatic faucets and flushers. The novel sensors and flow controllers (including control electronics and valves) require only small amounts of electrical power for sensing users of bathroom facilities, and thus enable battery operation for many years. A passive optical sensor includes a light detector sensitive to ambient (room) light for controlling the operation of automatic faucets or automatic bathroom flushers.

According to one aspect, an optical sensor for controlling a valve of an electronic faucet or bathroom flusher includes an optical element located at an optical input port and arranged to partially define a detection field. Theoptical sensor also includes a ligh detector and a control circuit. The light detector is optically coupled to the optical element and the input port, wherein the light detector is constructed to detect ambient light. The control circuit is constructed for controlling opening and closing of a flow valve. The control circuit is also constructed to receive signal from the light detector corresponding to the detected light.

The control circuit is constructed to sample periodically the detector. The control circuit is constructed to sample periodically the detector based on the amount of previously detected light. The control circuit is constructed to determine the opening and closing of the flow valve based on a background level of the ambient light and a present level of the ambient light. The control circuit is constructed to open and close the flow valve based on first detecting arrival of a user and then detecting departure of the user. Alternatively, the control circuit is constructed to open and close the flow valve based on detecting presence of a user.

The optical element includes an optical fiber, a lens, a pinhole, a slit or an optical filter. The optical input port is located inside an aerator of a faucet or next to an aerator of the faucet.

According to another aspect, an optical sensor for an electronic faucet includes an optical input port, an optical detector, and a control circuit. The optical input port is arranged to receive light. The optical detector is optically coupled to the input port and constructed to detect the received light. The control circuit controls opening and closing of a faucet valve, or a bathroom flusher valve Preferred embodiments of this aspect includes one or more of the following features: The control circuit is constructed to sample periodically the detector based on the amount of light detected. The control circuit is constructed to adjust a sample period based on the detected amount of light after determining whether a facility is in use. The detector is optically coupled to the input port using an optical fiber. The input port may be located in an aerator of the electronic faucet. The system includes batteries for powering the electronic faucet.

DETAILED DESCRIPTION OF ILLUSTRATIVE EMBODIMENTS

Figure 1:
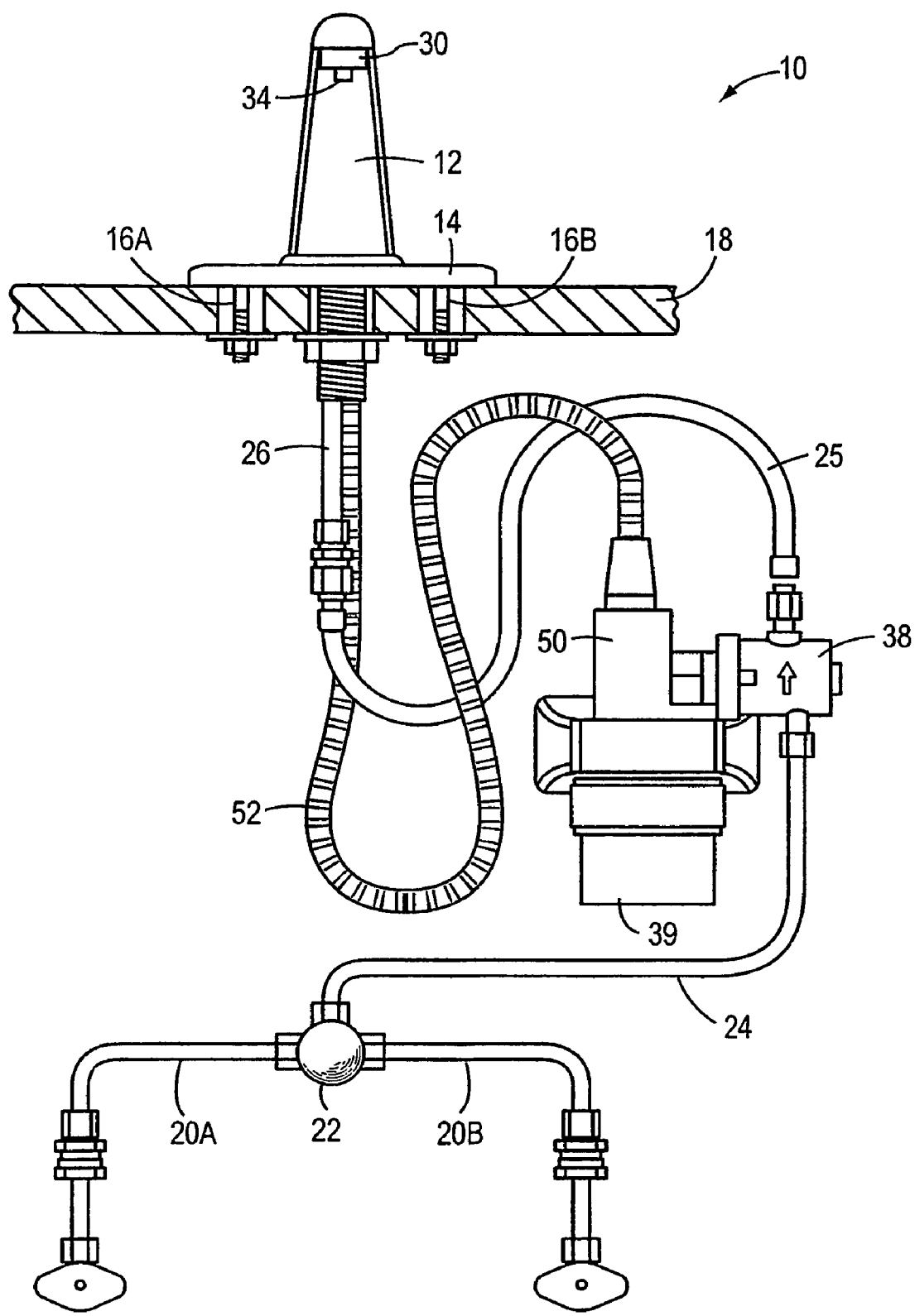
FIG. 1 is a schematic view of an automatic faucet system including a control circuit, a valve and a passive optical sensor for controlling water flow.

FIG. 1 shows an automatic faucet system 10 controlled by a sensor providing signals to a control circuit constructed and arranged to control operation of an automatic valve. The automatic valve, in turn, controls the flow of hot and cold water before or after mixing.

Automatic faucet system 10 includes a faucet body 12 and an aerator 30, including a sensor port 34. Automatic faucet system 10 also includes a faucet base 14 and screws 16A and 16B for attaching the faucet to a deck 18. A cold water pipe 20A and a hot water pipe 20B are connected to a mixing valve 22 providing a mixing ratio of hot and cold water (which ratio can be changed depending on the desired water temperature). Water conduit 24 connects mixing valve 22 to a solenoid valve 38. A flow control valve 38 controls water flow between water conduit 24 and a water conduit 25. Water conduit 25 connects valve 38 to a water conduit 26 partially located inside faucet body 12, as shown. Water conduit 26 delivers water to aerator 30. Automatic faucet system 10 also includes a control module 50 for controlling a faucet sensor and solenoid valve 38, powered by batteries located in battery compartment 39.

Figure 1A:
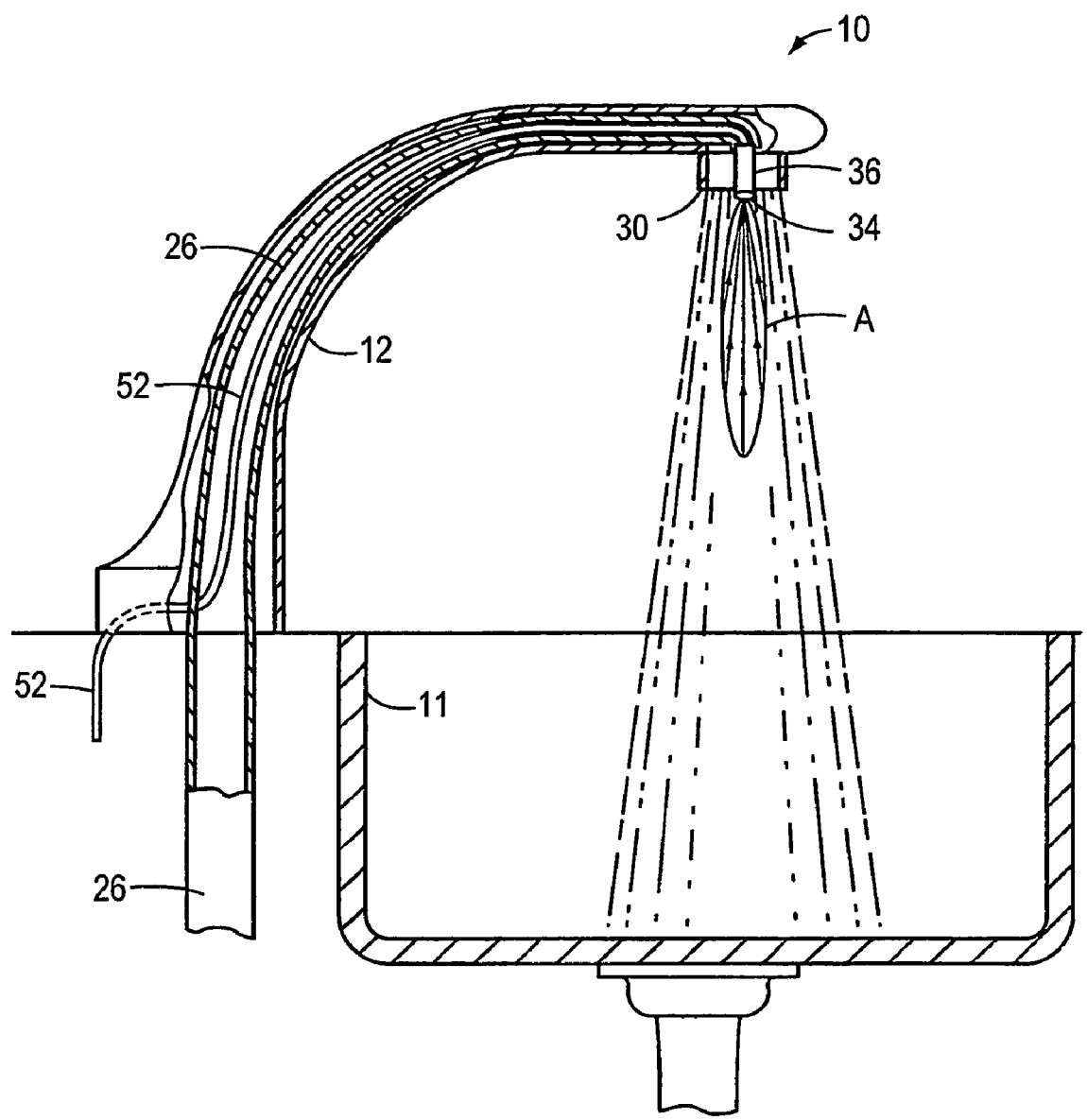
FIG. 1A is a cross-sectional view of a spout and a sink of the automatic faucet system of FIG. 1 using a fiberoptic coupling to the passive optical sensor.

Referring to FIGS. 1 and 1A, in a first preferred embodiment, automatic faucet system 10 includes an optical sensor located in control module 50 and optically coupled by a fiberoptic cable 52 to sensor port 34 located in aerator 30. Sensor port 34 receives the distal end of fiberoptic cable 52, which may be coupled to an optical lens located at sensor port 34. The optical lens is arranged to have a selected field of view, which is preferably somewhat coaxial within the water stream discharged from aerator 30, when the faucet is turned on.

Alternatively, the distal end of fiberoptic cable 52 is polished and oriented to emit or to receive light directly (i.e., without the optical lens). Again, the distal end of fiberoptic cable 52 is arranged to have the field of view (for example, field of view A, FIG. 1A) directed toward sink 11, somewhat coaxial within the water stream discharged from aerator 30. Alternatively, sensor port 34 includes other optical elements, such as an array of pinholes or an array of slits having a selected size, geometry and orientation. The size, geometry and orientation of the array of pinholes or the array of slits is designed to provide a selected detection pattern (shown in FIGS. 3-3D, for a faucet and FIGS. 5-5L, for a flusher).

Referring still to FIGS. 1 and 1A, a fiberoptic cable 52 is preferably located inside water conduit 26 in contact with water. Alternatively, fiberoptic cable 52 could be located outside of the water conduit 26, but inside of faucet body 12. FIGS. 1C, 1D, and 1E show alternative ways to provide sensor port 34 inside aerator 30 and alternative ways to arrange an optical fiber 52 coupled to an optical lens 54. In other embodiments, optical lens 54 is replaced by an array of pinholes or an array of slits.

Figure 1B:
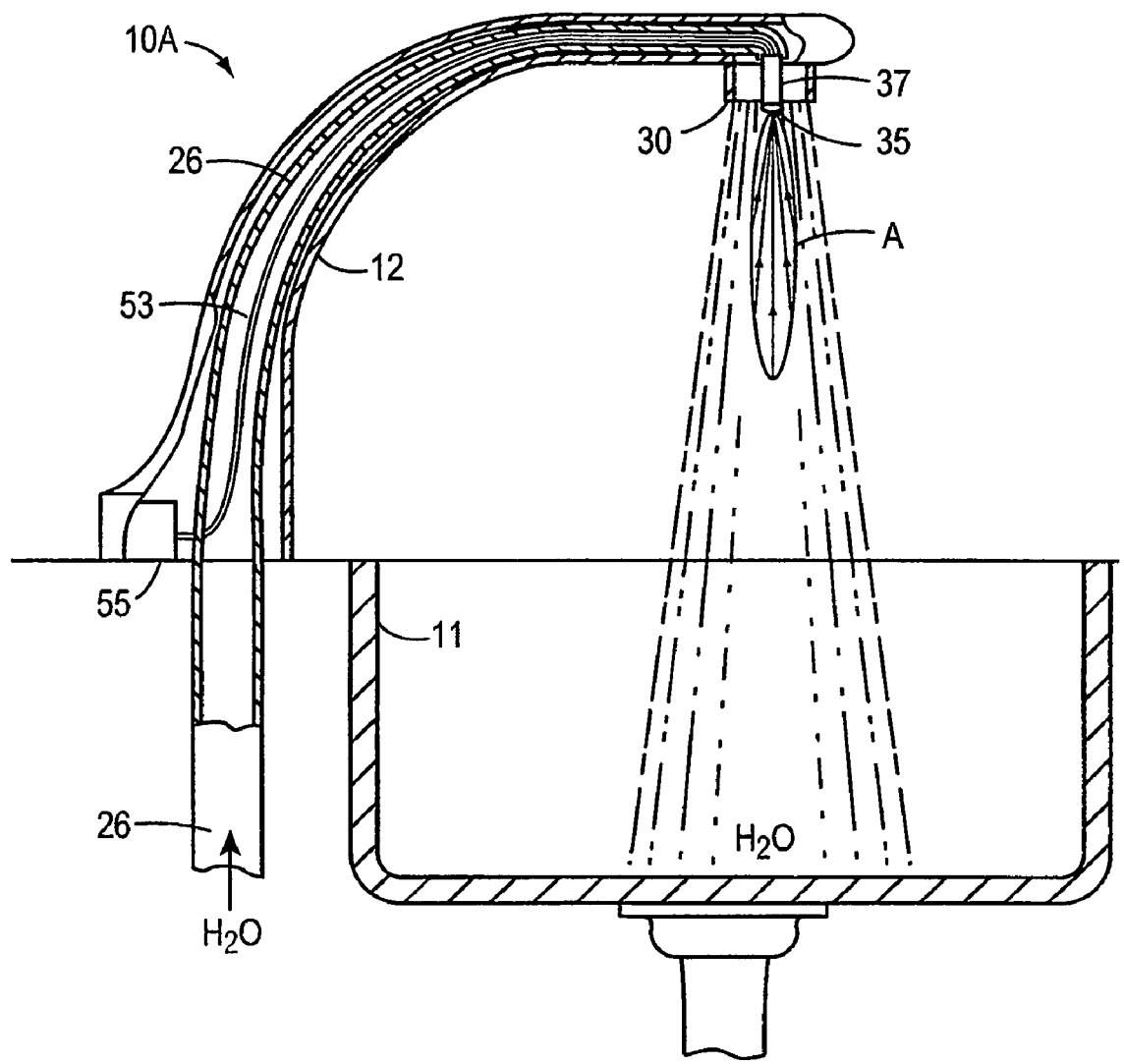
FIG. 1B is a cross-sectional view of a spout and a sink of the automatic faucet system of FIG. 1 using an electric coupling to the passive optical sensor.
Figure 1C:
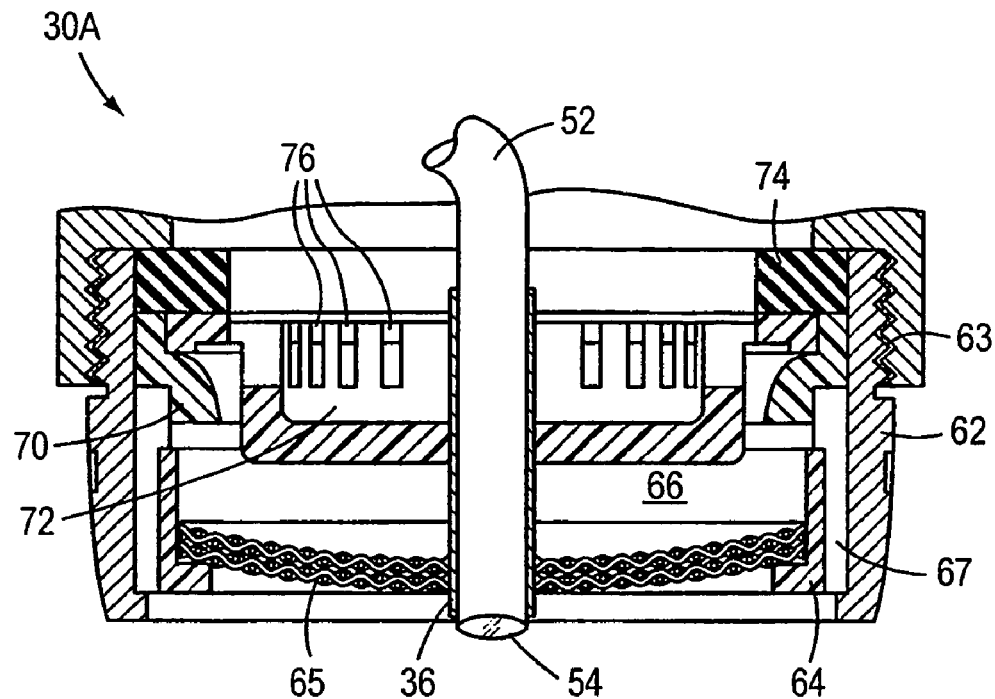
FIG. 1C is a cross-sectional view of an aerator used in the automatic faucet system of FIG. 1.
Figure 1D:
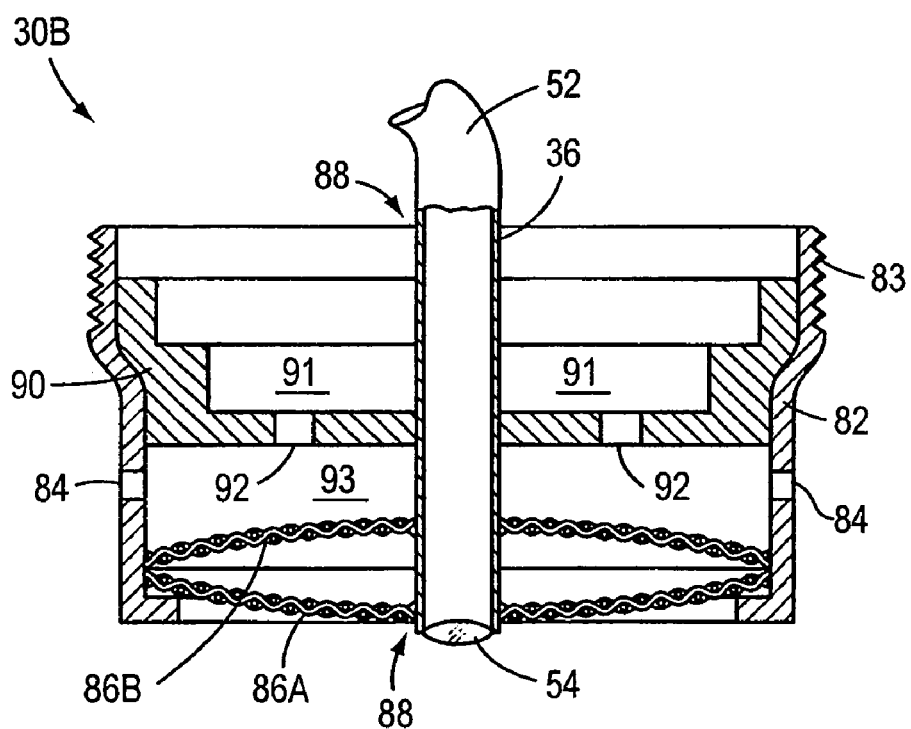
FIG. 1D is a cross-sectional view of another embodiment of the aerator used in the automatic faucet system of FIG. 1.
Figure 1E:
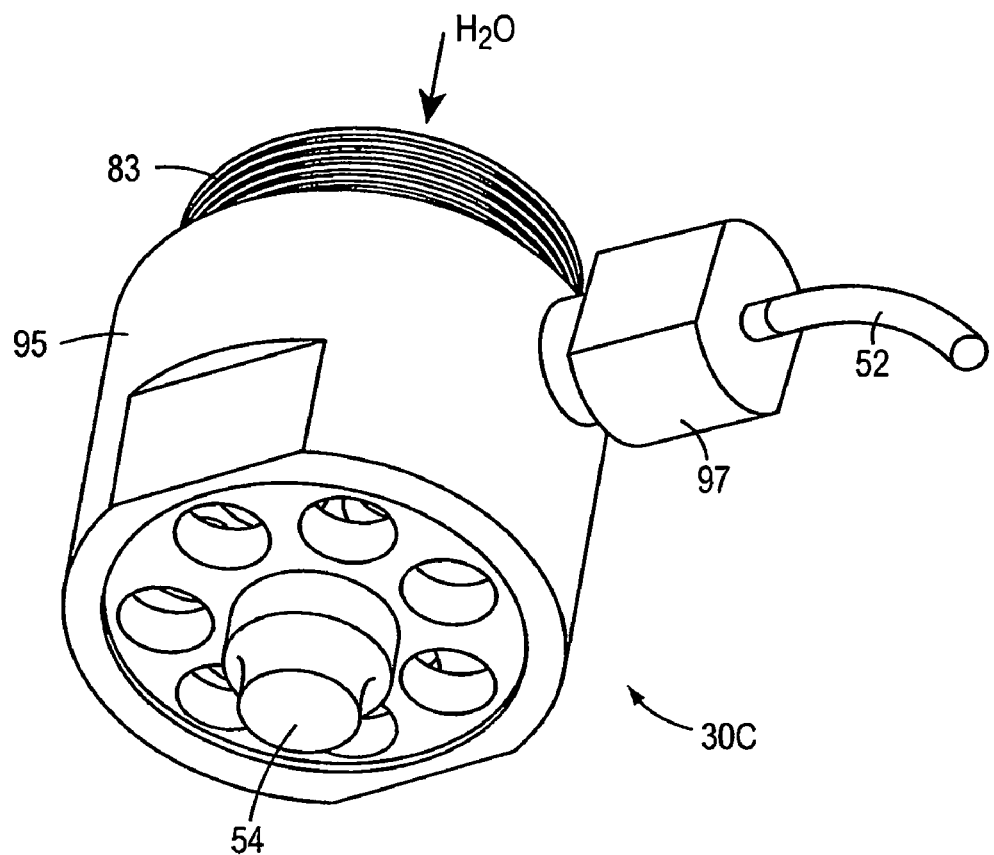
FIG. 1E is a perspective view of another embodiment of the aerator used in the automatic faucet system of FIG. 1.

FIG. 1B illustrates a second preferred embodiment of the automatic faucet system. Automatic faucet system 10A includes faucet body 12 and an aerator 30 including an optical sensor 37 coupled to a sensor port 35. Optical sensor 37 is electrically connected by a wire 53 to an electronic control module 50 located inside the body of the faucet. In another embodiment, electronic control module 50 located outside of the faucet body next to control valve 38 (FIG. 1)

In another embodiment, sensor port 35 receives an optical lens, located in from of optical sensor 37, for defining the detection pattern (or optical field of view). Preferably, the optical lens provides a field of view somewhat coaxial within the water stream discharged from aerator 30, when the faucet is turned on. In yet other embodiments, sensor port 35 includes other optical elements, such as an array of pinholes or an array of slits having a selected size, geometry and orientation. The size, geometry and orientation of the array of pinholes, or the array of slits are designed to provide a selected detection pattern (shown in FIGS. 3-3D, for a faucet and FIGS. 5-5L, for a flusher).

The optical sensor is a passive optical sensor that includes a visible or infrared light detector optically coupled to sensor port 34 or sensor port 35. There is no light source (i.e., no light emitter) associated with the optical sensor. The visible or near infrared (NIR) light detector detects light arriving at sensor port 34 or sensor port 35 and provides the corresponding electrical signal to a controller located in control unit 50 or control unit 55. The light detector (i.e., light receiver) may be a photodiode, or a photoresistor (or some other optical intensity element having an electrical output, whereby the sensory element will have the desired optical sensitivity). The optical sensor using a photo diode also includes an amplification circuitry. Preferably, the light detector detects light in the range from about 400-500 nanometers up to about 950-1000 nanometers. The light detector is primarily sensitive to ambient light and not very sensitive to body heat (e.g., infrared or far infrared light).

Figure 2:
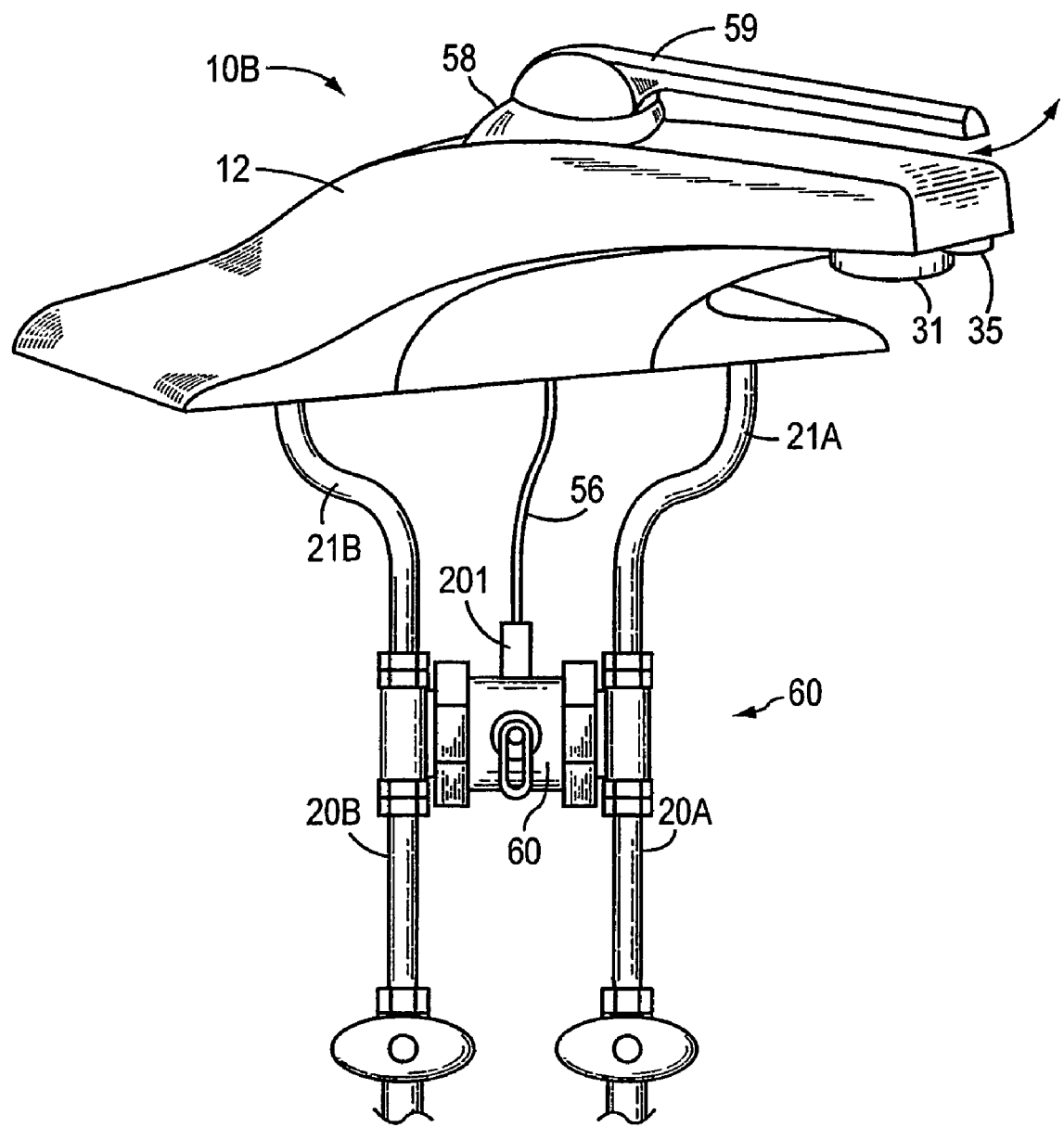
FIGS. 2 and 2A show schematically other embodiments of automatic faucet systems, including another embodiment of a valve and a passive optical sensor for controlling water flow.
Figure 2A:
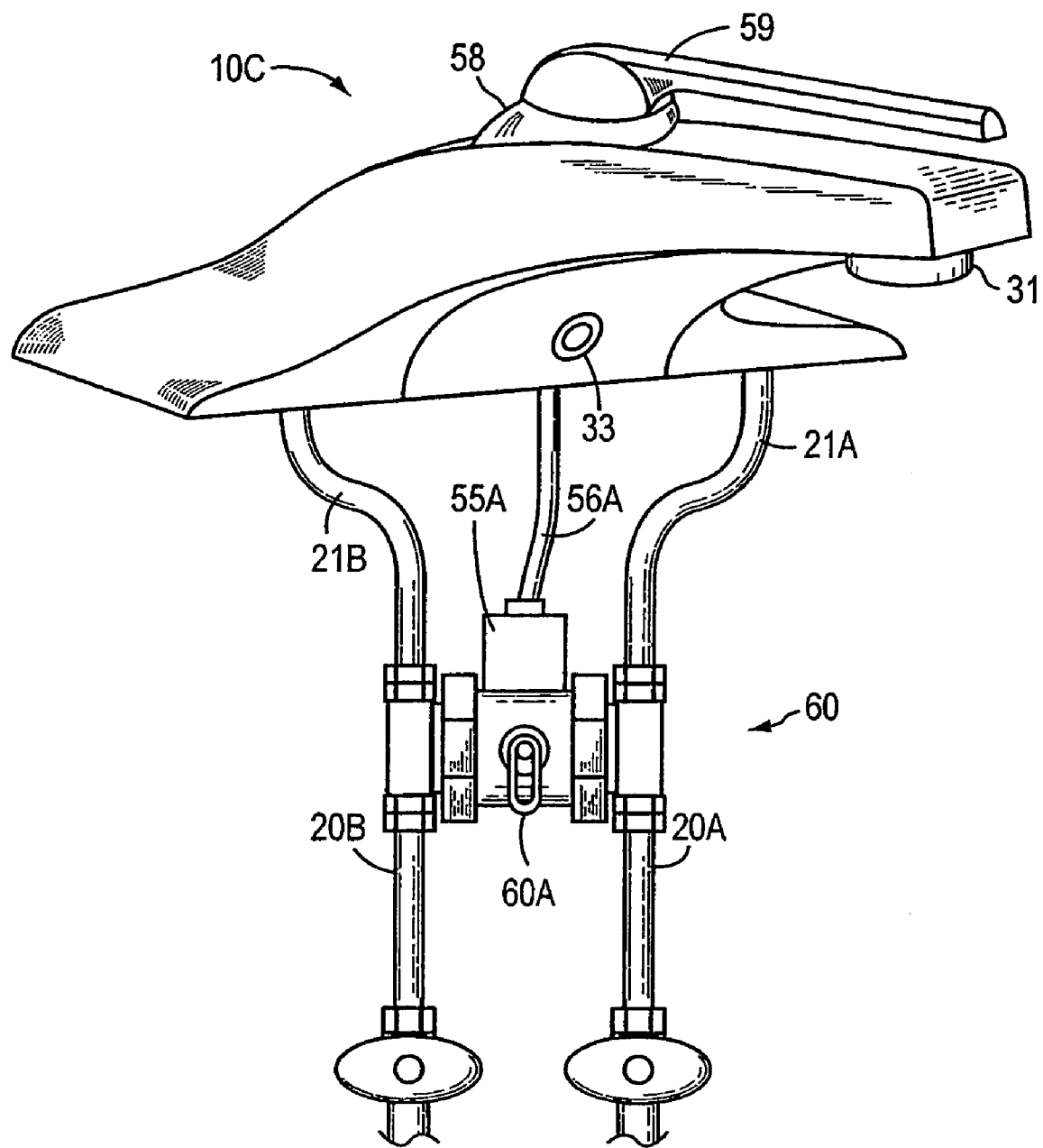

FIGS. 2 and 2A illustrate alternative embodiments of the automatic faucet system. Referring to FIG. 2, automatic faucet system 10B includes a faucet receiving water from a dual-flow faucet valve 60 and providing water from aerator 31. Automatic faucet 12 includes a mixing valve 58 controlled by a handle 59, which may be also coupled to a manual override for valve 60. Dual-flow valve 60 is connected to cold water pipe 20A and hot water pipe 20B, and controls water flow to the respective cold water pipe 21A and hot water pipe 21B.

Figure 8:
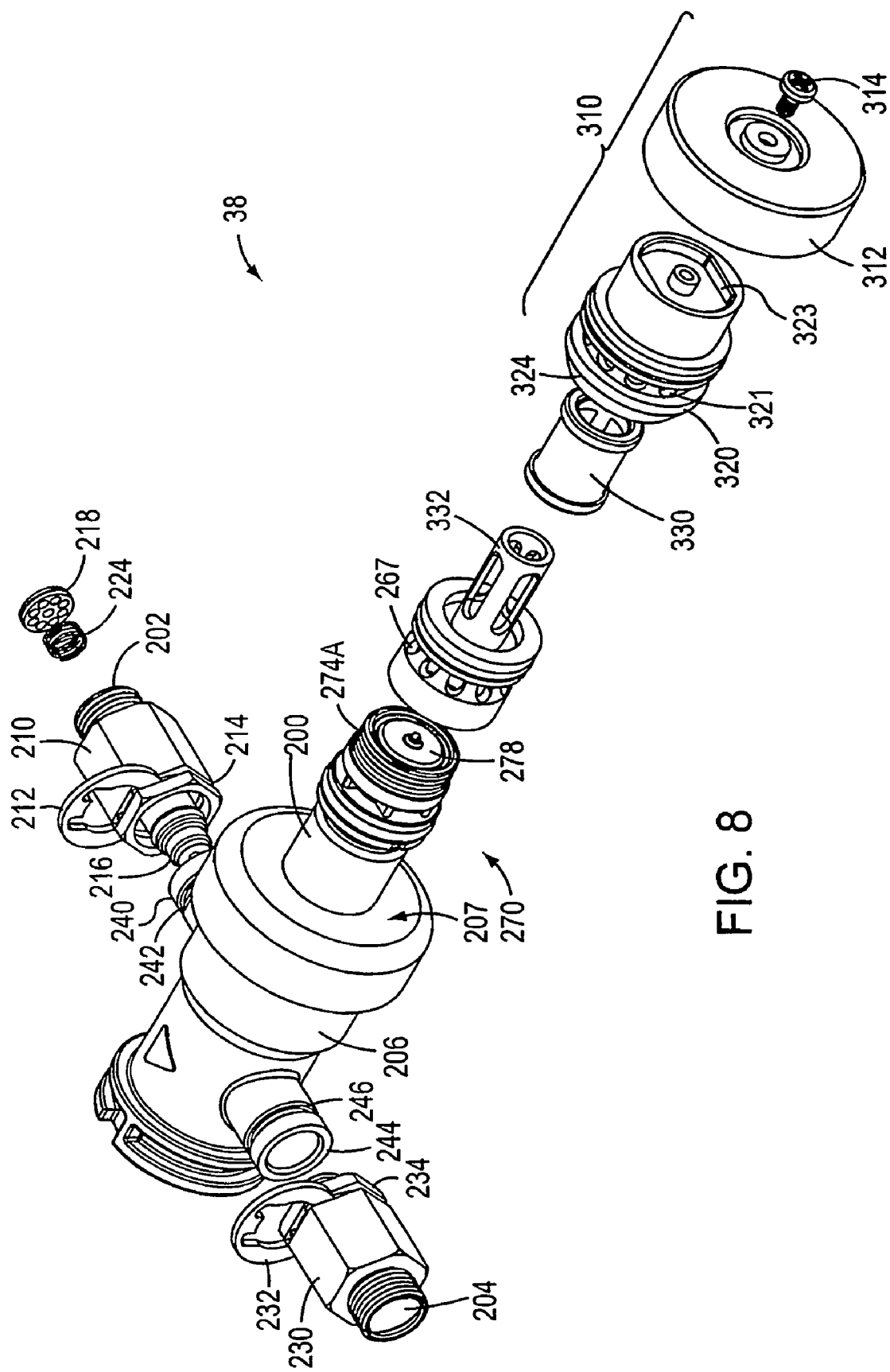
FIG. 8 is a perspective exploded view of a valve device used in the automatic faucet system of FIGS. 1, 1A or 1B.
Figure 8A:
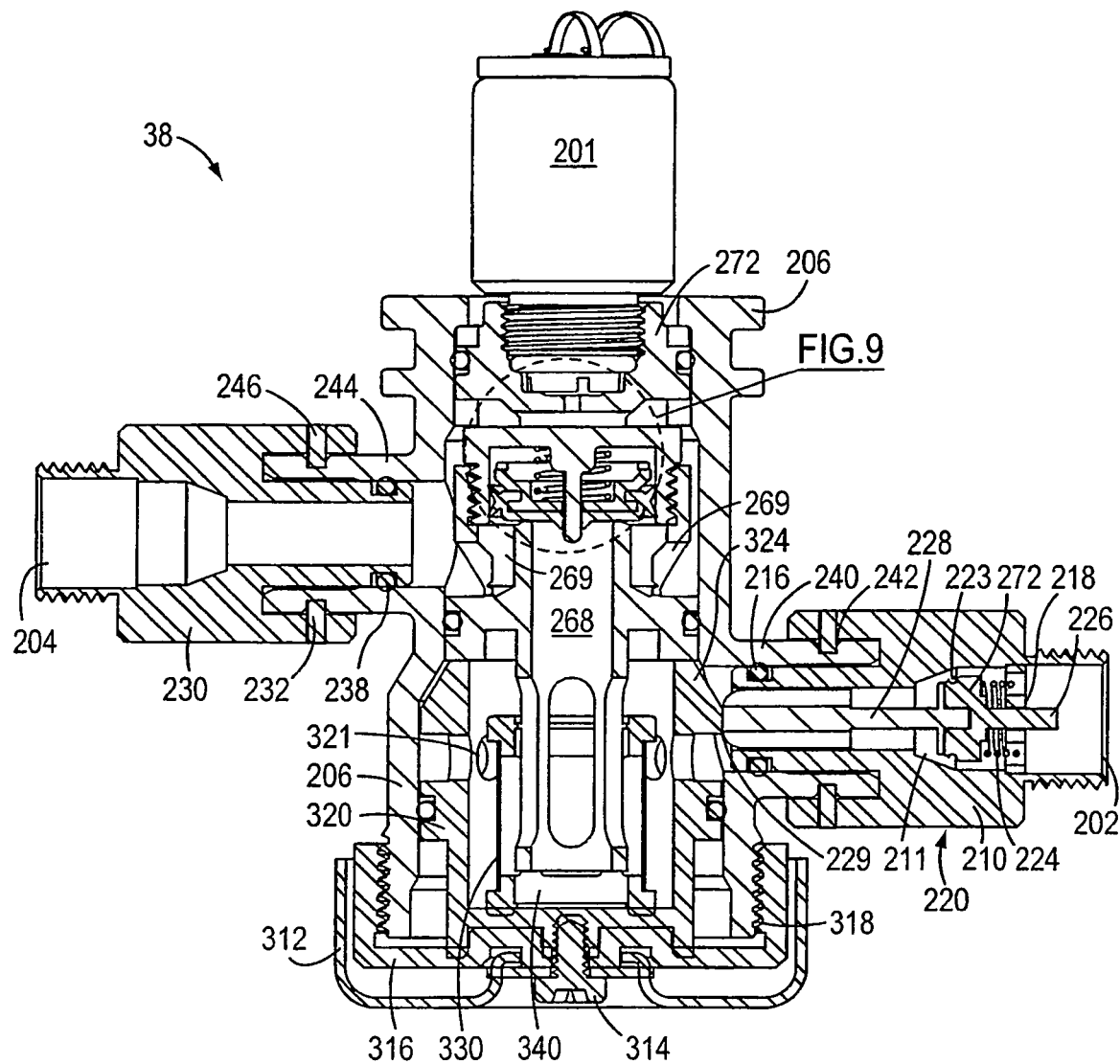
FIG. 8A is an enlarged cross-sectional view of the valve device shown in FIG. 8.

Dual flow valve 60 is constructed and arranged to simultaneously control water flow in both pipes 21A and 21B upon actuation by a single actuator 201 (See FIG. 8A). Specifically, valve 60 includes two flow valves arranged for controlling flow of hot and cold water in the respective water lines. The solenoid actuator 201 (FIG. 8A) is coupled to a pilot mechanism for controlling two flow valves. The two flow valves are preferably diaphragm operated valves (but may also be piston valves, or large flow-rate "fram" valves described in connection with FIGS. 9 and 9A). Dual flow valve 60 includes a pressure release mechanism constructed to change pressure in a diaphragm chamber of each diaphragm operated valve and thereby open or close each diaphragm valve for controlling water flow. Dual flow valve 60 is described in detail in PCT Application PCT/US01/43277, filed on Nov. 20, 2001, which is incorporated by reference.

Referring still to FIG. 2, coupled to faucet body 12 there is a sensor port 35 for accommodating a distal end of an optical fiber (e.g., fiberoptic cable 52), or for accommodating a light detector. The fiberoptic cable delivers light from sensor port 35 to a light detector. In one preferred embodiment, faucet body 12 includes a control module with the light detector and a controller described in connection with FIGS. 10 and 10A. The controller provides control signals to solenoid actuator 201 via electrical cable 56. Sensor port 35 has a detection field of view (shown in FIGS. 3A and 3B) located outside of the water stream emitted from aerator 31.

Referring to FIG. 2A, automatic faucet system 10C includes faucet body 12 also receiving water from dual-flow faucet valve 60 and providing water from aerator 31. Automatic faucet 10C also includes mixing valve 58 controlled by handle 59. Dual-flow valve 60 is connected to cold water pipe 20A and hot water pipe 20B, and controls water flow to the respective cold water pipe 21A and hot water pipe 21B.

Figure 3:
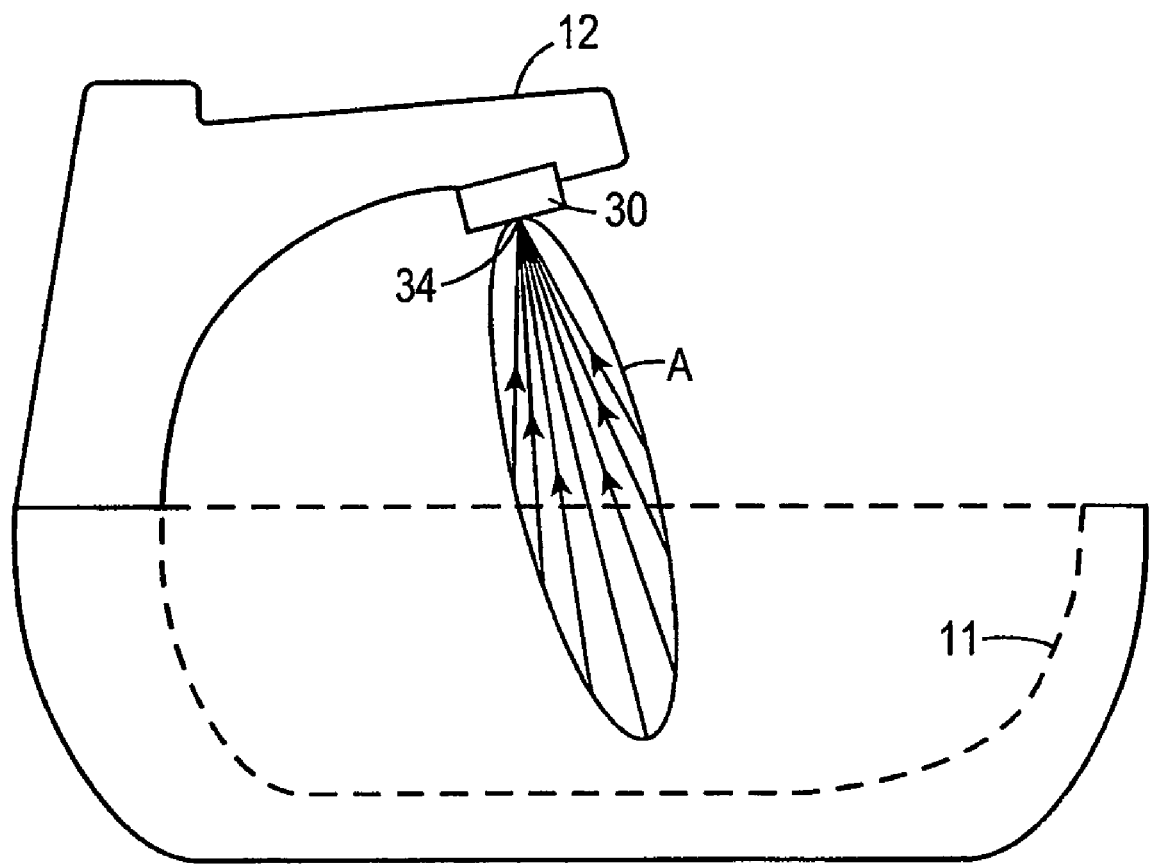
FIGS. 3, 3A, 3B, 3C and 3D show schematically a faucet and a sink relative to different optical detection patterns used by passive optical sensors employed in the automatic faucet systems of FIGS. 1, 1B, 2, and 2A.
Figure 3A:
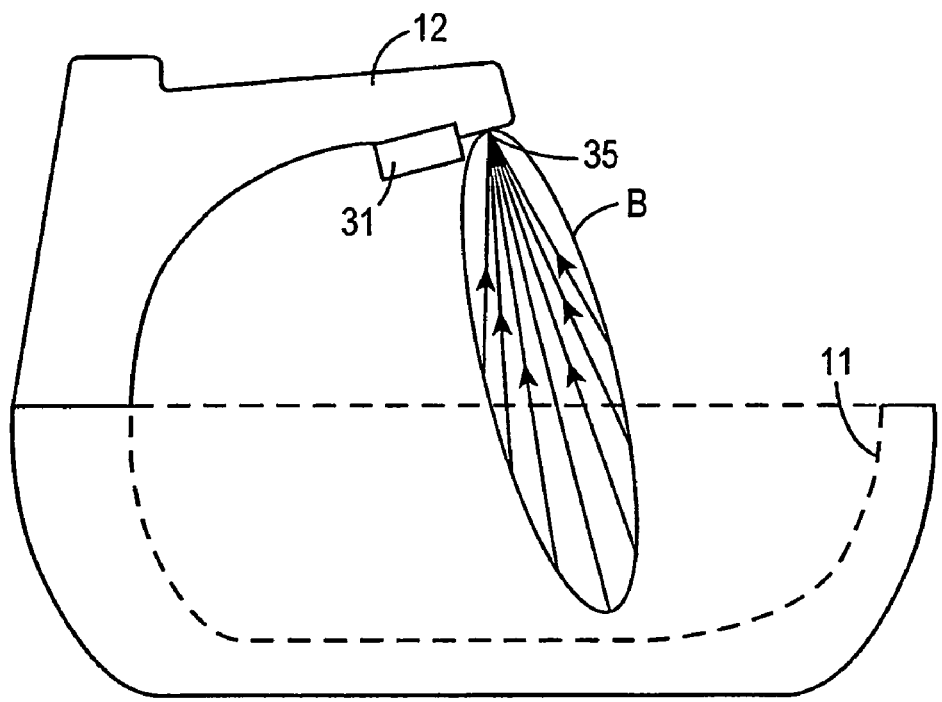
Figure 3B:
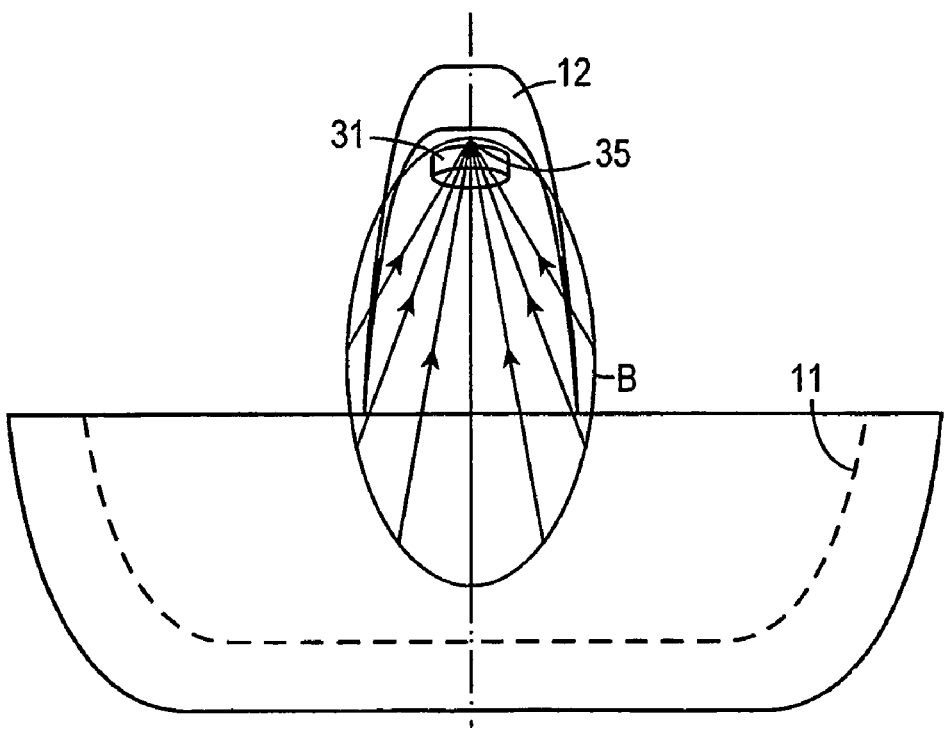
Figure 3C:
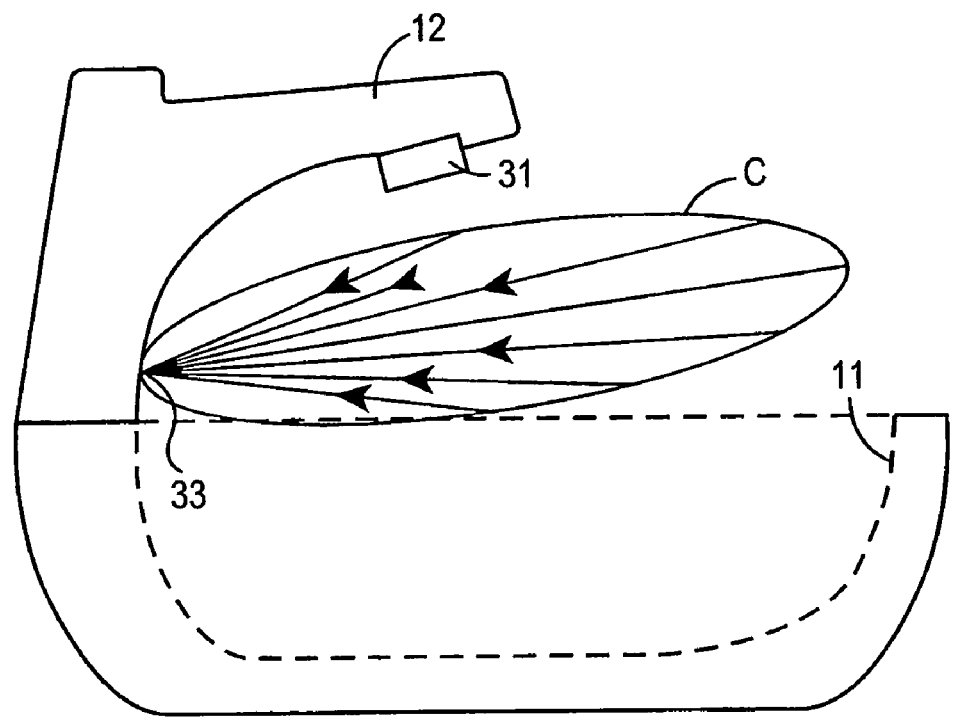
Figure 3D:
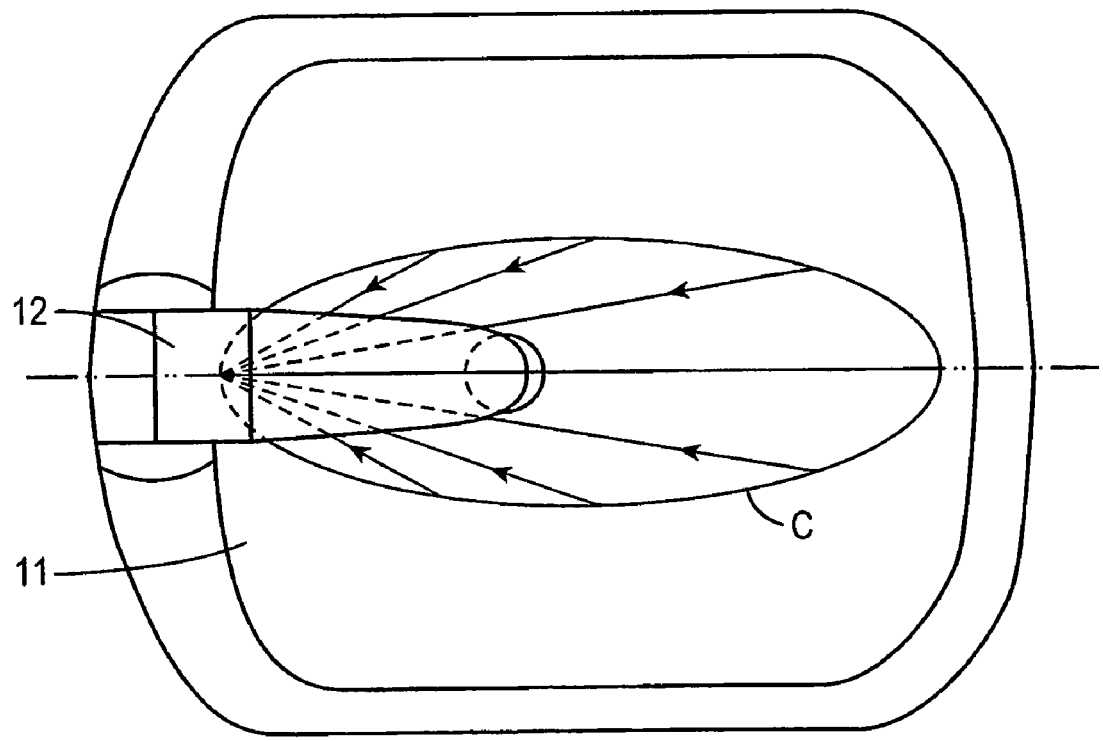

A sensor port 33 is coupled to faucet body 12 and is designed to have a field of view shown in FIGS. 3C and 3D. Sensor port 33 accommodates the distal end of an optical fiber 56A. The proximal end of optical fiber 56A provides light to an optical sensor located in a control module 55A coupled to dual flow valve 60. Control module 55A also includes the control electronics and batteries. The optical sensor detects the presence of an object (e.g., hands), or detects a change in the presence of the object (i.e., movement) in the sink area. Control electronics control the operation of and the readout from the light detector. The control electronics also include a power driver that controls the operation of the solenoid associated with valve 60. Based on the signal from the light detector, the control electronics direct the power driver to open or close solenoid valve 60 (i.e., to start or stop the water flow). The design and operation of actuator 201 (FIG. 8A) is described in detail in PCT Applications PCT/US02/38757; PCT/US02/38758; and PCT/US02/41576, all of which are incorporated by reference as if fully provided herein.

FIG. 1C shows a vertical cross-section of an aerator 30A located at the discharge end of the spout of faucet 12. Aerator 30A includes a barrel 62 attachable to faucet body 12 using threads 63. Barrel 62 supports a ring 64 which in turn supports wire mesh screens 65. Barrel 62 also supports an annular member 70, a jet-forming member 72, and an upper washer 74. Jet forming member 72 includes several elongated slots 76 for providing water passages. Jet forming member 72 and screens 65 include a passage 36 for optical fiber 52. Water flows through aerator 30A from top to bottom. In aerator 30A, a water stream flows from water conduit 26 (FIG. 1A) and is broken up by the vertically elongated slots 76 of the water jet-forming member 72. Then water flows through to wire mesh screens 65, which are supported by ring 64. Ring 64 also enables air intake (suction) through gaps 67 (which it forms between itself and the barrel 62) inside a chamber 66. Just above wire mesh screens 65, in chamber 66, air mixes with water so that a mixture of air and water passes through screens 65. The optical fiber 52 is located in the center of the above described elements inside a tubular member 36, which holds lens 54.

FIG. 1D shows a second embodiment of an aerator with a centrally located port for a passive sensor. In this embodiment, the aerator 30B includes at least two lenticularly arranged wire mesh members 86A and 86B, providing a central opening for a passage 88. Aerator 30B also includes an insert member 90 including several holes 92 and a central hole 88 for accommodating tubular member 52. Aerator 30B is attached to faucet 12 using threads 83. Water flows from water conduit 26 to an upper chamber 91 and then through holes 92. Air enters chamber 93 via holes 84. The mixture of water and air then flows through two screens 86A and 86B assembled in a lenticular arrangement. Housing 82 has a surrounding support part oriented inwards, which supports the two screens 86A and 86B. Optical fiber 52 extends inside water pipe 26 (FIG. 1A) through aerator 30B from the top and through the wire mesh screens 86A and 86B. As the individual water jets formed by holes 92 enter lower chamber 93, air is drawn via openings 84 into chamber 93. Inside chamber 93, water mixes with air and the mixture is forced through screens 86A and 86B.

Figure 1F:
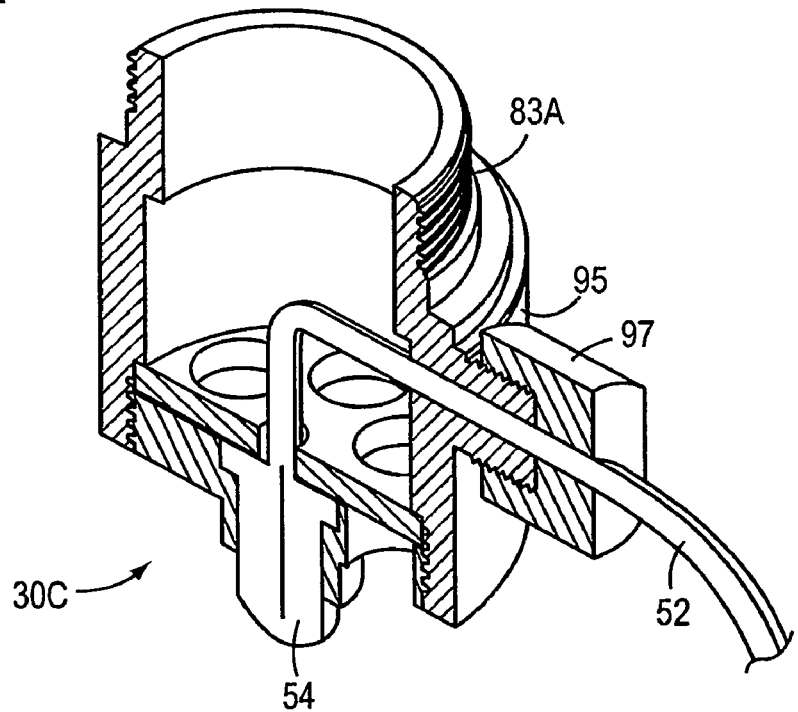
FIG. 1F is a cross-sectional view of the aerator shown in FIG. 1D.

FIGS. 1E and 1F show alternative ways to provide the optical field aligned with the water stream (i.e., alternative embodiment of an aerator and a sensor port located therein). FIG. 1E is a perspective view of an aerator 30C and FIG. 1F is a cross-sectional view of aerator 30C used in the automatic faucet system of FIG. 1. Aerator 30C is coupled to faucet body 12 and the water conduit 26 using using threads 83. Optical fiber 52 is located outside the water conduit and introduced via an adapter 97. Alternatively, adapter 97 can include the light detector coupled to a control module using an electrical cable instead of fiberoptic cable 52. (For simplicity, the wire mesh members and the air openings are not shown in FIGS. 1E and 1F).

FIG. 3 shows schematically a cross-sectional view of a first preferred detection pattern (A) for the passive optical sensor installed in automatic faucet 12. The detection pattern A is associated with sensor port 34 and is shaped by a lens, or an element selected from the optical elements shown in FIGS. 6-6E. The detection pattern A is selected to receive reflected ambient light primarily from sink 11. The pattern's width is controlled, but the range is much less controlled (i.e., FIG. 3 shows pattern A only schematically because detection range is not really limited).

A user standing in front of a faucet will affect the amount of ambient (room) light arriving at the sink and thus will affect the amount of light arriving at the optical detector. On the other hand, a person just moving in the room will not affect significantly the amount of detected light. A user having his hands under the faucet will alter the amount of ambient (room) light being detected by the optical detector even more. Thus, the passive optical sensor can detect the user's hands and provide the corresponding control signal. Here, the detected light doesn't depend significantly on the reflectivity of the target surface (unlike for optical sensors that use both a light emitter and a receiver). After hand washing, the user removing his hands from under the faucet will again alter the amount of ambient light detected by the optical detector. Then, the passive optical sensor provides the corresponding control signal to the controller (explained in connection with FIGS. 10, 10A and 10B).

Figure 13:
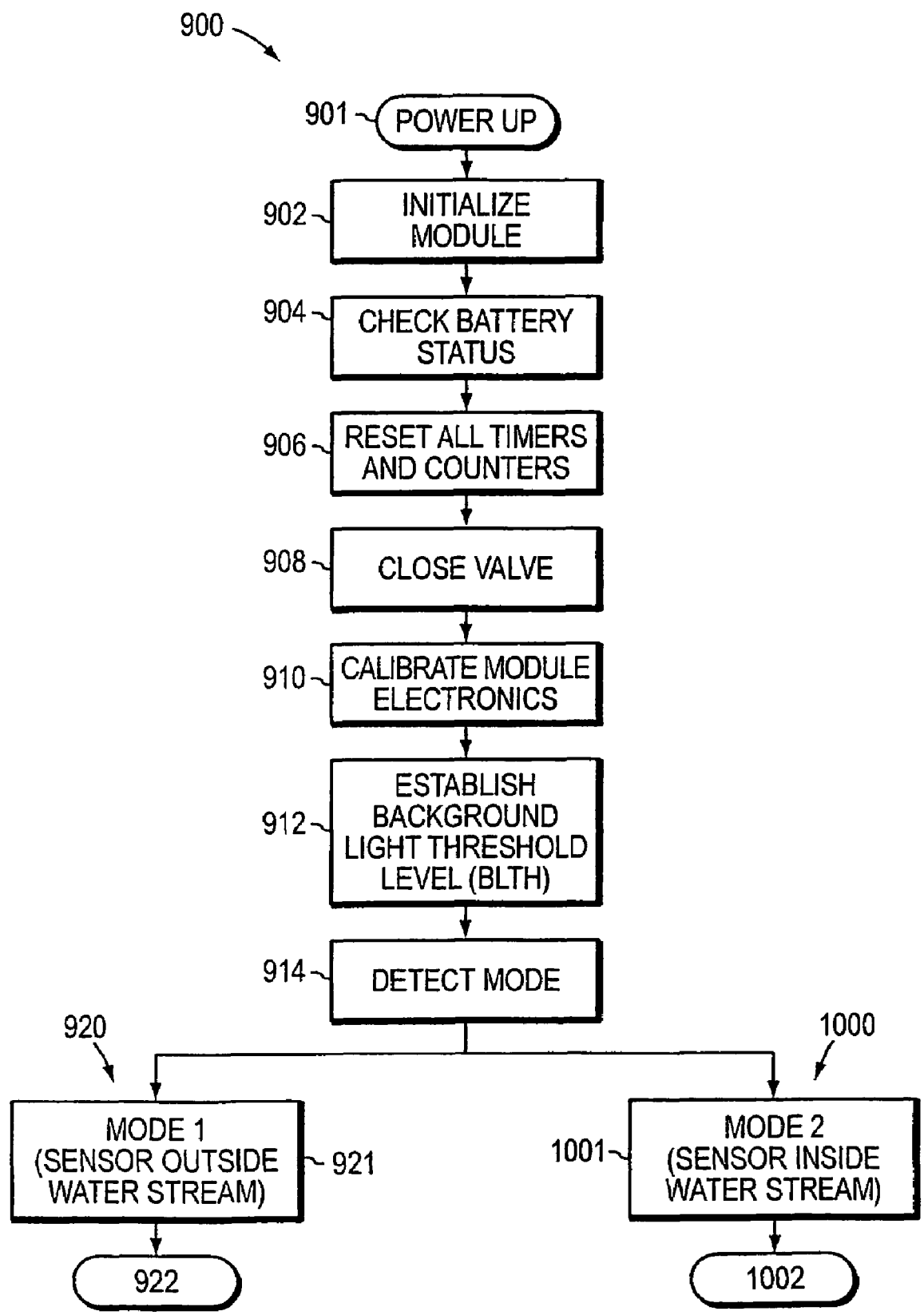
FIGS. 13, 13A and 13B show a flow diagram of an algorithm for processing optical data detected by the passive sensor operating the automatic faucet system.
Figure 13A:
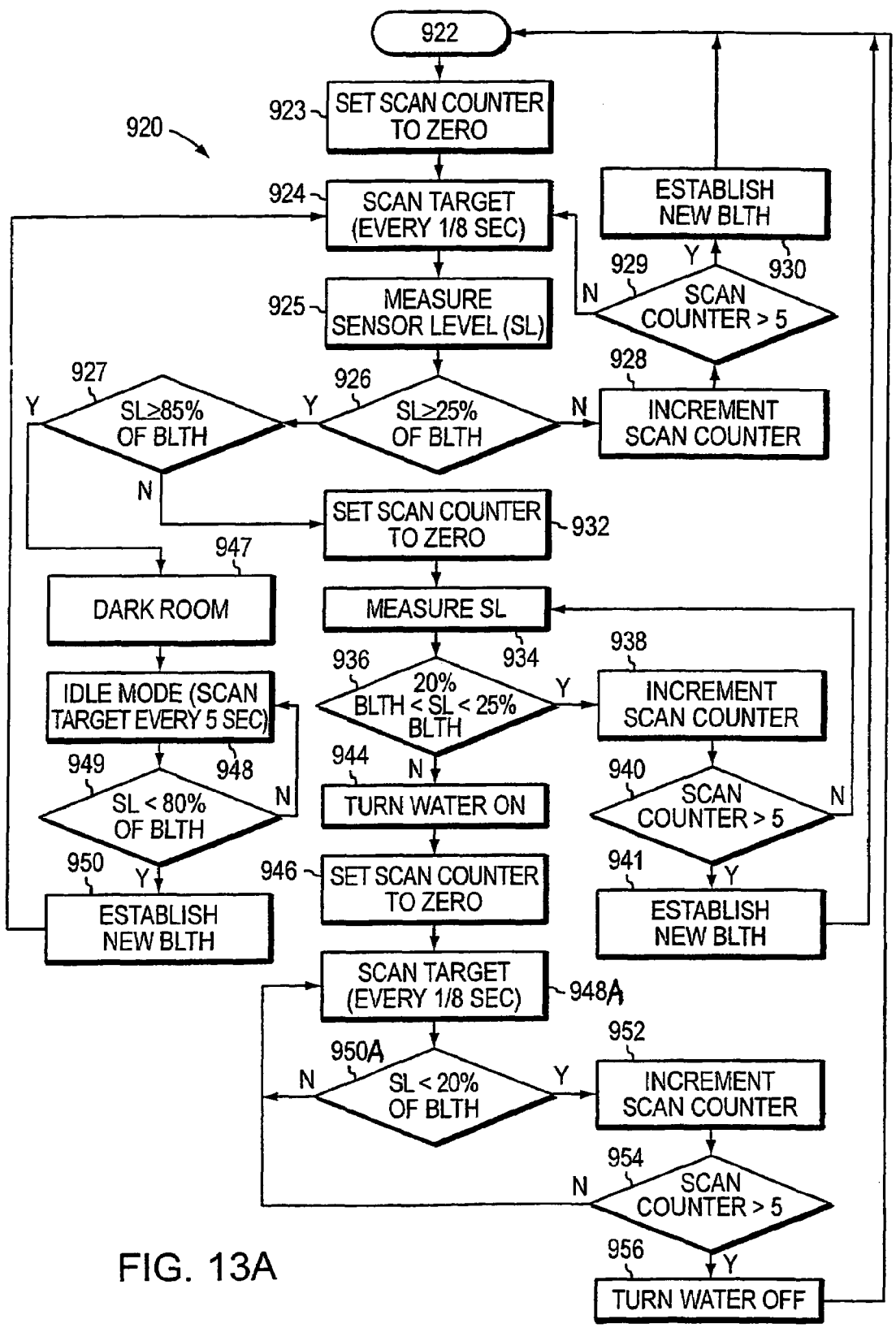
Figure 13B:
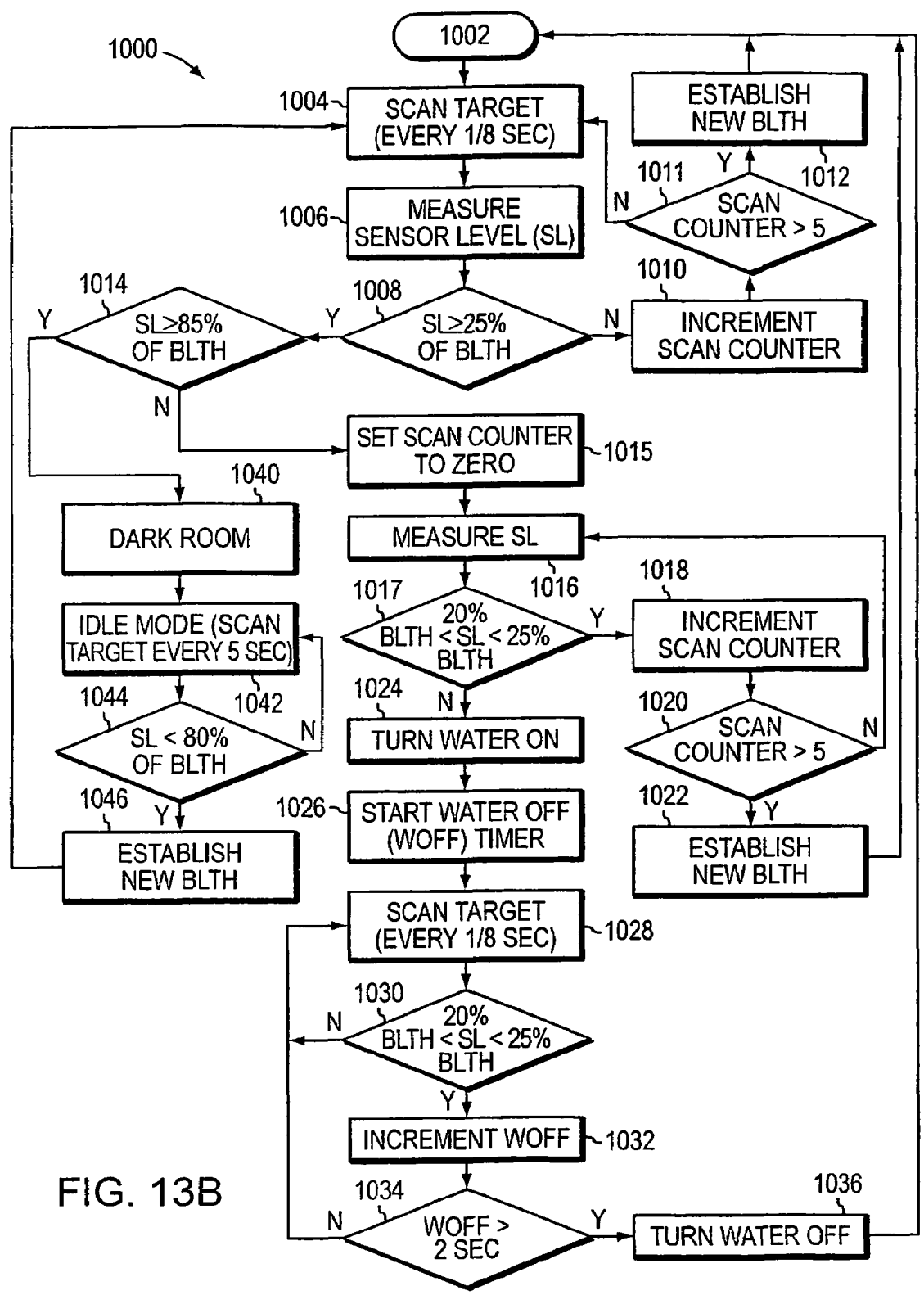

FIGS. 3A and 3B show schematically a second preferred detection pattern (B) for the passive optical sensor installed in automatic faucet 10B. The detection pattern B is associated with sensor port 35, and again may be shaped by a lens, or an optical element shown in FIGS. 6-6E. A user having his hands under faucet 10B alters the amount of ambient (room) light detected by the optical detector. As mentioned above, the detected light doesn't depend significantly on the reflectivity of the user's hands (unlike for optical sensors that use both a light emitter and a receiver). Thus, the passive optical sensor detects the user's hands and provides the corresponding control signal to the controller. FIGS. 13, 13A, and 13B illustrate detection algorithms used for the detection patterns A and B.

FIGS. 3C and 3D show schematically another detection pattern (C) for the passive optical sensor installed in automatic faucet 10C. The detection pattern C is associated with sensor port 33, and is shaped a selected optical element. The selected optical element achieves a desired width and orientation of the detection pattern, while the range is more difficult to control. In this embodiment, a user standing in front of faucet 10C will alter the amount of detected ambient light somewhat more than a user passing by. In this embodiment, light reflections from sink 11 influence the detected light only minimally.

Figure 4:
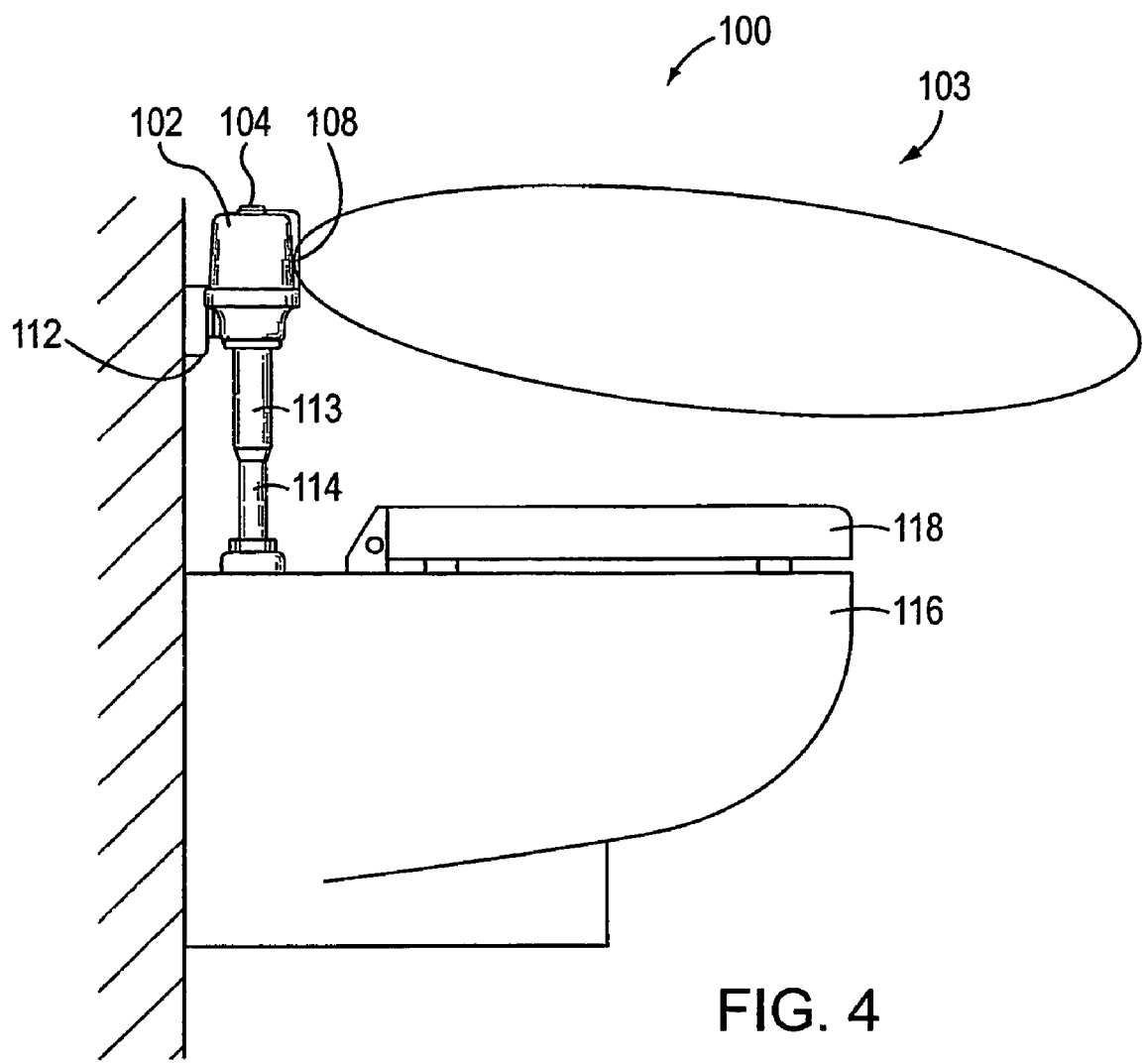
FIG. 4 shows schematically a side view of a toilet including an automatic flusher.
Figure 4A:
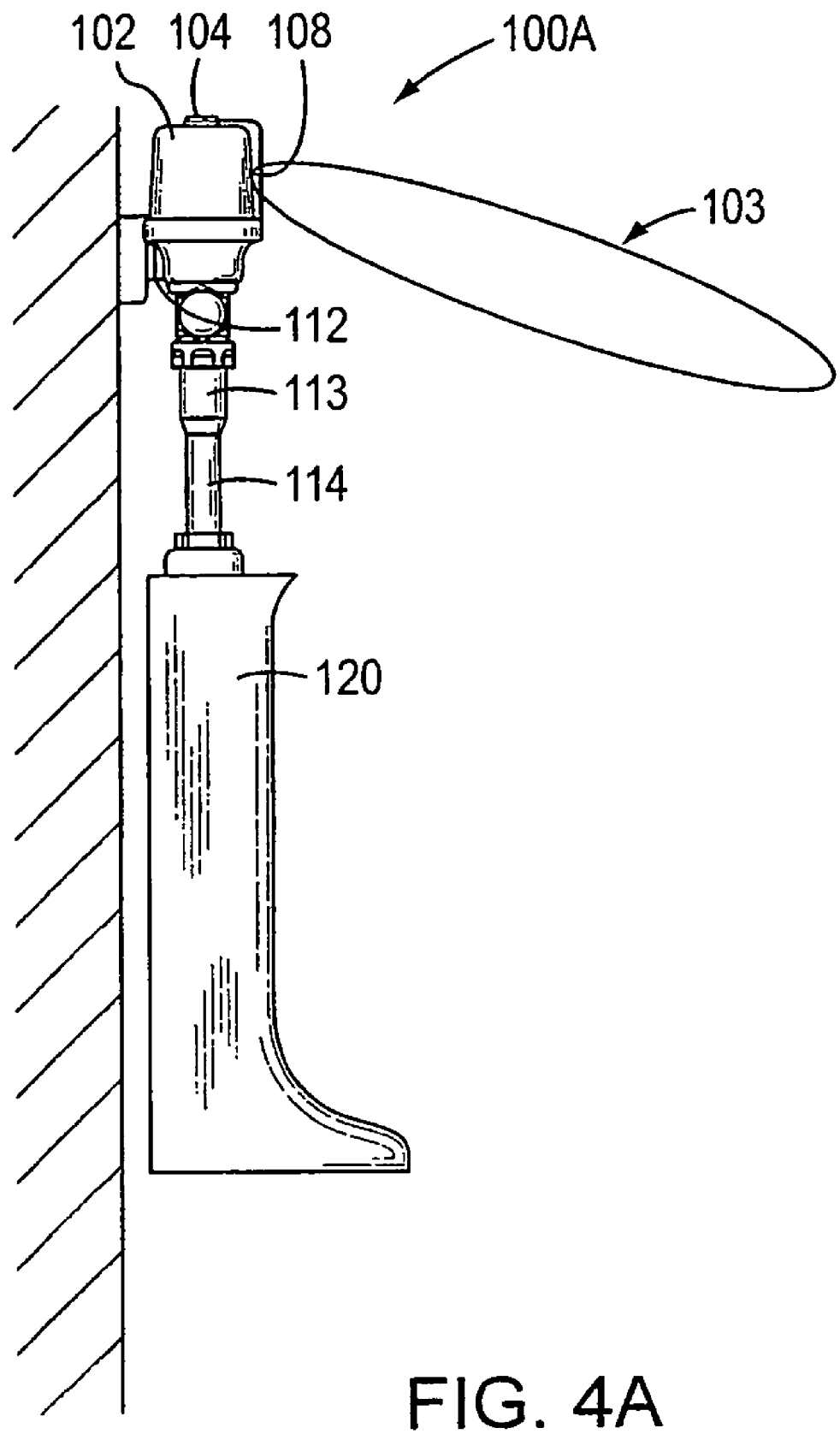
FIG. 4A shows schematically a side view of a urinal including an automatic flusher.

FIG. 4 shows schematically a side view of a toilet including an automatic flusher 100, and FIG. 4A shows schematically a side view of a urinal including an automatic flusher 100A. Flusher 100 receives pressurized water from a supply line 112 and employs a passive optical sensor to respond to actions of a target within a target region 103. After a user leaves the target region, a controller directs opening of a flush valve 102 that permits water flow from supply line 112 to a flush conduit 113 and to a toilet bowl 116.

FIG. 4A illustrates bathroom flusher 100A used for automatically flushing a urinal 120. Flusher 100A receives pressurized water from supply line 112. Flush valve 102 is controlled by a passive optical sensor that responds to actions of a target within a target region 103. After a user leaves the target region, a controller directs opening of a flush valve 102 that permits water flow from supply line 112 to a flush conduit 113.

Bathroom flushers 100 and 100A may have a modular design, wherein their cover can be partially opened to replace the batteries or the electronic module. Bathroom flushers with such a modular design are described in U.S. Patent Application 60/448,995, filed on Feb. 20, 2003, which is incorporated by reference for all purposes.

Figure 5:
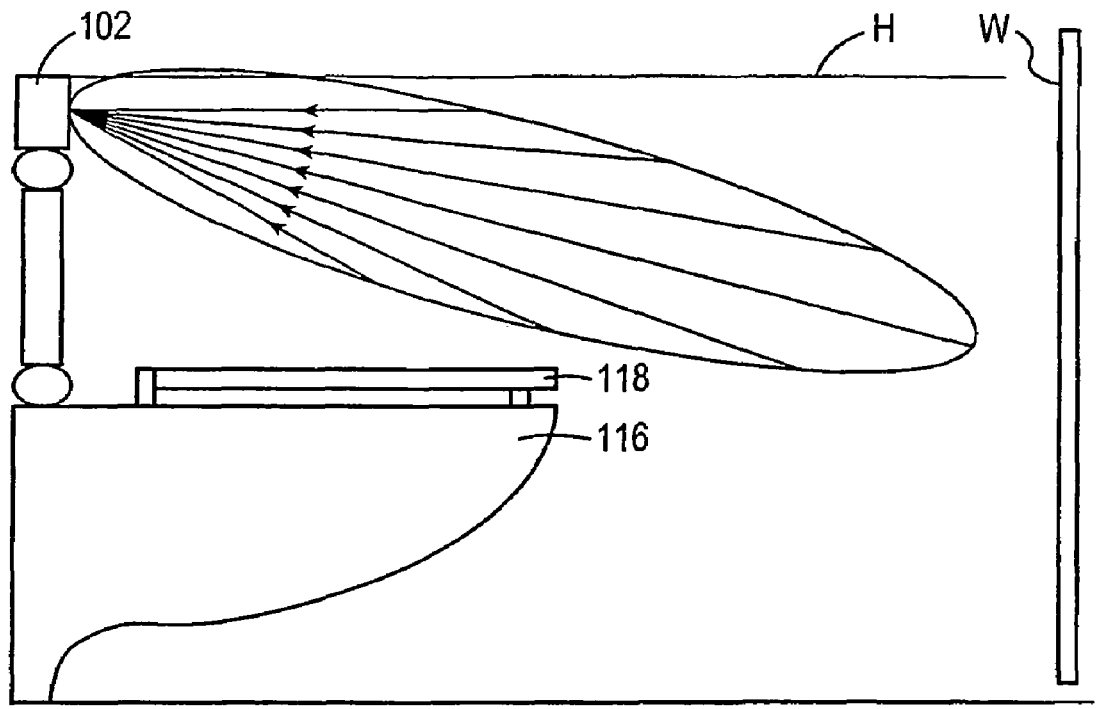
FIGS. 5, 5A, 5B, 5C, 5D, 5E, 5F and 5G show schematically side and top views of different optical detection patterns used by passive optical sensors employed in the automatic toilet flusher of FIG. 4.
Figure 5A:
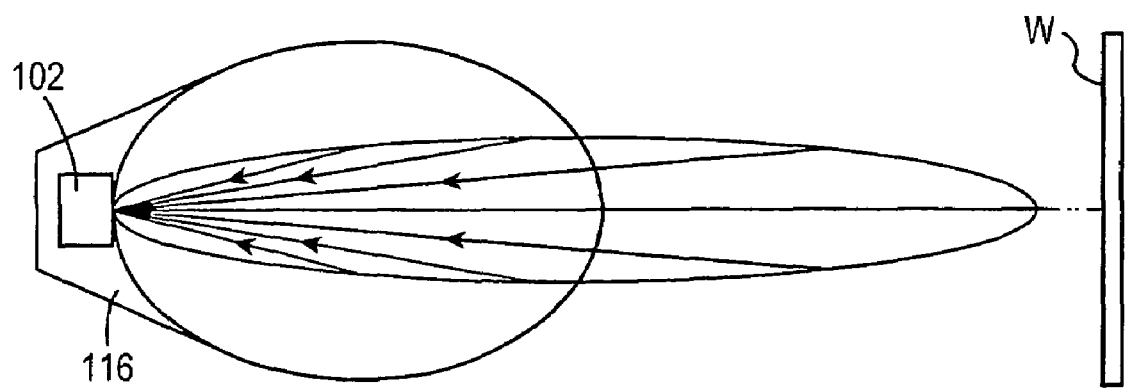

FIGS. 5 and 5A show schematically side and top views of an optical detection pattern used by the passive optical sensor installed in the automatic toilet flusher of FIG. 4. This detection pattern is associated with sensor port 108 and is shaped by a lens, or an element selected from the optical elements shown in FIGS. 6-6E. The pattern is angled below horizontal (H) and directed symmetrically with respect to toilet 116. The range is somewhat limited not to be influenced by a wall (W); this can be also done by limiting the detection sensitivity.

Figure 5B:
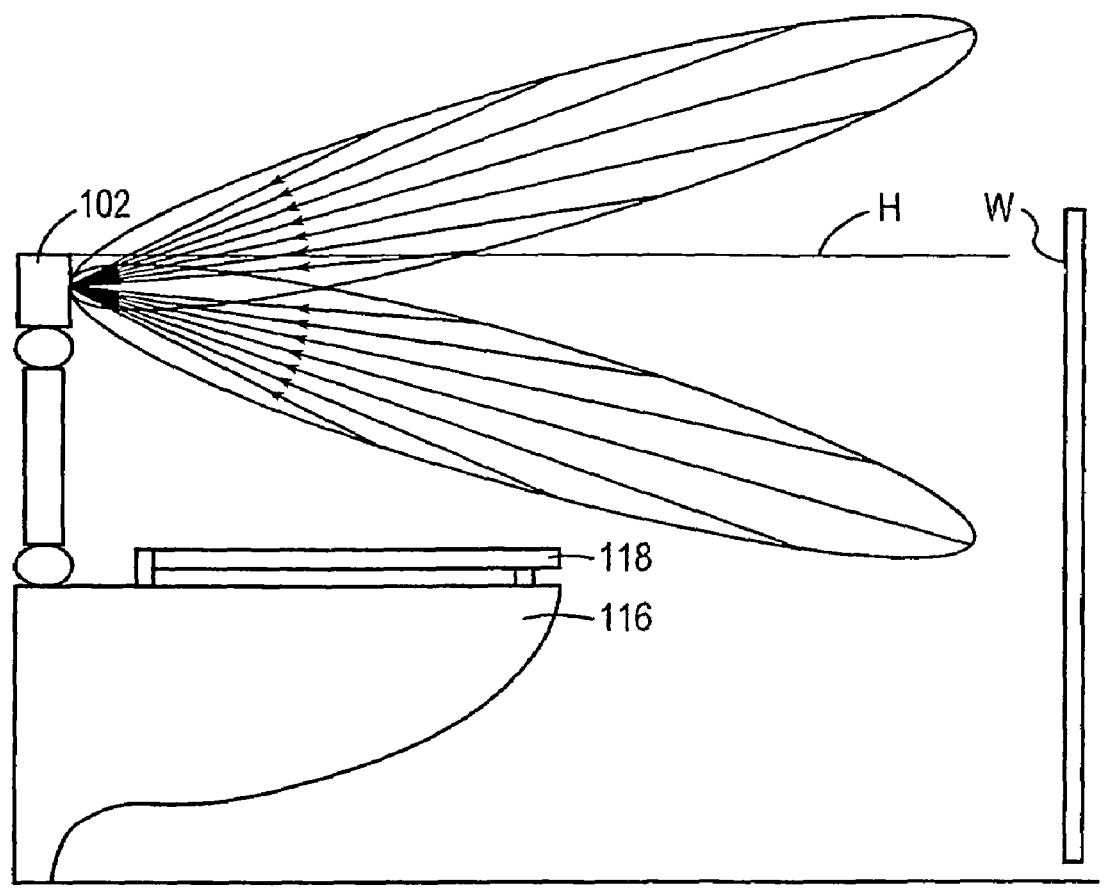
Figure 5C:
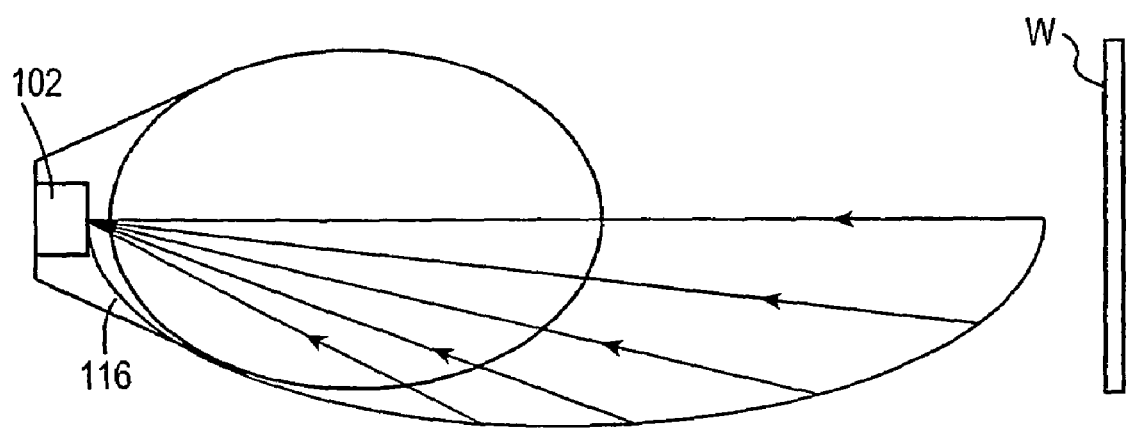

FIGS. 5B and 5C show schematically side and top views of a second optical detection pattern used by the passive optical sensor installed in the automatic toilet flusher of FIG. 4. This detection pattern is shaped by a lens, or another optical element. The pattern is angled both below horizontal (H) and above horizontal (H). Furthermore, the pattern is directed asymmetrically with respect to toilet 116, as shown in FIG. 5C.

Figure 5D:
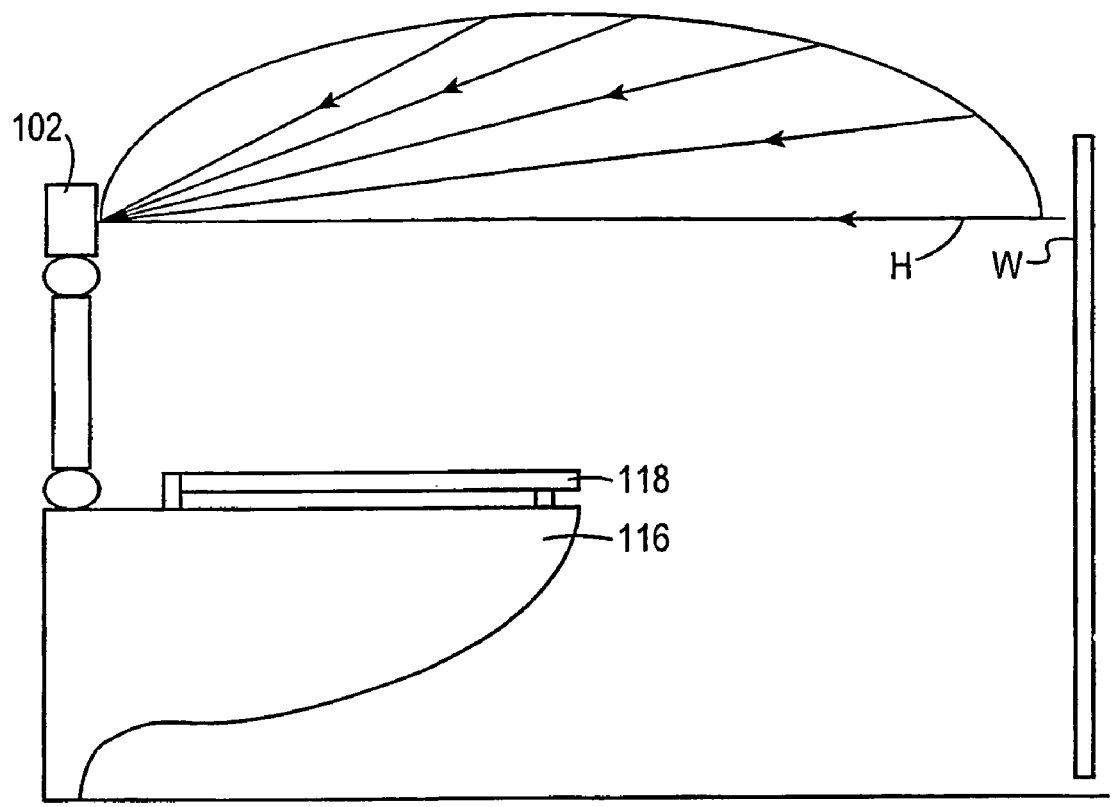
Figure 5E:
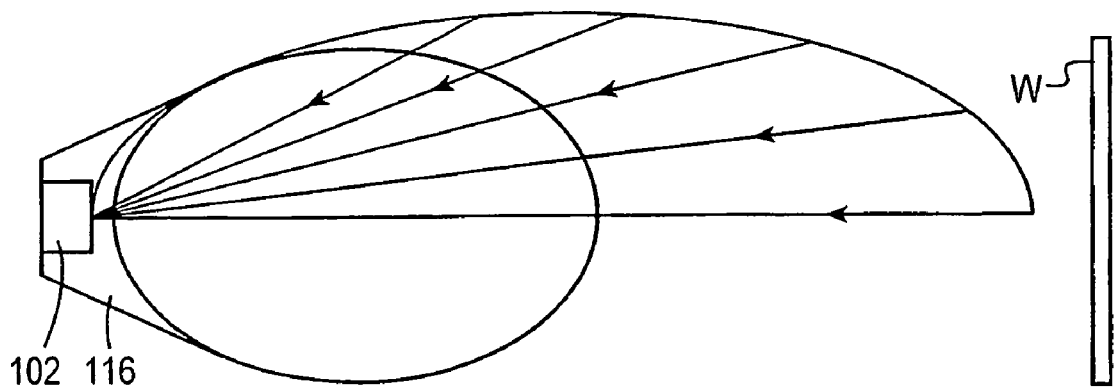

FIGS. 5D and 5E show schematically side and top views of a third optical detection pattern used by the passive optical sensor installed in the automatic toilet flusher of FIG. 4. This detection pattern is again shaped by a lens, or another optical element. The pattern is angled above horizontal (H). Furthermore, the pattern is directed asymmetrically with respect to toilet 116, as shown in FIG. 5E.

Figure 5F:
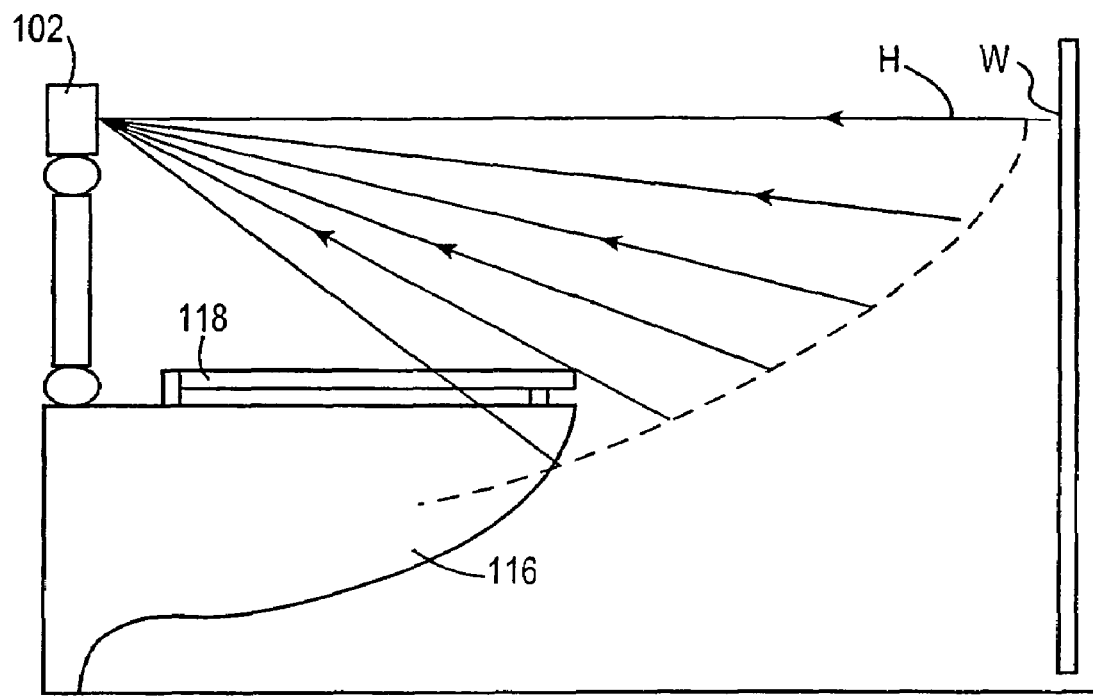
Figure 5G:
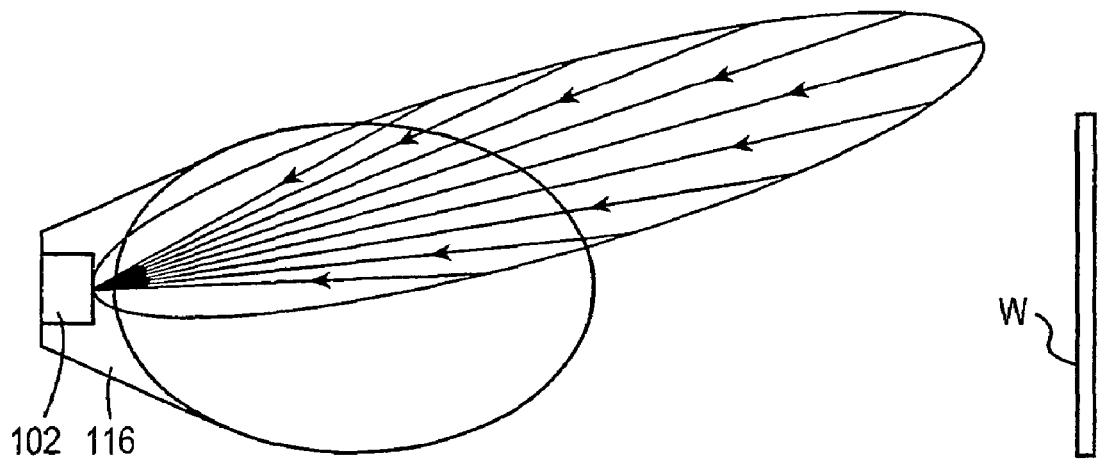

FIGS. 5F and 5G show schematically side and top views of a fourth optical detection pattern used by the passive optical sensor installed in the automatic toilet flusher of FIG. 4. This detection pattern is angled below horizontal (H) and is directed asymmetrically across toilet 116, as shown in FIG. 5G. This detection pattern is particularly useful for "toilet side flushers," described in U.S. application Ser. No. 09/916,468, filed on Jul. 27, 2001, or U.S. application Ser. No. 09/972,496, filed on Oct. 6, 2001, both of which are incorporated by reference.

Figure 5H:
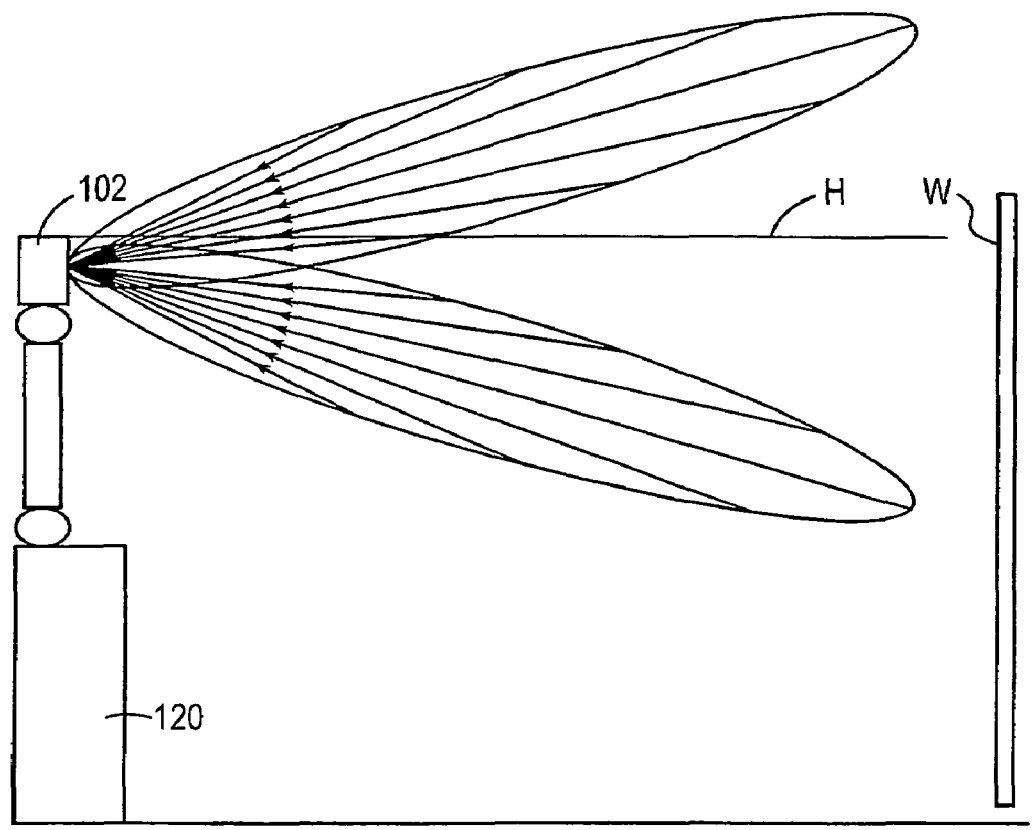
FIGS. 5H, 5I, 5J, 5K and 5L show schematically side and top views of different optical detection patterns used by passive optical sensors employed in the automatic urinal flusher of FIG. 4A.
Figure 5I:
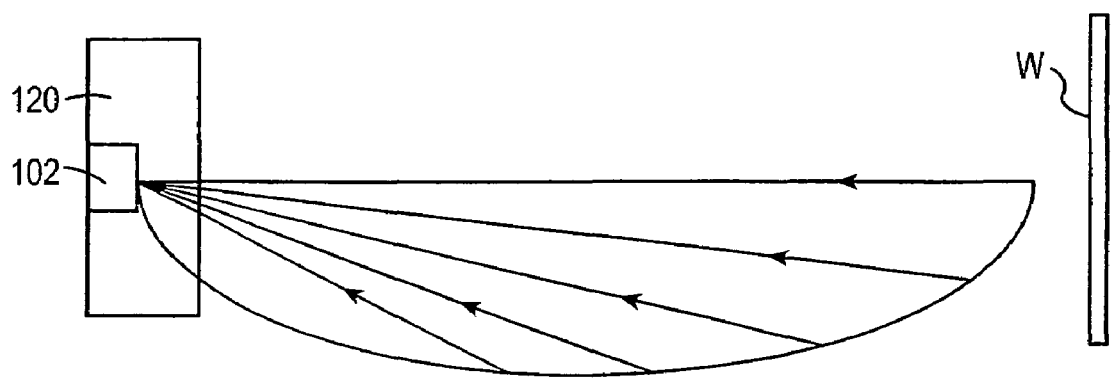

FIGS. 5H and 5I, show schematically side and top views of an optical detection pattern used by the passive optical sensor installed in the automatic urinal flusher of FIG. 4A. This detection pattern is shaped by a lens, or another optical element. The pattern is angled both below horizontal (H) and above horizontal (H) to target ambient light changes caused by a person standing in front of urinal 120. This pattern is directed asymmetrically with respect to urinal 120 (as shown in FIG. 5I), for example, to eliminate or at least reduce light changes caused by a person standing at a neighboring urinal.

Figure 5J:
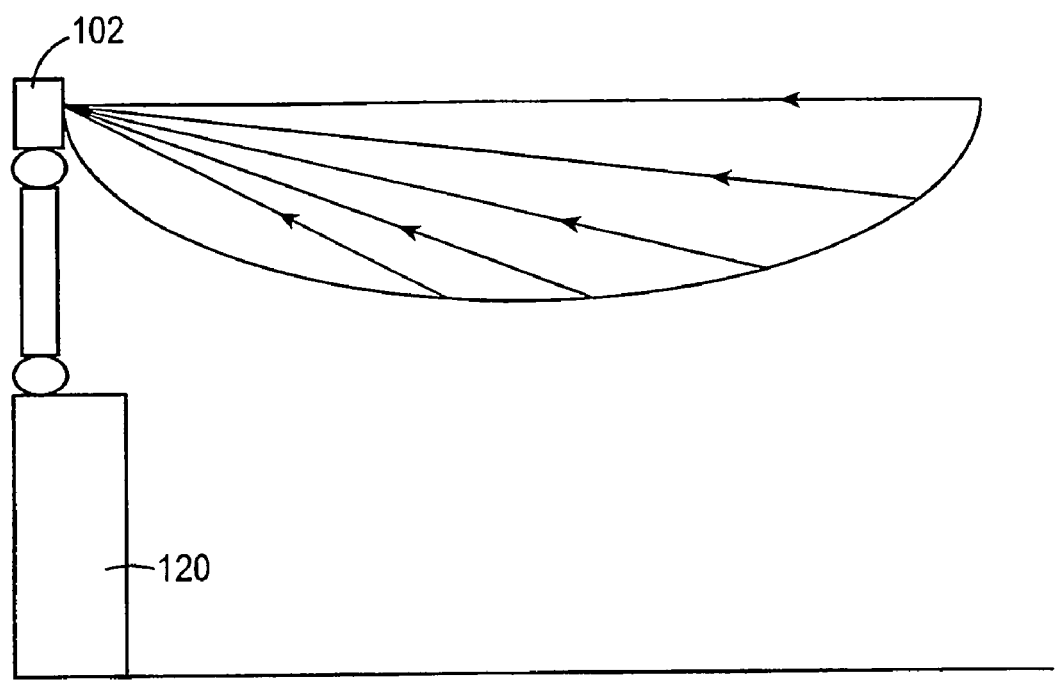
Figure 5K:
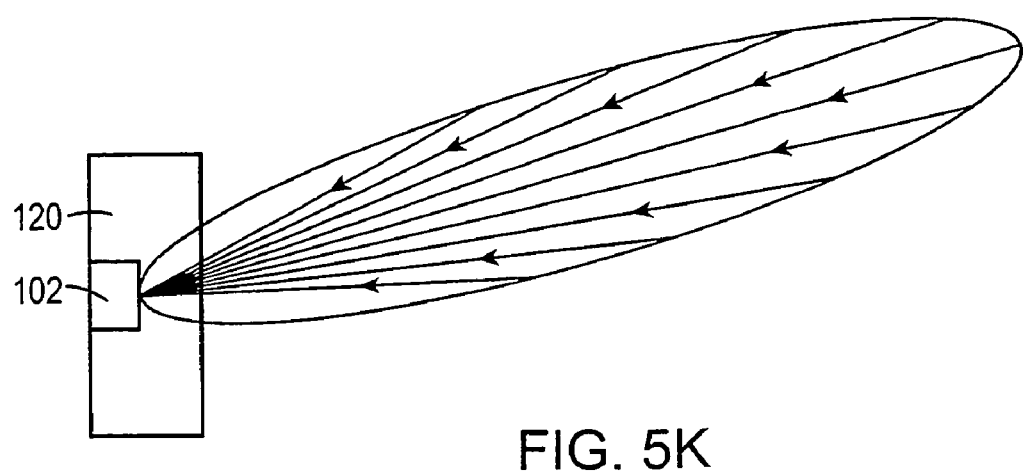
Figure 5L:
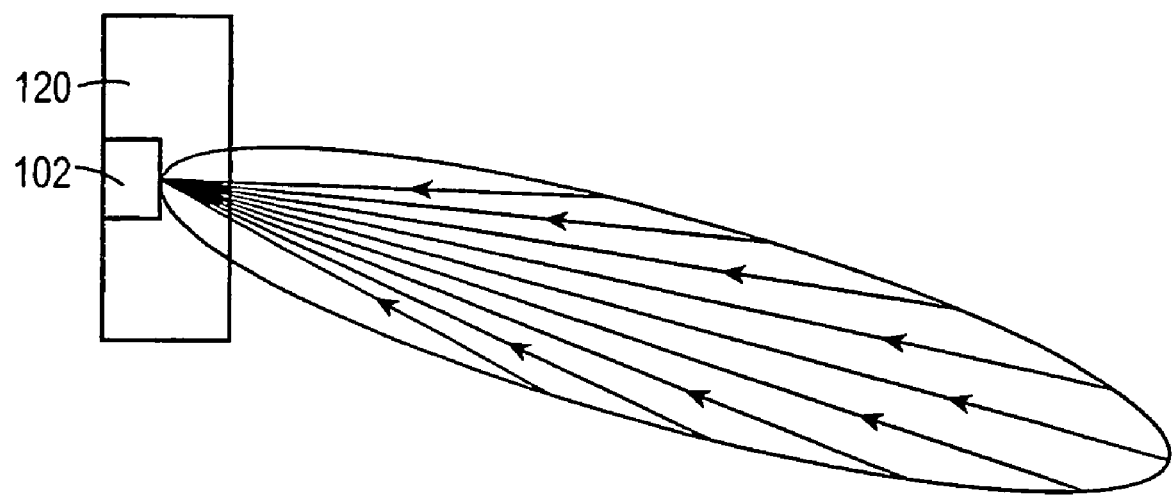

FIGS. 5J, 5K and 5L, show schematically side and top views of another optical detection pattern used by the passive optical sensor installed in the automatic urinal flusher of FIG. 4A. This detection pattern is shaped by a lens, or another optical element, as mentioned above. The pattern is angled below horizontal (H) to eliminate the influence of light caused by a ceiling lamp. This pattern may be directed asymmetrically to the left or to the right with respect to urinal 120 (as shown in FIGS. 5K or 5L). These detection patterns are particularly useful for "urinal side flushers," described in U.S. application Ser. No. 09/916,468, filed on Jul. 27, 2001, or U.S. application Ser. No. 09/972,496, filed on Oct. 6, 2001.

In general, the field of view of a passive optical sensor can be formed using optical elements such as beam forming tubes, lenses, light pipes, reflectors, arrays of pinholes and arrays of slots having selected geometries. These optical elements can provide a down-looking field of view that eliminates the invalid targets such as mirrors, doors, and walls. Various ratios of the vertical field of view to horizontal field of view provide different options for target detection. For example, the horizontal field of view may be 1.2 wider than the vertical field of view or vise versa. A properly selected field of view can eliminate unwanted signal from an adjacent faucet or urinal. The detection algorithm includes a calibration routine that accounts for a selected field of view including the field's size and orientation.

Figure 6C:
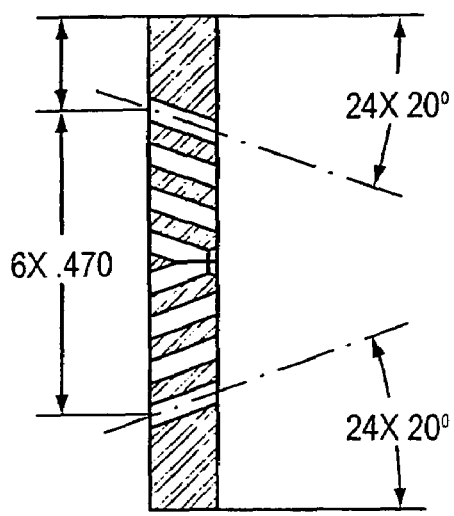
FIGS. 6, 6A, 6B, 6C, 6D and 6E show schematically optical elements used to form the different optical detection patterns shown in FIGS. 3 through 3D and in FIGS. 5 through 5L.
Figure 6B:
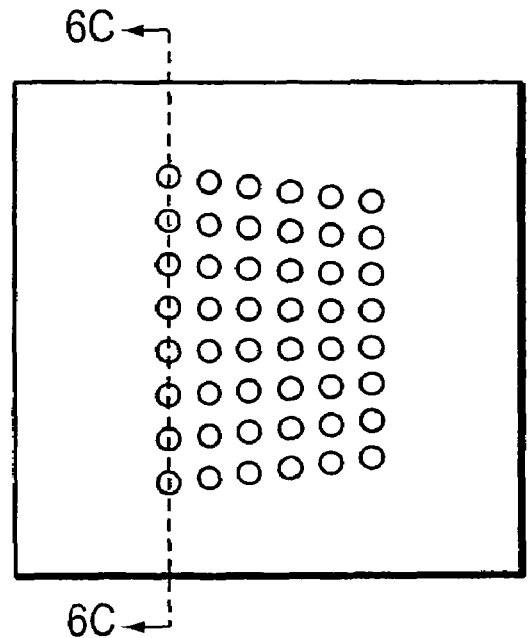
Figure 6A:
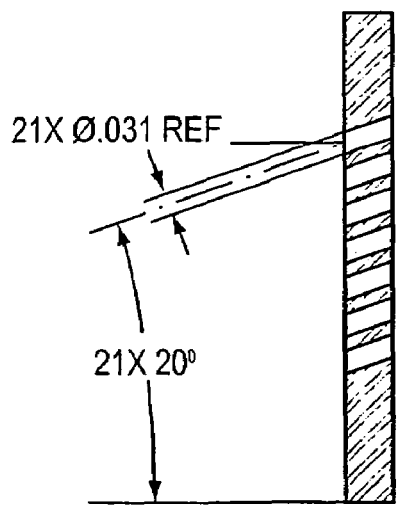
Figure 6:
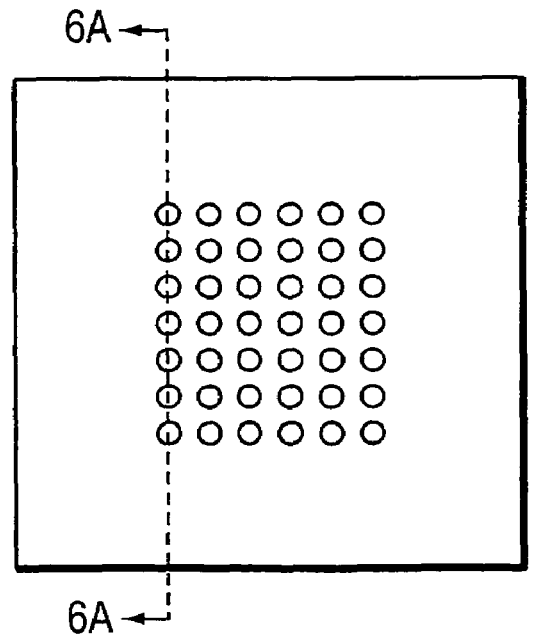
Figure 6D:
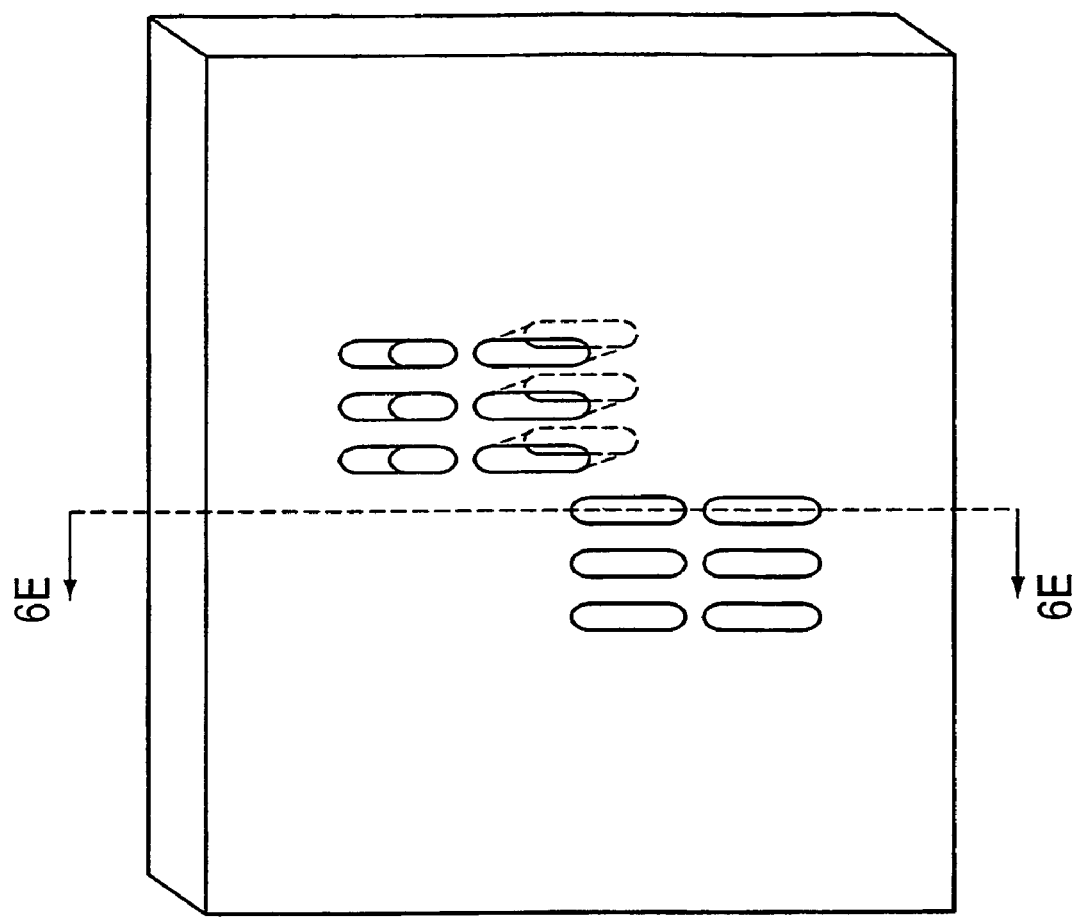
Figure 6E:
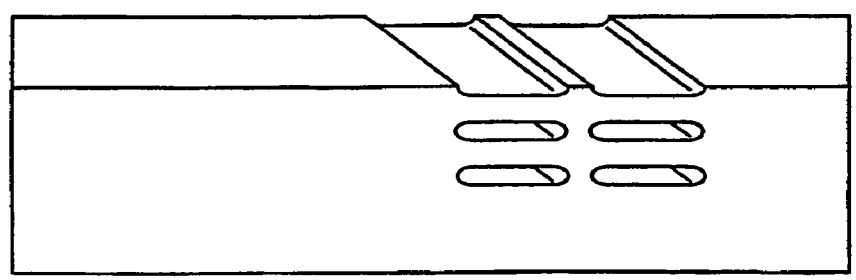

FIGS. 6 through 6E illustrate different optical elements for producing desired detection patterns of the passive sensor. FIGS. 6 and 6B illustrate different arrays of pinholes. The thickness of the plate, the size and the orientation of the pinholes (shown in cross-section in FIGS. 6A and 6C) define the properties of the field of view. FIGS. 6D and 6E illustrate an array of slits for producing a detection pattern shown in FIGS. 5B and 5H. This plate may also include a shutter for covering the top or the bottom detection field.

Figure 7:
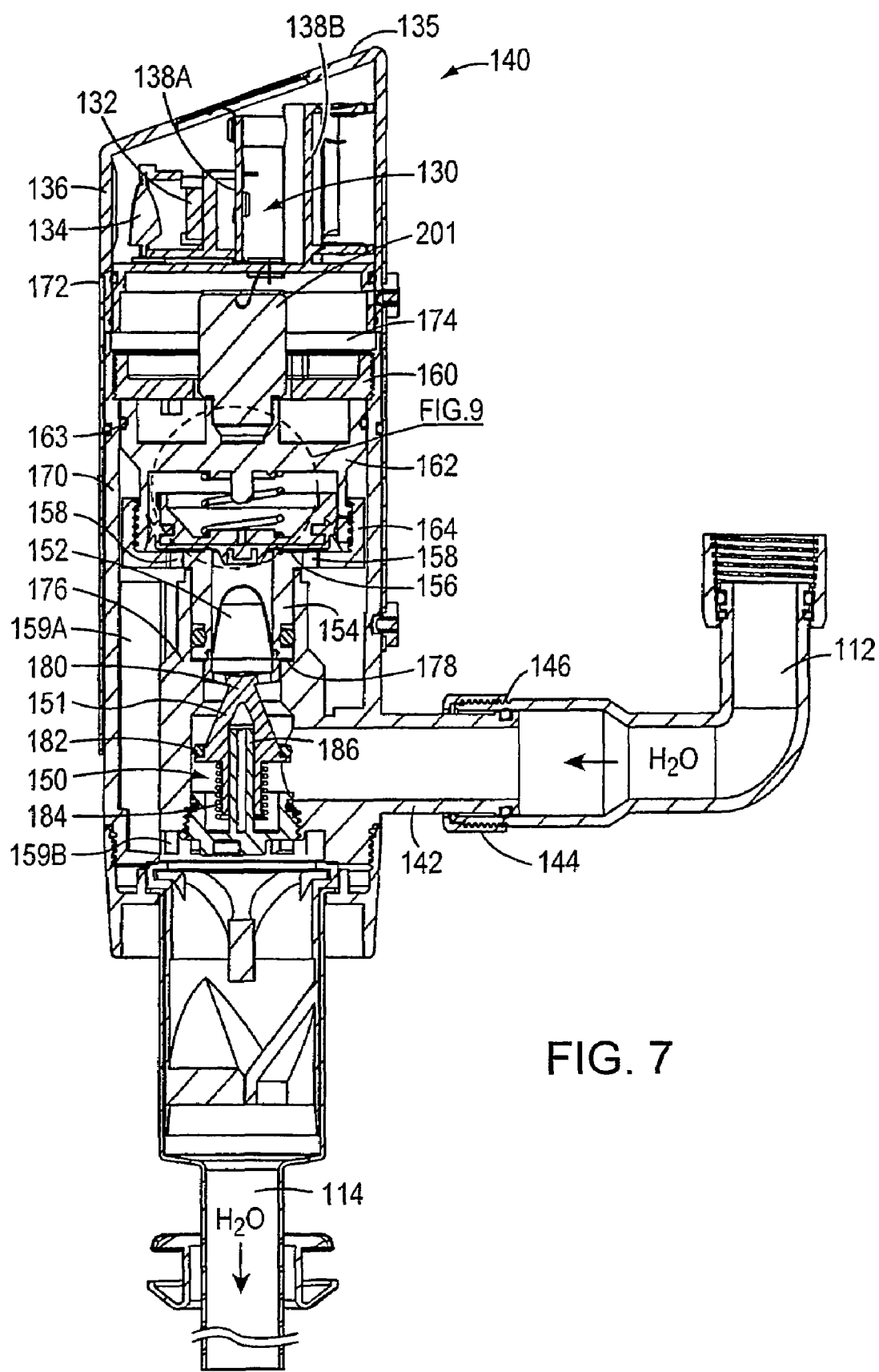
FIG. 7 is a cross-sectional view of an embodiment of an automatic flusher used for flushing toilets or urinals.

FIG. 7 illustrates in detail an automatic flush valve suitable for use with automatic bathroom flusher 100 or automatic bathroom flusher 100A. Other flush valves are described in the above-references PCT applications. Yet other suitable flush valves are described in U.S. Pat. Nos. 6,382,586 and 5,244,179, both of which are incorporated by reference. In each case, the flush valve is controlled by a passive optical sensor described herein.

Referring to FIG. 7, automatic flush valve 140 is a high performance, electronically controlled or manually controlled tankless flush valve. Automatic flush valve 140 uses a passive optical sensor 130 (shown in FIG. 7). Passive optical sensor 130 includes a lens 134 for defining the detection field and providing ambient light to a light receiver 132. Plastic enclosure 135 includes an optical window 136, which may also include optical elements described in connection with FIGS. 6-6E. The controller is located on a circuit board 138. Plastic enclosure 135 also houses the batteries for powering the entire flushing system.

Referring still to FIG. 7, flush valve 140, includes an input union 112, preferably made of a suitable plastic resin. Union 112 is attached via threads to an input fitting that interacts with the building water supply system. Furthermore, union 112 is designed to rotate on its own axis when no water is present so as to facilitate alignment with the inlet supply line. Union 112 is attached to an inlet pipe 142 by a fastener 144 and a radial seal 146, which enables union 12 to move in or out along inlet pipe 142. This movement aligns the inlet to the supply line. However, with fastener 144 secured, there is a water pressure applied by the junction of union 112 to inlet 142. This forms a unit that is rigid sealed through seal 146. The water supply travels through union 112 to inlet 142 and thru the inlet valve assembly 150 an inlet screen filter 152, which resides in a passage formed by member 178 and is in communication with a main valve seat 156. The operation of the entire main valve can be better understood by also referring to FIGS. 9, and 9A.

As also described in connection with FIGS. 8, 9, and 9A, electro-magnetic actuator 201 controls operation of the main valve, which is a "fram piston valve" 270. In the opened state, water flows thru a passage 152 and thru passages 158 into passages 159A and 159B, into main outlet 114. In the closed state, the fram element 278 (FIGS. 9 and 9A) seals the valve main seat 156 thereby closing flow through passage 158. Automatic flusher 140 includes an adjustable input valve 150 controlled by rotation of a valve element 174 threaded together with valve elements 162 and 164. Valve elements 162 and 164 are sealed from body 170 via one or several o-rings 163. Furthermore, valve elements 162 and 164 are held down by threaded element 160, when element 174 is threaded all the way. This force is transferred to element 154 and 178. The resulting force presses down element 180

When valve element 160 is unthreaded all the way, valve assembly 150 and 151 moves up due to the force of spring 184 located on guide element 186 in this adjustable input valve. The spring force combined with inlet fluid pressure from pipe 142 forces element 151 against the valve seat in contact with O-ring 182 resulting in a sealing action of the O-ring 182. O-Ring 182 (or another sealing element) blocks the flow of water to inner passage of 152, which in turn enables servicing of all internal valve element including elements behind shut-off valve 150 without the need to shut off the water supply at the inlet 112. This is a major advantage of this embodiment.

According to another function of adjustable valve 140, the threaded retainer is fastened part way resulting in valve body elements 162 and 162 to push down the valve seat only partially. There is a partial opening that provides a flow restriction reducing the flow of input water thru valve 150. This novel function is designed to meet application specific requirements. In order to provide for the installer the flow restriction, the inner surface of the valve body includes application specific marks such as 1.6 W.C 1.0 GPF urinals etc. for calibrating the input water flow.

Automatic flush valve 140 is equipped with the above-described sensor-based electronic system located in housing 135. Alternatively, the sensor-based electronic flush system may be replaced by an all mechanical activation button or lever. Alternatively, the flush valve may be controlled by a hydraulically timed mechanical actuator that acts upon a hydraulic delay arrangement, as described in PCT Application PCT/US01/43273, which is incorporated by reference. The hydraulic system can be adjusted to a delay period corresponding to the needed flush volume for a given fixture such a 1.6 GPF W.C etc. The hydraulic delay mechanism can open the outlet orifice of the pilot section instead of electromagnetic actuator 201 for duration equal to the installer preset value.

Referring again to FIG. 7, depending on the passive optical sensor signal, the microcontroller executes a control algorithm and provides ON and OFF signals to valve actuator 201, which, in turn, opens or closes water delivery. The microcontroller can also execute a half flush or delayed flush depending on the mode of use (e.g., a toilet, a urinal, a frequently used urinal as in a ball park). The microcontroller can also execute a timed flush (one flush per day or per week in facilities such as ski resorts in summer) to prevent drying of the water trap.

Figure 8B:
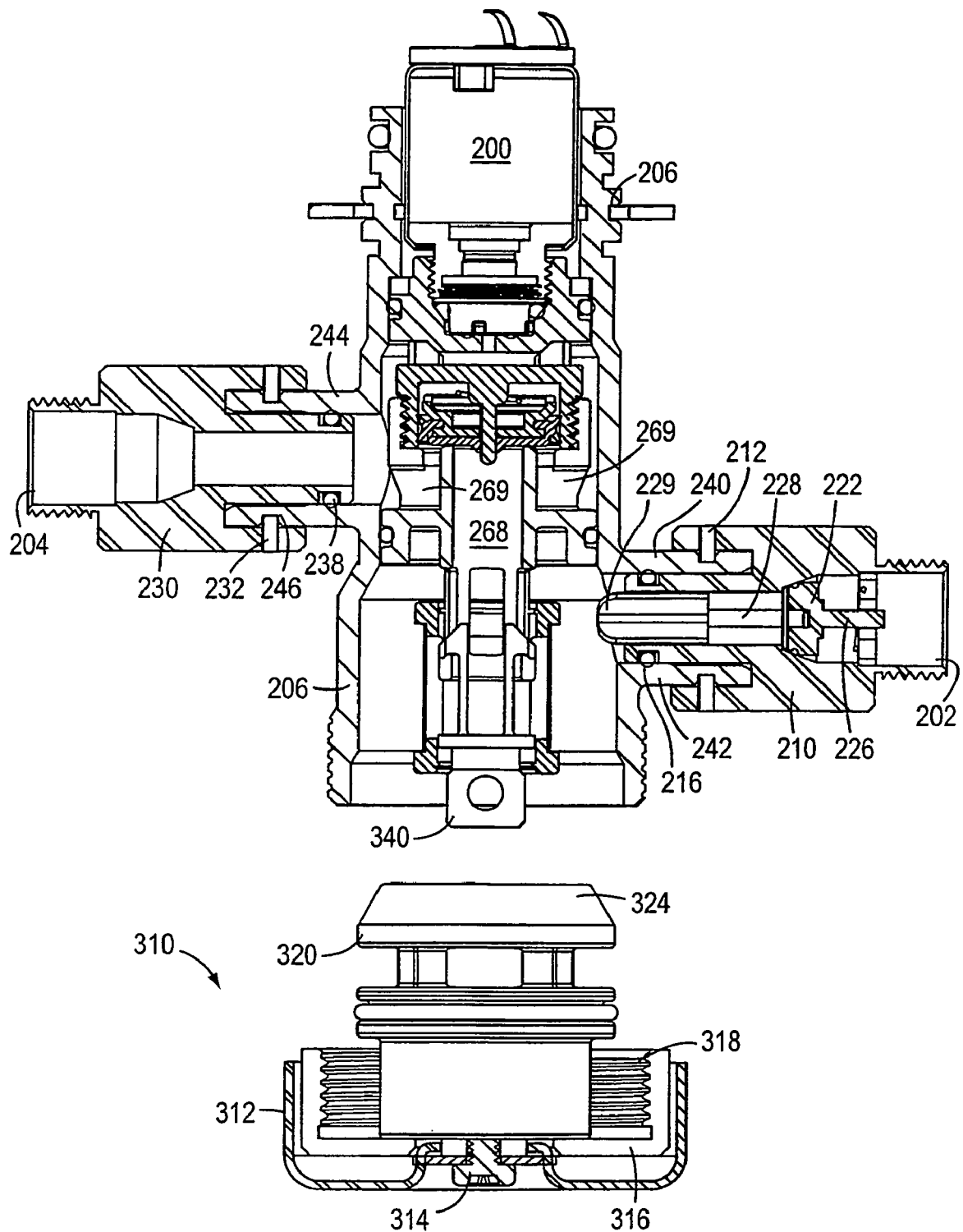
FIG. 8B is an enlarged cross-sectional view of the valve device shown in FIG. 8A, but partially disassembled for servicing.

FIGS. 8, 8A and 8B illustrate an automatic valve 38 constructed and arranged for controlling water flow in automatic faucet 10. Specifically, automatic valve 38 receives water at a valve input port 202 and provides water from a valve output port 204, in the open state. Automatic valve 38 includes a body 206 made of a durable plastic or metal. Preferably, valve body 206 is made of a plastic material but includes a metallic input coupler 210 and a metallic output coupler 230. Input and output couplers 210 and 230 are made of metal (such as brass, copper or steel) so that they can provide gripping surfaces for a wrench used to connect them to water lines 24 and 25, respectively. Valve body 206 includes a valve input port 240, and a valve output port 244, and a cavity 207 for receiving the individual valve elements shown in FIG. 8.

Metallic input coupler 210 is rotatably attached to input port 240 using a metal C-clamp 212 that slides into a slit 214 inside input coupler 210 and also a slit 242 inside the body of input port 240 (FIG. 8). Metallic output coupler 230 is rotatably attached to output port 244 using a metal C-clamp 232 that slides into a slit 234 inside output coupler 230 and also a slit 246 inside the body of output port 244. When servicing the faucet 12, this rotatable arrangement prevents tightening the water line connection to any of the two valve couplers unless attaching the wrench to the designated surfaces of couplers 210 and 230. (That is, a service person cannot tighten the water input and output lines by gripping on valve body 206.) This protects the relatively softer plastic body 206 of automatic valve 38. However, body 206 can be made of a metal in which case the above-described rotatable coupling is not needed. A sealing O-ring 216 seals input coupler 210 to input port 240, and a sealing O-ring 238 seals output coupler 230 to input port 244.

Referring to FIGS. 8, 8A, and 8B, metallic input coupler 210 includes an inlet flow adjuster 220 cooperatively arranged with a flow control mechanism 310 (FIG. 8). Inlet flow adjuster 220 includes an adjuster piston 222, a closing spring 224 arranged around an adjuster pin 226 and pressing against a pin retainer 218. Input flow adjuster 220 also includes an adjuster rod 228 coupled to and displacing adjuster piston 222. Flow control mechanism 310 includes a spin cap 312 coupled by screw 314 to an adjustment cap 316 in communication with a flow control cam 320. Flow control cam 320 slides linearly inside body 206 upon turning adjustment cap 316. Flow control cam 320 includes inlet flow openings 321, a locking mechanism 323 and a chamfered surface 324. Chamfered surface 324 is cooperatively arranged with a distal end 229 of adjuster rod 228. The linear movement of flow control cam 320, within valve body 206, displaces chamfered surface 324 and thus displaces adjuster rod 228. Adjuster piston 222 also includes an inner surface 223 cooperatively arranged with an inlet seat 211 of input coupler 210. The linear movement of adjuster rod 228 displaces adjuster piston 222 between a closed position and an open position. In the closed position, sealing surface 223 seals inner seat 211 by the force of closing spring 224. In the opened position, adjuster rod 228 displaces adjuster pin 222 against closing spring 224 thereby providing a selectively sized opening between inlet seat 211 and sealing surface 223. Thus, by turning adjustment cap 316, adjuster rod 228 opens and closes inlet adjuster 220. Inlet adjuster 220 controls or closes completely the water flow from water line 24. The above-described manual adjustment can be replaced by an automatic motorized adjustment mechanism controlled by a microcontroller.

Referring still to FIGS. 8, 8A and 8B, automatic valve 38 also includes a removable inlet filter 330 removably located over an inlet filter holder 332, which is part of the lower valve housing. Inlet filter holder 332 also includes an O-ring and a set of outlet holes 267 shown in FIG. 8. The "fram piston" 270 is shown in detail in FIGS. 9 and 9A. Referring again to FIG. 8A, water flows from input port 202 of input coupler 210 through inlet flow adjuster 220 and then through inlet flow openings 321, and through inlet filter 330 inside inlet filter holder 332. Water then arrives at an input chamber 268 inside a cylindrical input element 276 providing pressure against a pliable member 278 (FIG. 9).

Automatic valve 38 also includes a service loop 340 (or a service rod) designed to pull the entire valve assembly, including attached actuator 200, out of body 206, after removing of plug 316. The removal of the entire valve assembly also removes the attached actuator 200 (or actuator 201) and the piloting button described in PCT Application PCT/US02/38757 and in PCT Application PCT/US02/38757, both of which are incorporated by reference. To enable easy installation and servicing, there are rotational electrical contacts located on a PCB at the distal end of actuator 200. Specifically, actuator 200 includes, on its distal end, two annular contact regions that provide a contact surface for the corresponding pins, all of which can be gold plated for achieving high quality contacts. Alternatively, a stationary PCB can include the two annular contact regions and the actuator may be connected to movable contact pins. Such distal, actuator contact assembly achieves easy rotational contacts by just sliding actuator 200 located inside valve body 206.

Figure 8C:
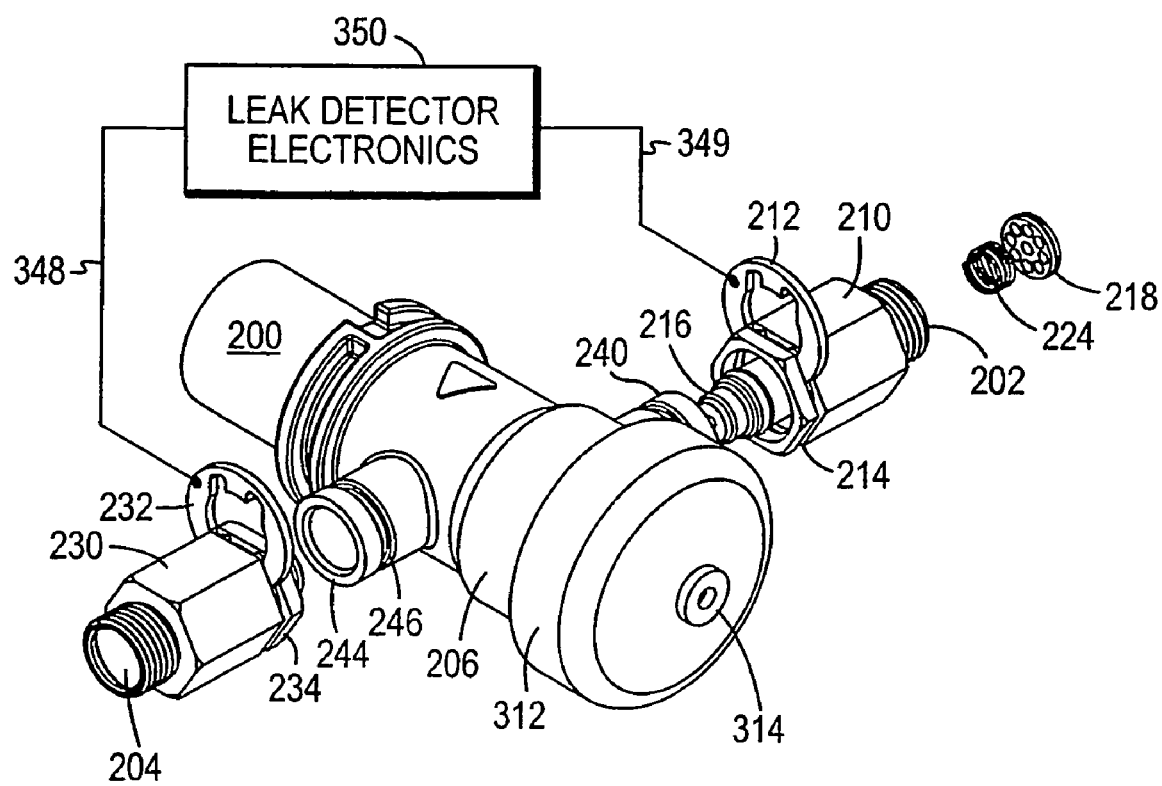
FIG. 8C is a perspective view of the valve device of FIG. 4, including a leak detector for detecting water leaks in an automatic faucet system.

FIG. 8C illustrates automatic valve 38 including a leak detector for indicating a water leak or water flow across valve device 38. The leak detector includes an electronic measurement circuit 350 and at least two electrodes 348 and 349 coupled respectively to input coupler 210 and output coupler 230. (The leak detector may also include four electrodes for a four-point resistivity measurement). Valve body 206 is made of plastic or another non-conductive material. In the closed state, when there is no water flow between input coupler 210 and output coupler 230, electronic circuit 350 measures a very high resistance value between the two electrodes. In the open state, the resistance value between input coupler 210 and output coupler 230 drops dramatically because the flowing water provides a conductive path.

There are various embodiments of electronics 350, which can provide a DC measurement, an AC measurement including eliminating noise using a lock-in amplifier (as known in the art). Alternatively, electronics 350 may include a bridge or another measurement circuit for a precise measurement of the resistivity. Electronic circuit 350 provides the resistivity value to a microcontroller and thus indicates when valve 38 is in the open state. Furthermore, the leak detector indicates when there is an undesired water leak between input coupler 210 and output coupler 230. The entire valve 38 is located in an isolating enclosure to prevent any undesired ground paths that would affect the conductivity measurement. Furthermore, the leak detector can indicate some other valve failures when water leaks into the enclosure from valve 38. Thus, the leak detector can sense undesired water leaks that would be otherwise difficult to observe. The leak detector is constructed to detect the open state of the automatic faucet system to confirm proper operation of actuator 200.

Automatic valve 38 may include a standard diaphragm valve, a standard piston valve, or a novel "fram piston" valve 270 explained in detail in connection with FIGS. 9 and 9A. Referring to FIG. 9, valve 270 includes a distal body 276, which includes an annular lip seal 275 arranged, together with pliable member 278, to provide a seal between input port chamber 268 and output port chamber 269. The distal body 276 also includes one or several flow channels 267 (also shown in FIG. 8) providing communication (in the open state) between input chamber 268 and output chamber 269. Pliable member 278 also includes sealing members 279A and 279B arranged to provide a sliding seal, with respect to valve body 272, between pilot chamber 292 and output chamber 271. There are various possible embodiments of seals 279A and 279B (FIG. 9). This seal may be a one-sided seal or a two-sided seal as 279A and 279B shown in FIG. 9. Furthermore, there are various additional embodiments of the sliding seal including O-rings, etc.

The present invention envisions valve device 270 having various sizes. For example, the "full" size embodiment has the pin diameter A=0.070", the spring diameter B=0.310", the pliable member diameter C=0.730", the overall fram and seal's diameter D=0.412", the pin length E=0.450", the body height F=0.2701", the pilot chamber height G=0.220", the fram member size H=0.160", and the fram excursion I=0.100". The overall height of the valve is about 1.35" and diameter is about 1.174".

The "half size" embodiment of the "fram piston" valve has the following dimensions provided with the same reference letters. In the "half size" valve A=0.070", B=0.30, C=0.560", D=0.650", E=0.34", F=0.310", G=0.215", H=0.125", and I=0.60". The overall length of the ½ embodiment is about 1.350" and the diameter is about 0.455". Different embodiments of the "fram piston" valve device may have various larger or smaller sizes.

Figure 9:
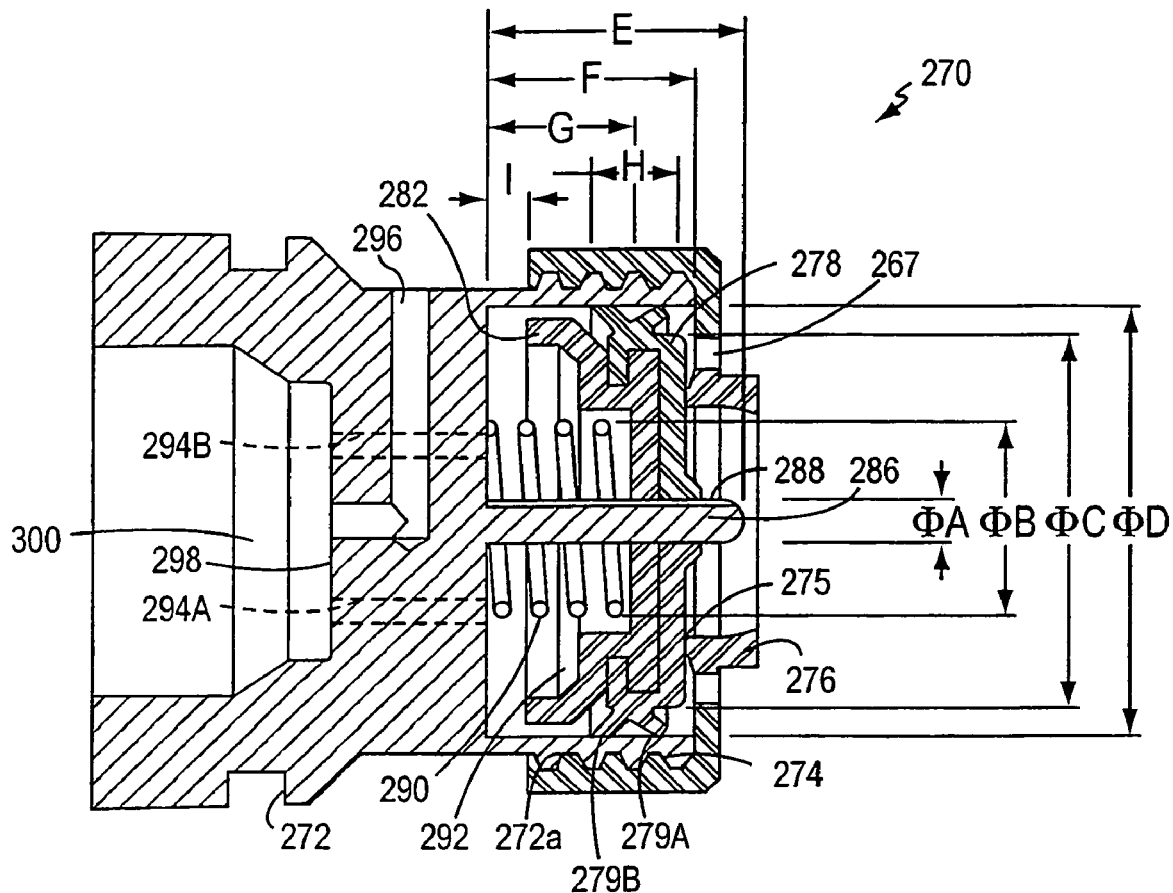
FIG. 9 is an enlarged cross-sectional view of a moving piston-like member used in the valve device shown in FIG. 7 or the valve device shown in FIGS. 8, 8A, and 8B.
Figure 9A:
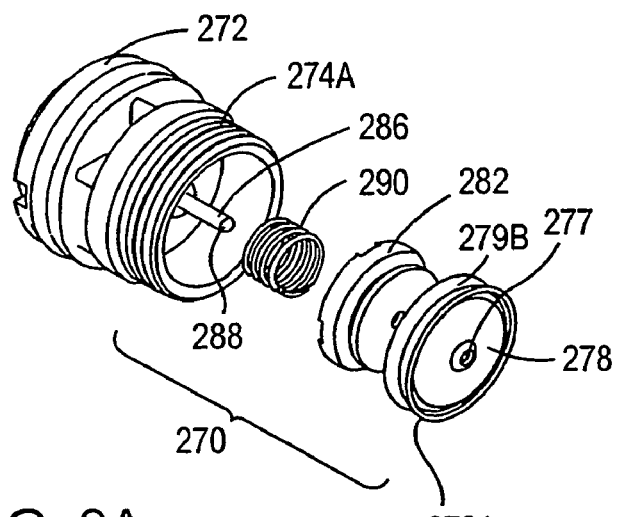
FIG. 9A is a detailed perspective view of the moving piston-like member shown in FIG. 9.

Referring to FIGS. 9 and 9A, the fram piston valve 270 receives fluid at input port 268, which exerts pressure onto diaphragm-like member 278 providing a seal together with a lip member 275 in a closed state. Groove passage 288 inside pin 286 provides pressure communication with pilot chamber 292, which is in communication with actuator cavity 300 via communication passages 294A and 294B. An actuator (described in PCT Application PCT/US02/38757) provides a seal at surface 298 thereby sealing passages 294A and 294B and thus pilot chamber 300. When the plunger of actuator 200 moves away from surface 298, fluid flows via passages 294A and 294B to control passage 296 and to output port 269. This causes pressure reduction in pilot chamber 292. Therefore, diaphragm-like member 278 and piston-like member 288 move linearly within cavity 292, thereby providing a relatively large fluid opening at lip seal 275. A large volume of fluid can flow from input port 268 to output port 269.

When the plunger of actuator 200 seals control passages 294A and 294B, pressure builds up in pilot chamber 292 due to the fluid flow from input port 268 through "bleed" groove 288 inside guide pin 286. The increased pressure in pilot chamber 292 together with the force of spring 290 displace linearly, in a sliding motion over guide pin 286, from member 270 toward sealing lip 275. When there is sufficient pressure in pilot chamber 292, diaphragm-like pliable member 278 seals input port chamber 268 at lip seal 275. The soft member 278 includes an inner opening that is designed with guiding pin 286 to clean groove 288 during the sliding motion. That is, groove 288 of guiding pin 286 is periodically cleaned.

The embodiment of FIG. 9 shows the valve having a central input chamber 268 (and guide pin 286) symmetrically arranged with respect to vent passages 294A and 294B (and the location of the plunger of actuator 200). However, the valve device may have input chamber 268 (and guide pin 286) non-symmetrically arranged with respect to passages 294A, 294B and output vent passage 296. That is, in such a design, this valve has input chamber 268 and guide pin 286 non-symmetrically arranged with respect to the location of the plunger of actuator 200. The symmetrical and non-symmetrical embodiments are equivalent.

Automatic valve 38 has numerous advantages related to its long term operation and easy serviceability. Automatic valve 38 includes inlet adjusted 220, which enable servicing of the valve without shutting of the water supply at another location. The construction of valve 38 including the inner dimensions of cavity 207 and actuator 200 enable easy replacement of the internal parts. A service person can remove screw 314 and spin cap 312, and then remove adjustment cap 316 to open valve 38. Valve 38 includes service loop 340 (or a service rod) designed to pull the entire valve assembly, including attached actuator 200, out of body 206. The service person can then replace any defective part, including actuator 200, or the entire assembly and insert the repaired assembly back inside valve body 206. Due to the valve design, such repair would take only few minutes and there is no need to disconnect valve 38 from the water line or close the water supply. Advantageously, the "fram piston" design 270 provides a large stroke and thus a large water flow rate relative to its size.

Another embodiment of the "fram piston" valve device is described in PCT applications PCT/US02/34757, filed Dec. 4, 2002, and PCT/US03/20117, filed Jun. 24, 2003, both of which are incorporated by reference as if fully reproduced herein. Again, the entire operation of this valve device is controlled by a single solenoid actuator that may be a latching solenoid actuator or an isolated actuator described in PCT application PCT/US01/51054, filed on Oct. 25, 2001, which is incorporated by reference as if fully reproduced herein.

Figure 10:
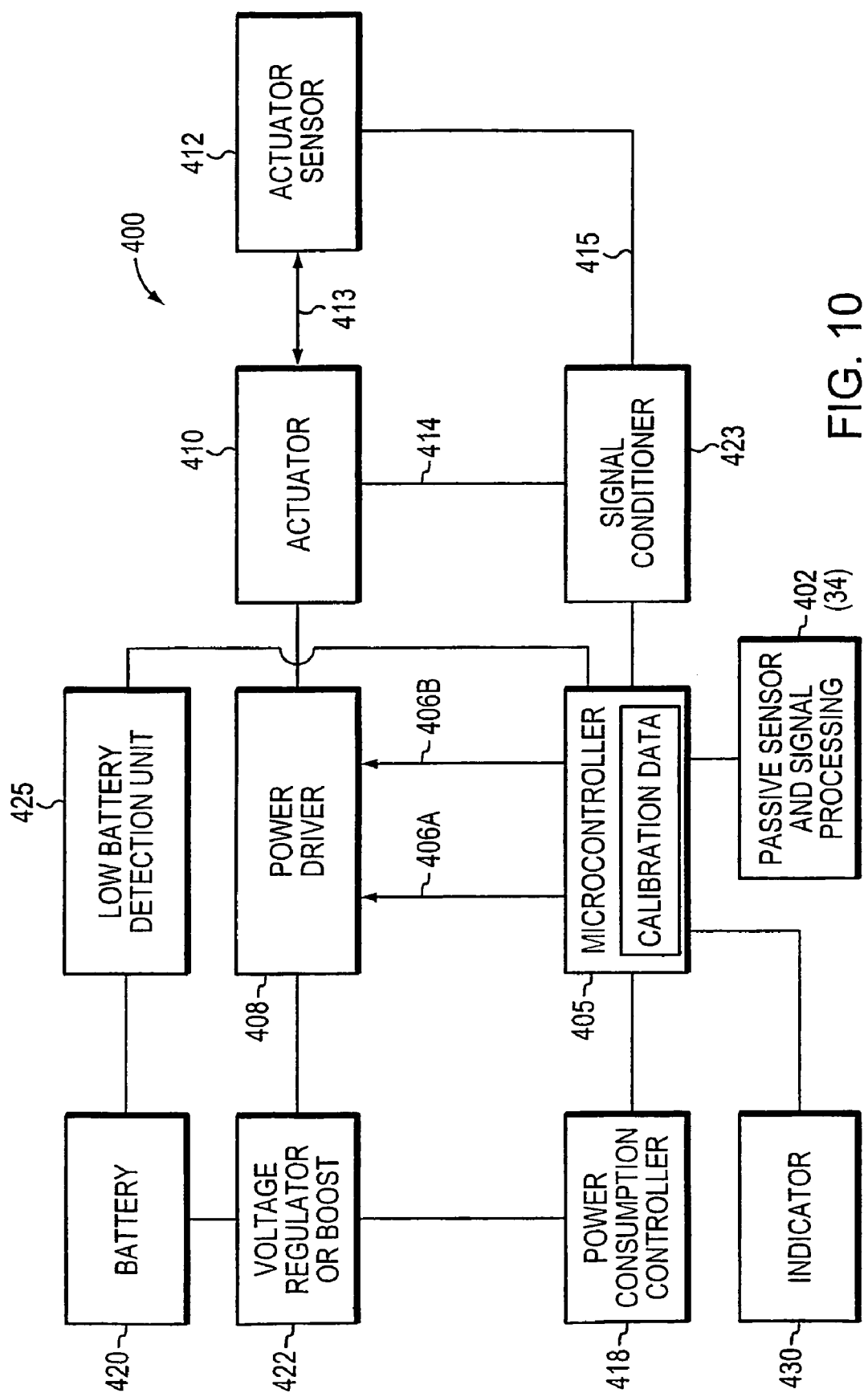
FIG. 10 is block diagram of a control system for controlling a valve operating the automatic faucet systems of FIGS. 1 through 2A, or bathroom flushers of FIGS. 4 and 4A.

FIG. 10 schematically illustrates control electronics 400, powered by a battery 420. Control electronics 400 includes battery regulation unit 422, no or low battery detection unit 425, passive sensor and signal processing unit 402, and the microcontroller 405. Battery regulation unit 422 provides power for the whole controller system. It provides 6.0 V power through 6.0V power 1 to "no battery" Detector; it provides 6.0 V power to low battery detector; it also provides 6.0 V to power driver 408. It provides a regulated 3.0 V power to microcontroller 405.

"No battery" detector generates pulses to microcontroller 405 in form of "Not Battery" signals to notify microcontroller 405. Low Battery detector is coupled to the battery/power regulation through the 6.0V power. When power drops below 4.2V, the detector generates a pulse to the microcontroller (i.e., low battery signal). When the "low battery" signal is received, microcontroller will flash indicator 430 (e.g., an LED) with a frequency of 1 Hz, or may provide a sound alarm. After flushing 2000 times under low battery conditions, microcontroller will stop flushing, but still flash the LED.

As described in connection with FIG. 10B, passive sensor and signal processing module 402 converts the resistance of a photoresistor to a pulse, which is sent to microcontroller through the charge pulse signal. The pulse width changes represent the resistance changes, which in turn correspond to the illumination changes. The control circuit also includes a clock/reset unit that provides clock pulse generation, and it resets pulse generation. It generates a reset pulse with 4 Hz frequency, which according to the clock pulse, is the same frequency. The reset signal is sent to microcontroller 405 through "reset" signal to reset the microcontroller or wake up the microcontroller from sleep mode.

A manual button switch may be formed by a reed switch, and a magnet. When the button is pushed down by a user, the circuitry sends out a signal to the clock/reset unit through manual signal IRQ, then forces the clock/reset unit to generate a reset signal. At the same time, the level of the manual signal level is changed to acknowledge to microcontroller 405 that it is a valid manual flush signal.

Referring still to FIG. 10, control electronics 400 receives signals from optical sensor unit 402 and controls an actuator 412, a controller or microcontroller 405, an input element (e.g., the optical sensor), a solenoid driver 408 (power driver) receiving power from a battery 420 regulated by a voltage regulator 422. Microcontroller 405 is designed for efficient power operation. To save power, microcontroller 405 is initially in a low frequency sleep mode and periodically addresses the optical sensor to see if it was triggered. After triggering, the microcontroller provides a control signal to a power consumption controller 418, which is a switch that powers up voltage regulator 422 (or a voltage boost 422), optical sensor unit 402, and a signal conditioner 416. (To simplify the block diagram, connections from power consumption controller 418 to optical sensor unit 402 and to signal conditioner 416 are not shown.)

Microcontroller 405 can receives an input signal from an external input element (e.g., a push button) that is designed for manual actuation or control input for actuator 410. Specifically, microcontroller 405 provides control signals 406A and 406B to power driver 408, which drives the solenoid of actuator 410. Power driver 408 receives DC power from battery and voltage regulator 422 regulates the battery power to provide a substantially constant voltage to power driver 408. An actuator sensor 412 registers or monitors the armature position of actuator 410 and provides a control signal 415 to signal conditioner 416. A low battery detection unit 425 detects battery power and can provide an interrupt signal to microcontroller 405.

Actuator sensor 412 provides data to microcontroller 405 (via signal conditioner 416) about the motion or position of the actuator's armature and this data is used for controlling power driver 408. The actuator sensor 412 may be an electromagnetic sensor (e.g., a pick up coil) a capacitive sensor, a Hall effect sensor, an optical sensor, a pressure transducer, or any other type of a sensor.

Preferably, microcontroller 405 is an 8-bit CMOS microcontroller TMP86P807M made by Toshiba. The microcontroller has a program memory of an 8 Kbytes and a data memory of 256 bytes. Programming is done using a Toshiba adapter socket with a general-purpose PROM programmer. The microcontroller operates at 3 frequencies ($f_c$=16 MHz, $f_c$=8 MHz and $f_s$=332.768 kHz), wherein the first two clock frequencies are used in a normal mode and the third frequency is used in a low power mode (i.e., a sleep mode). Microcontroller 405 operates in the sleep mode between various actuations. To save battery power, microcontroller 405 periodically samples optical sensor 402 for an input signal, and then triggers power consumption controller 418. Power consumption controller 418 powers up signal conditioner 416 and other elements. Otherwise, optical sensor 402, voltage regulator 422 (or voltage boost 422) and a signal conditioner 416 are not powered to save battery power. During operation, microcontroller 405 also provides indication data to an indicator 430. Control electronics 400 may receive a signal from the passive optical sensor or the active optical sensor described above. The passive optical sensor includes only a light detector providing a detection signal to microcontroller 405.

Low battery detection unit 425 may be the low battery detector model no. TC54VN4202EMB, available from Microchip Technology. Voltage regulator 422 may be the voltage regulator part no. TC55RP3502EMB, also available from Microchip Technology (http://www.microchip.com). Microcontroller 405 may alternatively be a microcontroller part no. MCU COP8SAB728M9, available from National Semiconductor.

Figure 10A:
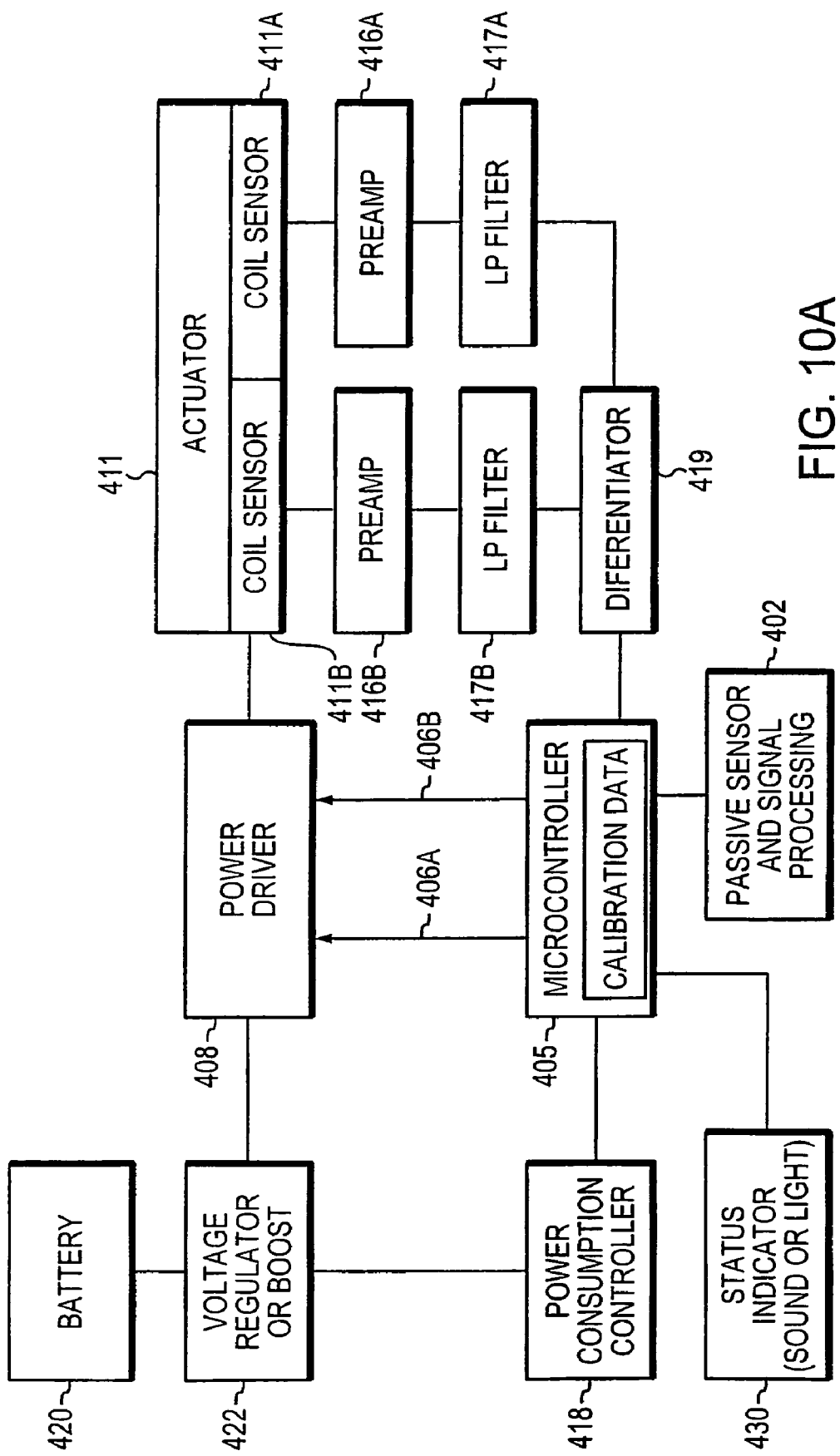
FIG. 10A is block diagram of another control system for controlling a valve operating the automatic faucet systems of FIGS. 1 through 2A, or bathroom flushers of FIGS. 4 and 4A.

FIG. 10A schematically illustrates another embodiment of control electronics 400. Control electronics 400 receives signals from optical sensor unit 402 and controls actuator 412. As described above, the control electronics also includes microcontroller 405, solenoid driver 408 (i.e., power driver), voltage regulator 422, and a battery 420. Solenoid actuator 411 includes two coil sensors 411A and 411B. Coil sensors 411A and 411B provide a signal to the respective preamplifiers 416A and 416B and low pass filters 417A and 417B. A differentiator 419 provides the differential signal to microcontroller 405 in a feedback loop arrangement.

To open a fluid passage, microcontroller 405 sends OPEN signal 406B to power driver 408, which provides a drive current to the drive coil of actuator 410 in the direction that will retract the armature. At the same time, coils 411A and 411B provide induced signal to the conditioning feedback loop, which includes the preamplifier and the low-pass filter. If the output of a differentiator 419 indicates less than a selected threshold calibrated for the retracted armature (i.e., the armature didn't reach a selected position), microcontroller 405 maintains OPEN signal 406B asserted. If no movement of the solenoid armature is detected, microcontroller 405 can apply a different (higher) level of OPEN signal 406B to increase the drive current (up to several time the normal drive current) provided by power driver 408. This way, the system can move the armature, which is stuck due to mineral deposits or other problems.

Microcontroller 405 can detect the armature displacement (or even monitor armature movement) using induced signals in coils 411A and 411B provided to the conditioning feedback loop. As the output from differentiator 419 changes in response to the armature displacement, microcontroller 405 can apply a different (lower) level of OPEN signal 406B, or can turn off OPEN signal 406B, which in turn directs power driver 408 to apply a different level of drive current. The result usually is that the drive current has been reduced, or the duration of the drive current has been much shorter than the time required to open the fluid passage under worst-case conditions (that has to be used without using an armature sensor). Therefore, the control system saves considerable energy and thus extends the life of battery 420.

Advantageously, the arrangement of coil sensors 411A and 411B can detect latching and unlatching movement of the actuator armature with great precision. (However, a single coil sensor, or multiple coil sensors, or capacitive sensors may also be used to detect movement of the armature.) Microcontroller 405 can direct a selected profile of the drive current applied by power driver 408. Various profiles may be stored in, microcontroller 405 and may be actuated based on the fluid type, the fluid pressure (water pressure), the fluid temperature (water temperature), the time actuator 410 has been in operation since installation or last maintenance, a battery level, input from an external sensor (e.g., a movement sensor or a presence sensor), or other factors. Based on the water pressure and the known sizes of the orifices, the automatic flush valve can deliver a known amount of flush water.

Figure 10B:
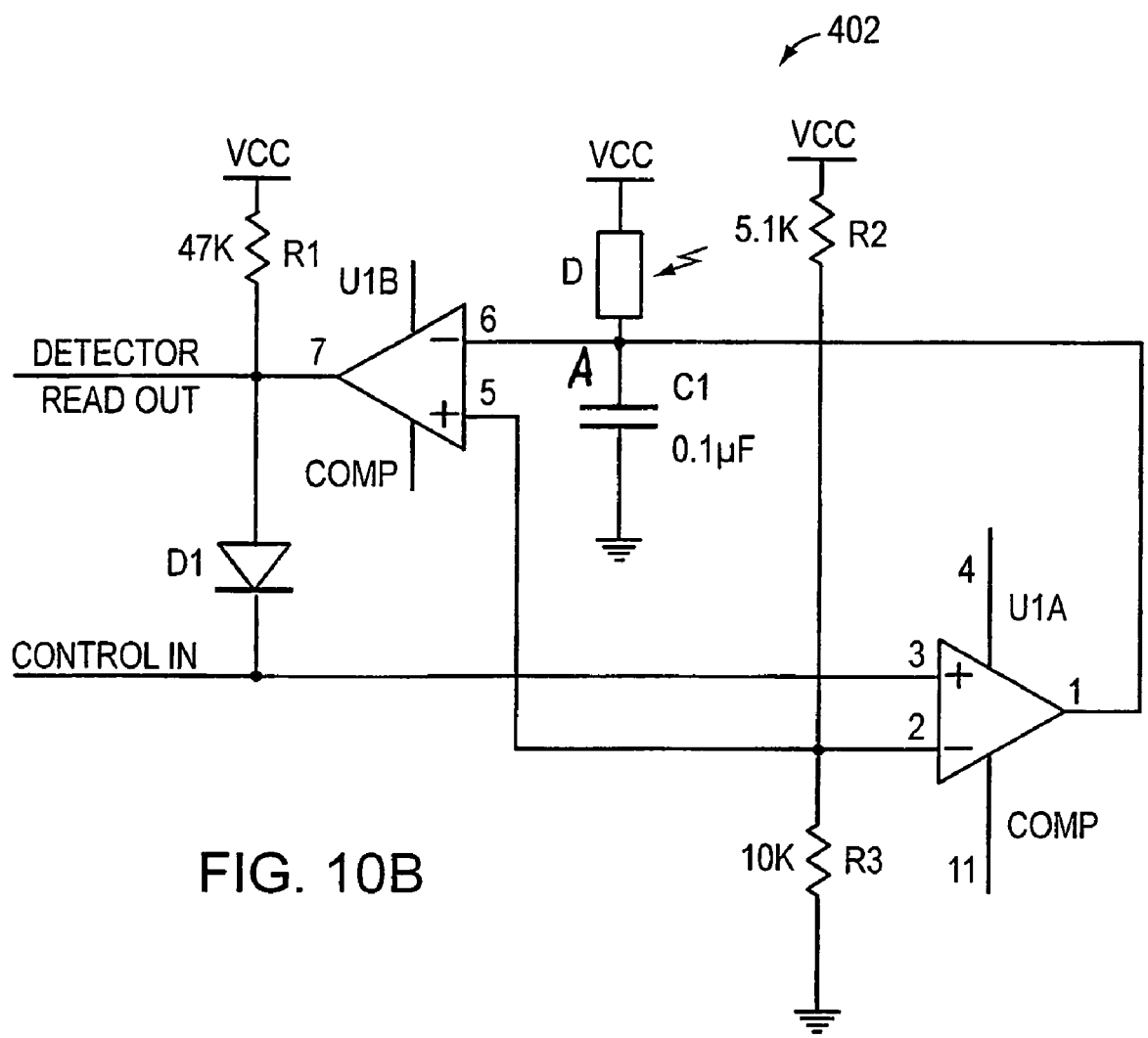
FIG. 10B is a schematic diagram of a detection circuit used in passive optical sensor used in the automatic faucet system or the automatic flusher system.

FIG. 10B provides a schematic diagram of a detection circuit used for the passive optical sensor 50. The passive optical sensor does not include a light source (no light emission occurs) and only includes a light detector that detects arriving light. As compared to the active optical sensor, the passive sensor enables reduced power consumption since all power consumption related to the IR emitter is eliminated. The light detector may be a photodiode, a photo-resistor or some other optical element providing electrical output depending on the intensity or the wavelength of the received light. The light receiver is selected to be active in the range or 350 to 1,500 nanometers and preferably 400 to 1,000 nanometers, and even more preferably, 500 to 950 nanometers. Thus, the light detector is not sensitive to body heat emitted by the user of faucet 10, 10A, 10B or 10C, or body heat emitted by the user located in front of flushers 100 or 100A.

FIG. 10B shows a schematic diagram of the detection circuit used by the passive sensor, which enables a significant reduction in energy consumption. The detection circuit includes a detection element D (e.g., a photodiode or a photo-resistor), two comparators (U1A, and U1B) connected to provide a read-out from the detection element upon receipt of a high pulse. Preferably, the detection element is a photo-resistor. The voltage $V_{CC}$ is +5 V (or +3V) received from the power source. Resistors $R_2$ and $R_3$ are voltage dividers between $V_{CC}$ and the ground. Diode $D_1$ is connected between the pulse input and output line to enable the readout of the capacitance at capacitor $C_1$ charged during the light detection.

Preferably, the photo-resistor is designed to receive light of intensity in the range of 1 lux to 1000 lux, by appropriate design of optical lens 54 or the optical elements shown in FIGS. 6 through 6E. For example, optical lens 54 may include a photochomatic material or a variable size aperture. In general, the photo-resistor can receive light of intensity in the range of 0.1 lux to 500 lux for suitable detection. The resistance of the photodiode is very large for low light intensity, and decreases (usually exponentially) with the increasing intensity.

Referring still to FIG. 10B, upon receiving a "high" pulse at the input connection, comparator $U_{1A}$ receives the "high" pulse and provides the "high" pulse to node A. At this point, the corresponding capacitor charge is read out through comparator $U_{1B}$ to the output 7. The output pulse is a square wave having a duration that depends on the photocurrent (that charged capacitor $C_1$ during the light detection time period. Thus, microcontroller 34 receives a signal that depends on the detected light.

In the absence of the high signal, comparator $U_{1A}$ provides no signal to node A, and therefore capacitor $C_1$ is being charged by the photocurrent excited at the photo resistor D between $V_{CC}$ and the ground. The charging and reading out (discharging) process is being repeated in a controlled manner by providing a high pulse at the control input. The output receives a high output, i.e., the square wave having duration proportional to the photocurrent excited at the photo resistor. The detection signal is in a detection algorithm executed by microcontroller 405.

By virtue of the elimination of the need to employ an energy consuming IR light source used in the active optical sensor, the system can be configured so as to achieve a longer battery life (usually many years or operation without changing the batteries). Furthermore, the passive sensor enables a more accurate means of determining presence of a user, the user motion, and the direction of user's motion.

The preferred embodiment as it relates to which type of optical sensing element is to be used is dependent upon the following factors: The response time of a photo-resistor is on the order or 20-50 milliseconds, whereby a photo-diode is on the order of several microseconds, therefore the use of a photo-resistor will require a significantly longer time form which impacts overall energy use.

Furthermore, the passive optical sensor can be used to determine light or dark in a facility and in turn alter the sensing frequency (as implemented in the faucet detection algorithm). That is, in a dark facility the sensing rate is reduced under the presumption that in such a modality the faucet or flusher will not be used. The reduction of sensing frequency further reduces the overall energy consumption, and thus this extends the battery life.

Figure 11:
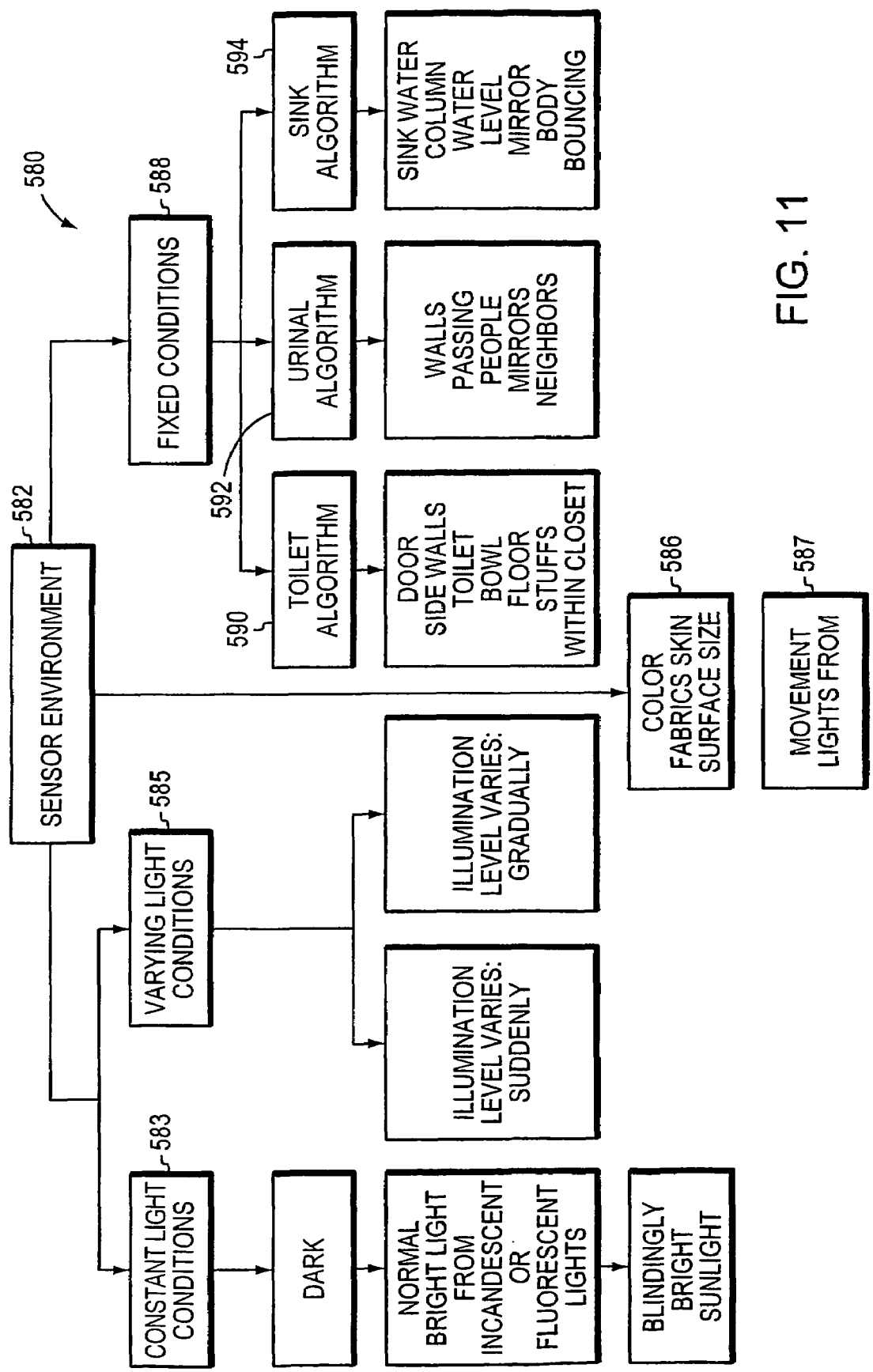
FIG. 11 is a block diagram that illustrates various factors that affect operation and calibration of the passive optical system.

FIG. 11 illustrates various factors that affect operation and calibration of the passive optical system. The sensor environment is important since the detection depends on the ambient light conditions. If there the ambient light in the facility changes from normal to bright, the detection algorithm has to recalculate the background and the detection scale. The detection process differs when the lighting conditions vary (585), as shown in the provided algorithms. There are some fixed conditions (588) for each facility such as the walls, toilet locations, and their surfaces. The provided algorithms periodically calibrate the detected signal to account for these conditions. The above-mentioned factors are incorporated in the following algorithm.

Figure 12:
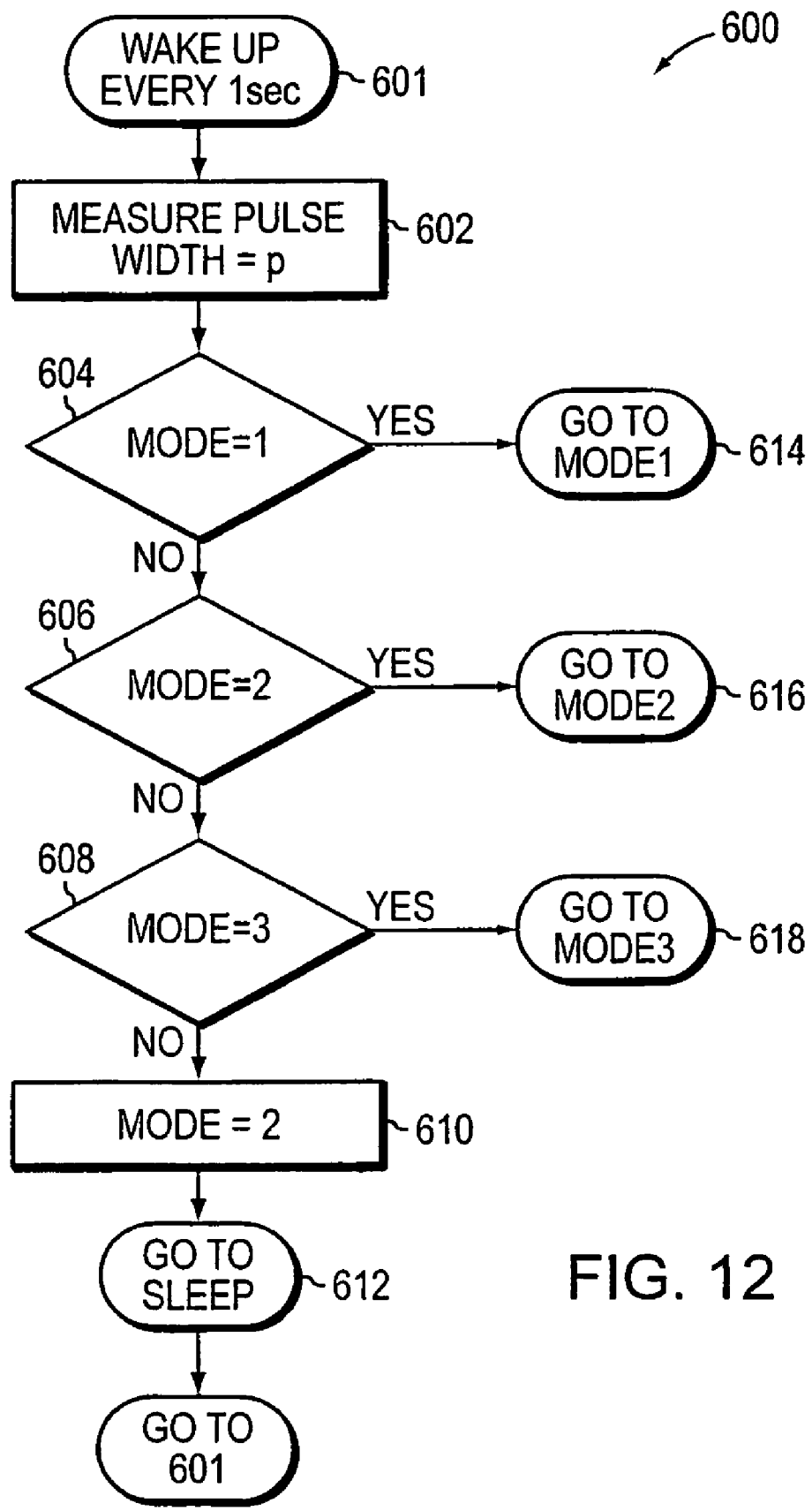
FIGS. 12, 12A, 12B, 12C, 12D, 12E, 12F, 12G, 12H and 12I show a flow diagram of an algorithm for processing optical data detected by the passive sensor operating the automatic flusher system.
Figure 12A:
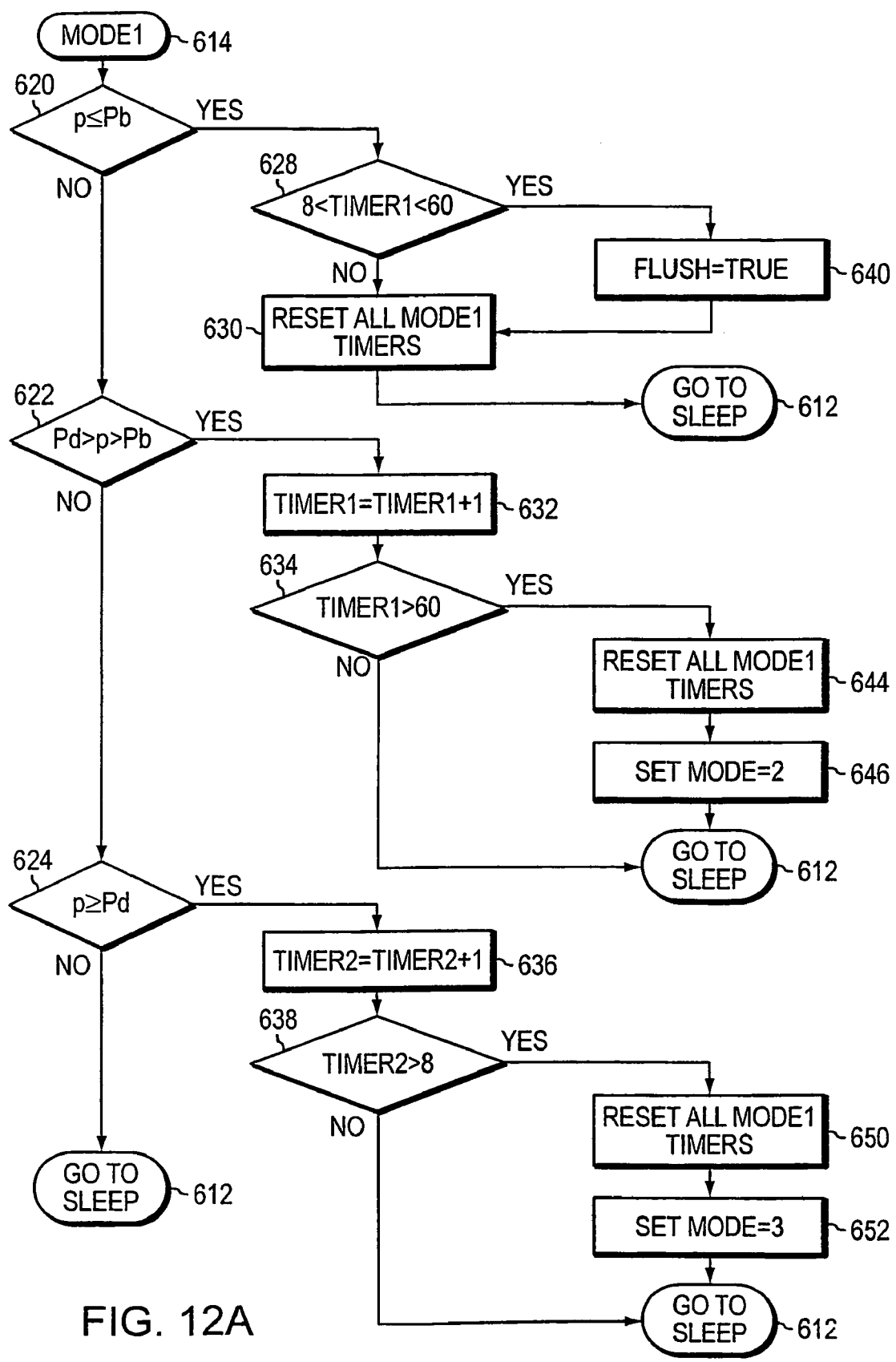
Figure 12B:
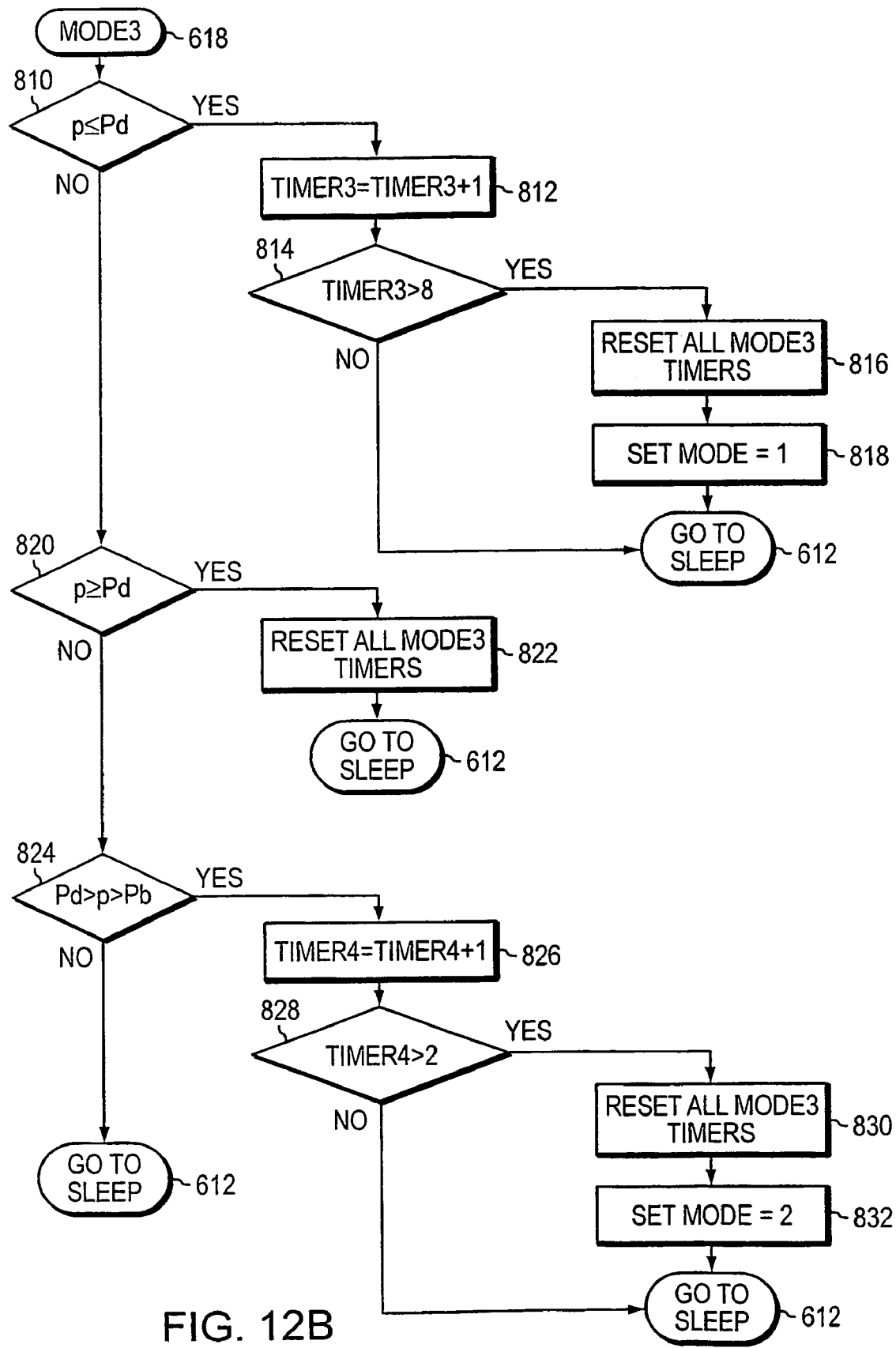
Figure 12C:
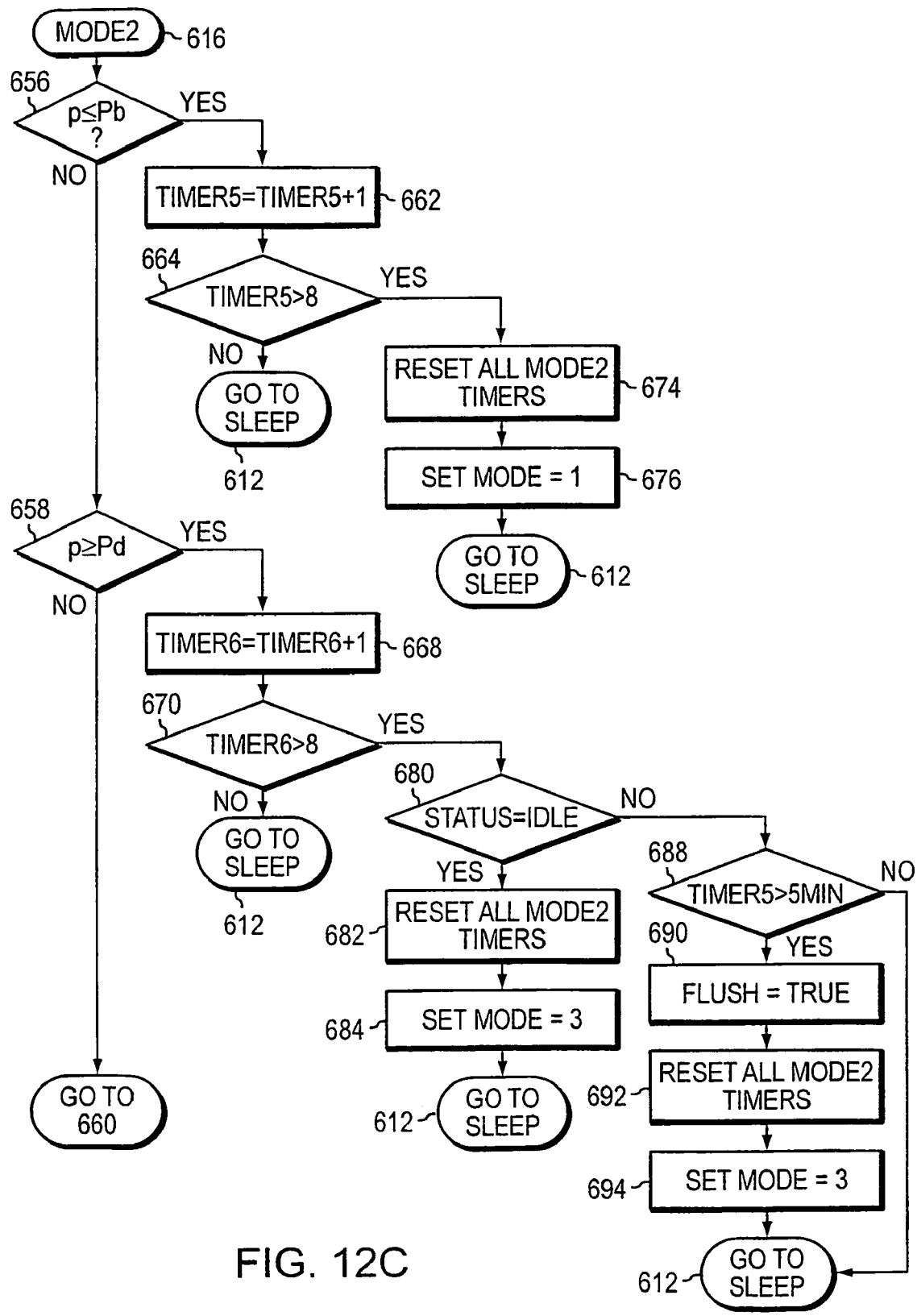
Figure 12D:
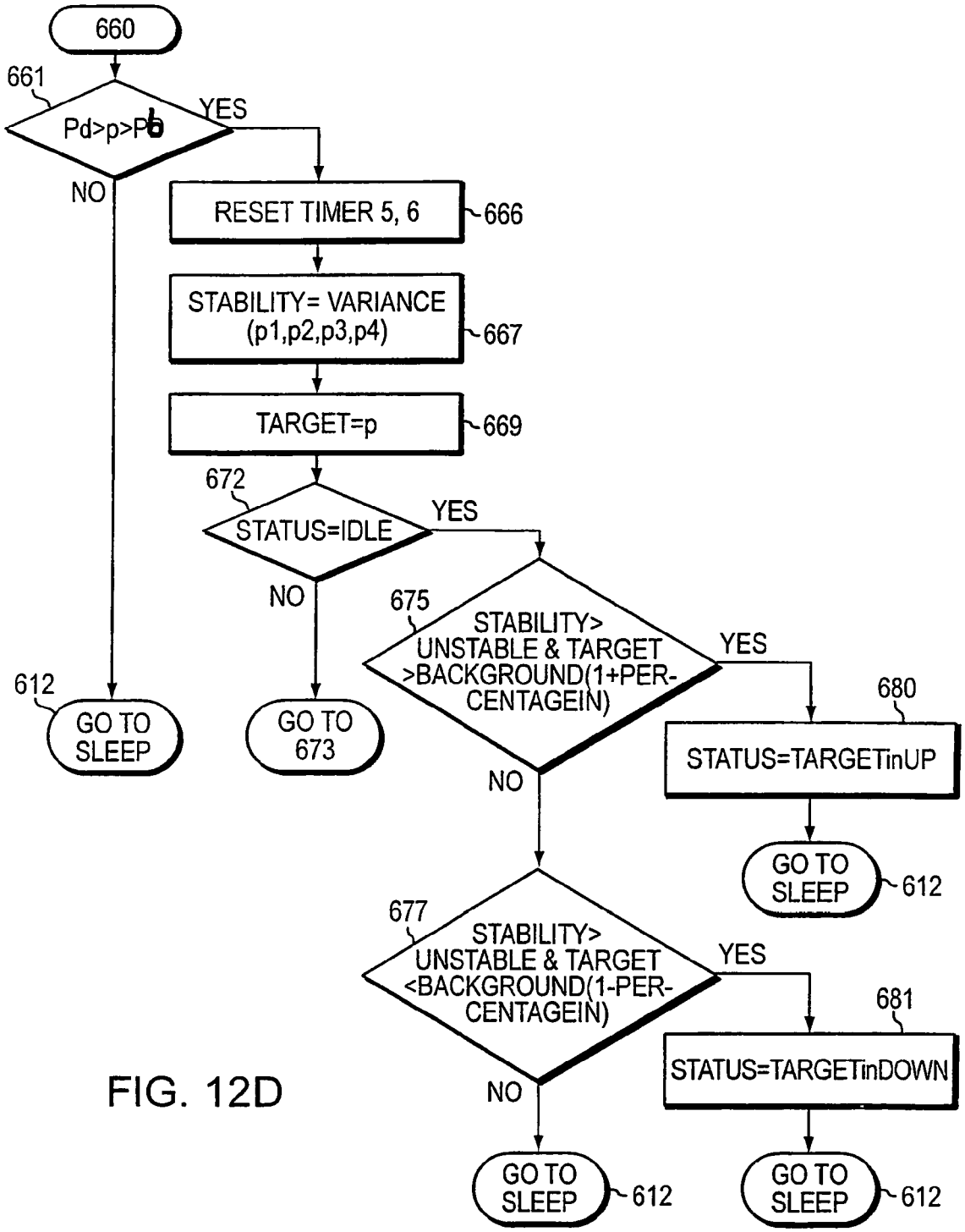
Figure 12E:
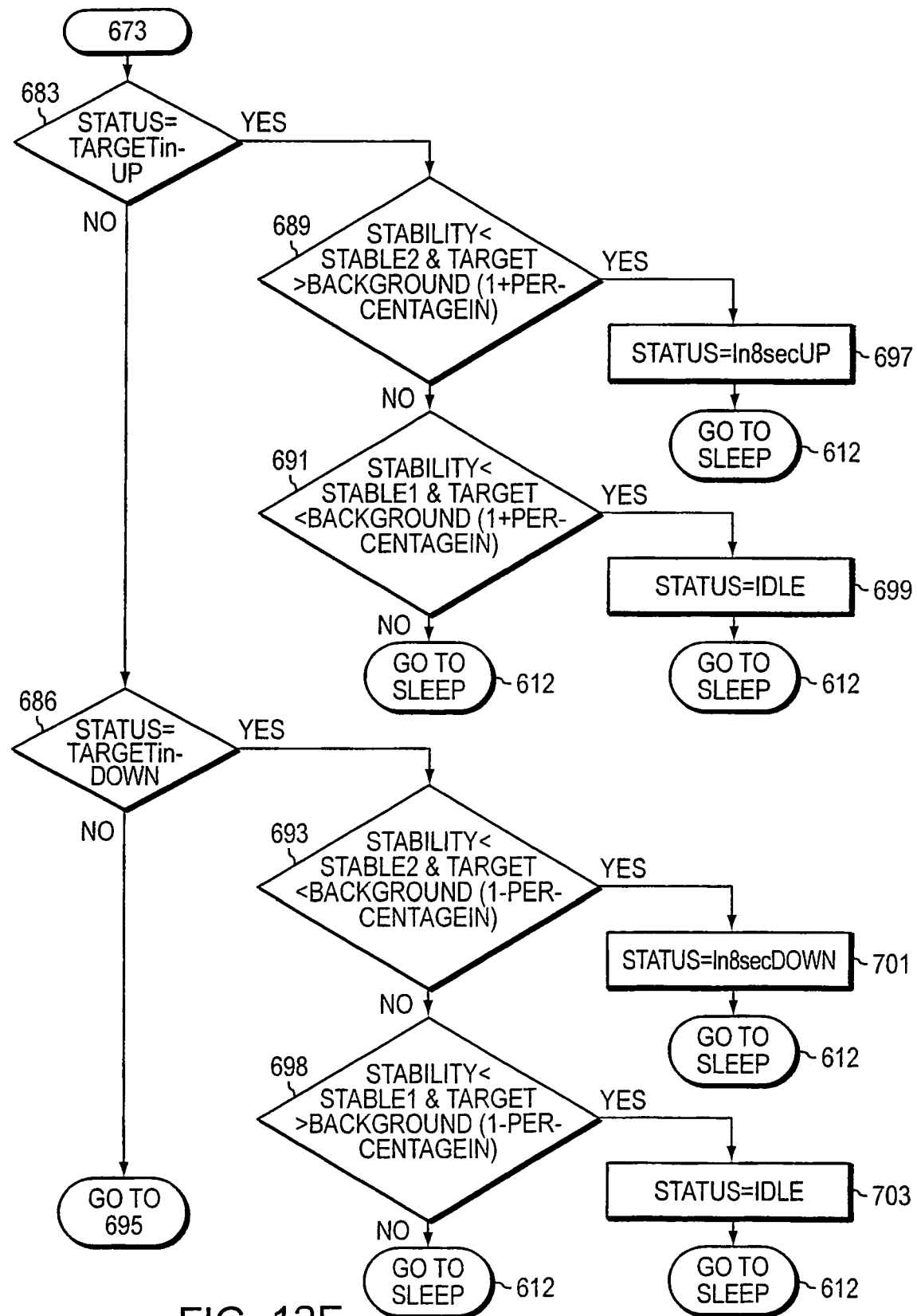
Figure 12F:
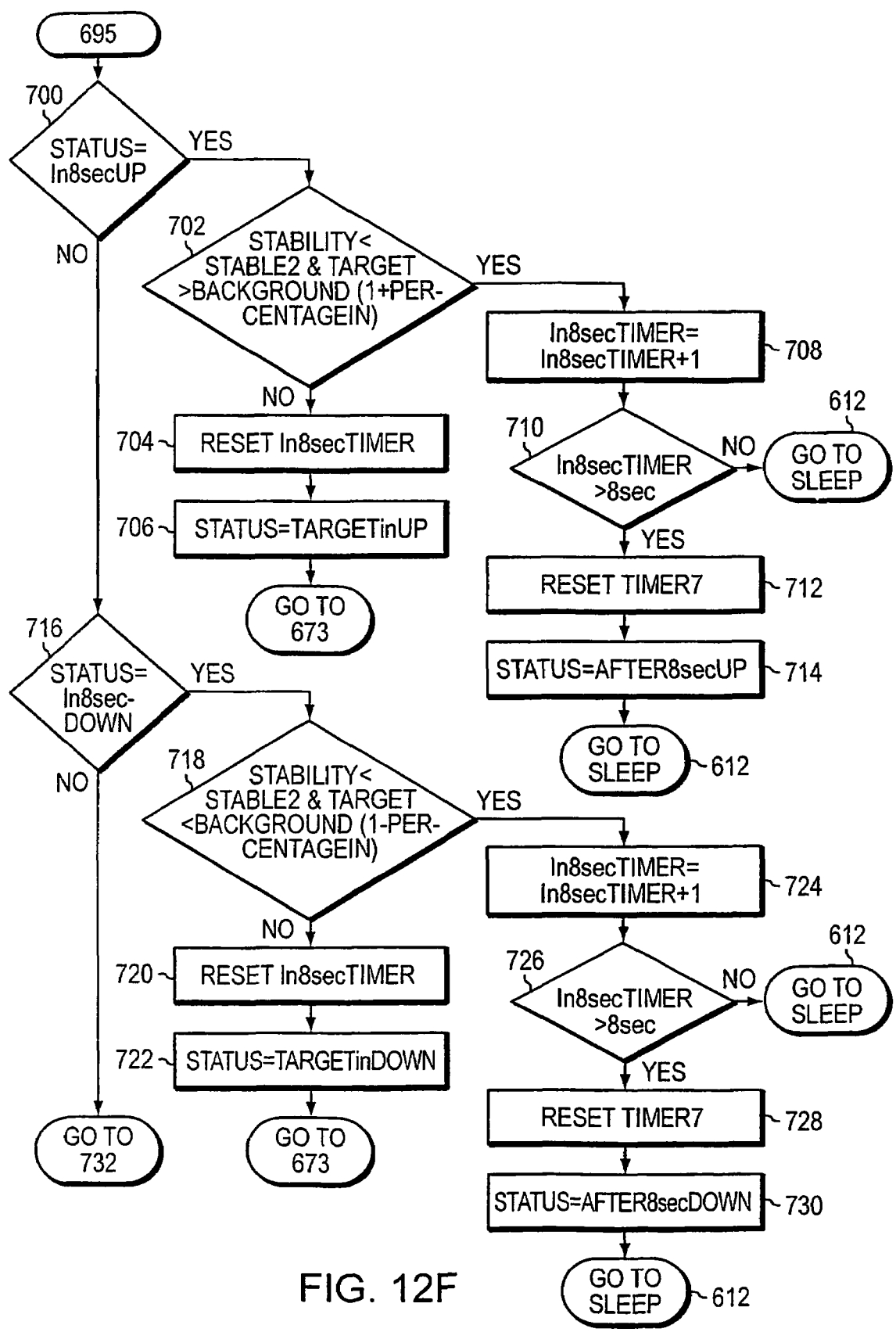
Figure 12G:
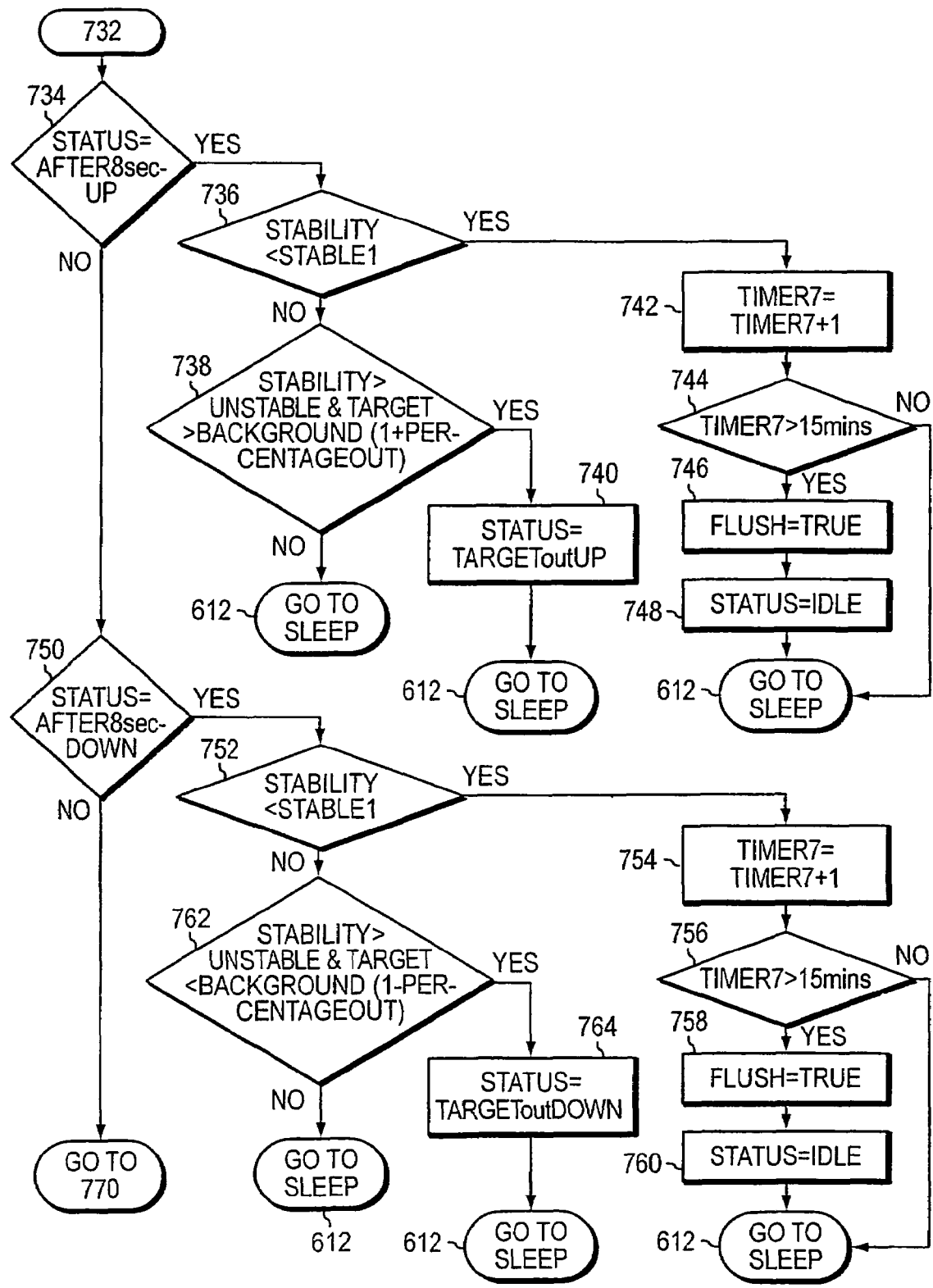
Figure 12H:
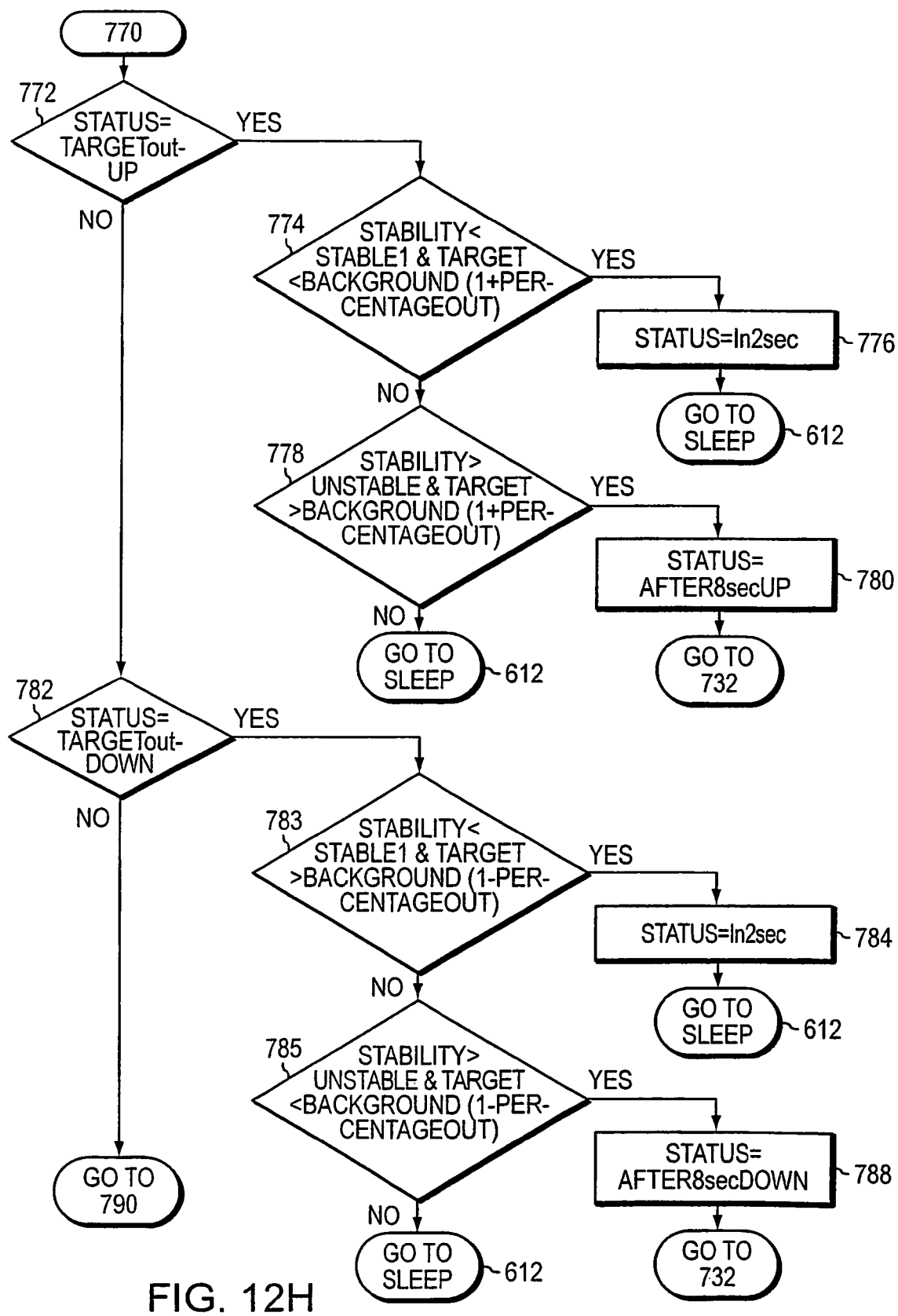
Figure 12I:
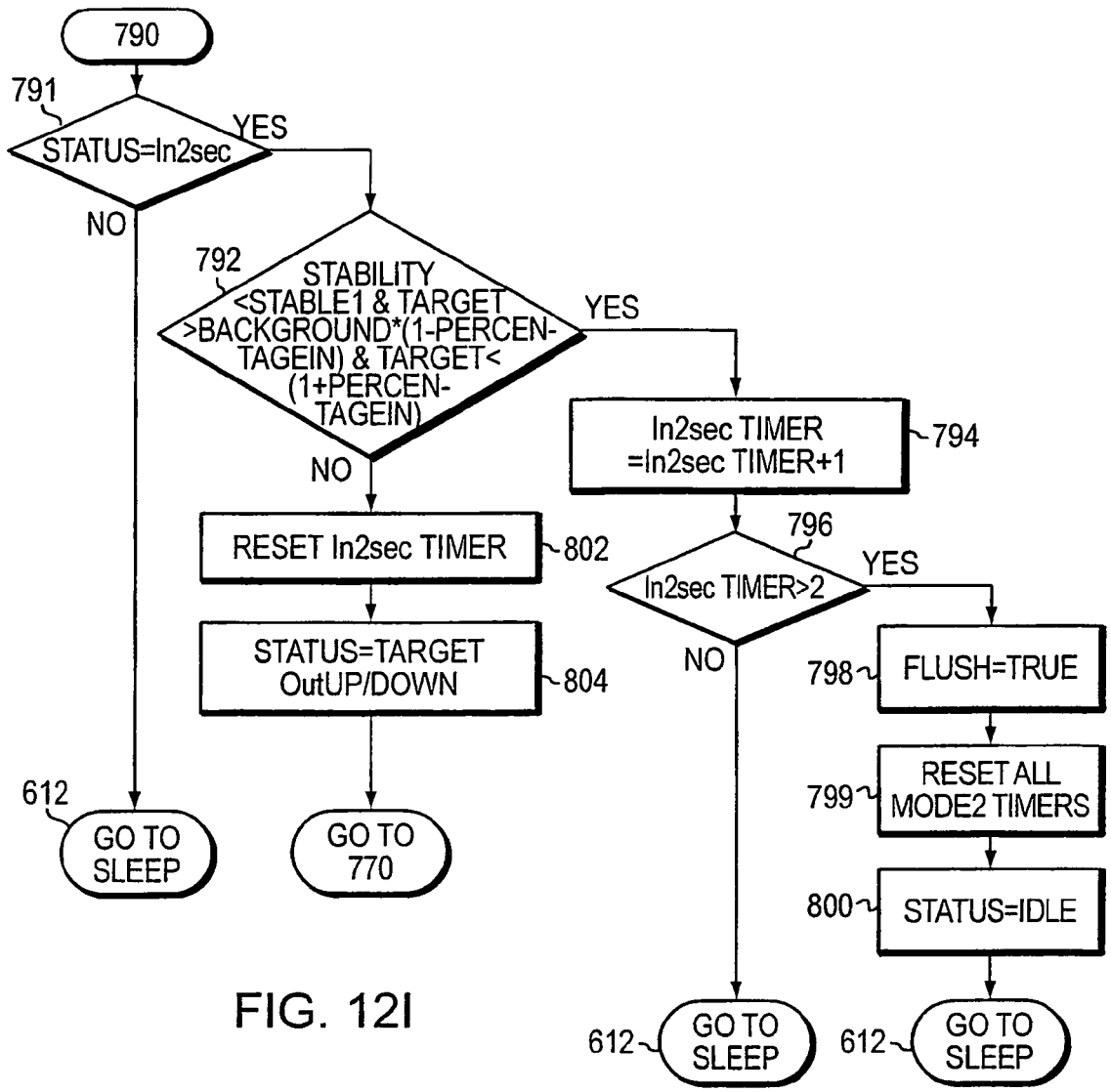

Referring to FIGS. 12-12I, the microcontroller is programmed to execute a flushing algorithm 600 for flushing toilet 116 or urinal 120 at different light levels. Algorithm 600 detects different users in front of the flusher as they are approaching the unit, as they are using the toilet or urinal, and as they are moving away from the unit. Based on these activities, algorithm 600 uses different states. There are time periods between each state in order to automatically flush the toilet at appropriately spaced intervals. Algorithm 600 also controls flushes at particular periods to make sure that the toilet has not been used without detection. The passive optical detector for algorithm 600 is preferably a photoresistor coupled to a readout circuit shown in FIG. 10B.

Algorithm 200 has three light modes: a Bright Mode (Mode 1), a Dark Mode (Mode 3), and a Normal Mode (Mode 2). The Bright Mode (Mode 1) is set as the microcontroller mode when resistance is less than 2 k$\Omega$ (Pb), corresponding to large amounts of light detected (FIG. 12). The Dark Mode (Mode 3) is set when the resistance is greater than 2 M$\Omega$ (Pd), corresponding to very little light detected (FIG. 12). The Normal Mode (Mode 2) is defined for a resistance is between 2 k$\Omega$ and 2 M$\Omega$, corresponding to ambient, customary amounts of light are present. The resistance values are measured in terms of a pulse width (corresponding to the resistance of the photoresistor in FIG. 10B). The above resistance threshold values differ for different photoresistors and are here for illustration only.

The microcontroller is constantly cycling through algorithm 600, where it will wake up (for example) every 1 second, determine which mode it was last in (due to the amount of light it detected in the prior cycle). From the current mode, the microcontroller will evaluate what mode it should go to based on the current pulse width (p) measurement, which corresponds to the resistance value of the photoresistor.

The microcontroller goes through 6 states in Mode 2. The following are the states required to initiate the flush: An Idle status in which no background changes in light occur, and in which the microcontroller calibrates the ambient light; a TargetIn status, in which a target begins to come into the field of the sensor; an In8Seconds status, during which the target comes in towards the sensor, and the pulse width measured is stable for 8 seconds (if the target leaves after 8 seconds, there is no flush); an After8Seconds status, in which the target has come into the sensor's field, and the pulse width is stable for more than 8 seconds, meaning the target has remained in front of the sensor for that time (if the target leaves after 8 seconds (and after which, if the target leaves, there is a cautionary flush); a TargetOut status, in which the target is going away, out of the field of the sensor; an In2Seconds status, in which the background is stable after the target leaves. After this last status, the microcontroller flushes, and goes back to the Idle status.

When the target moves closer to the sensor, the target can block the light, particularly when wearing dark, light-absorbent clothes. Thus, the sensor will detect less light during the TargetIn status, so that resistance will go up (causing what will later be termed a TargetInUp status), while the microcontroller will detect more light during the TargetOut status, so that resistance will go down (later termed a TargetOutUp status). However, if the target wears light, reflective clothes, the microcontroller will detect more light as the target gets closer to it, in the TargetIn status (causing what will later be described as a TargetInDown status), and less during the TargetOut status (later termed a TargetOutDown status). Two seconds after the target leaves the toilet, the microcontroller will cause the toilet to flush, and the microcontroller will return to the Idle status.

To test whether there is a target present, the microcontroller checks the Stability of the pulse width, or how variable the p values have been in a specific period, and whether the pulse width is more variable than a constant, selected background level, or a provided threshold value of the pulse width variance (Unstable). The system uses two other constant, preselected values in algorithm 600, when checking the Stability of the p values to set the states in Mode 2. One of these two pre-selected values is Stable1, which is a constant threshold value of the pulse width variance. A value below means that there is no activity in front of unit, due to the p values not changing in that period being measured. The second preselected value used to determine Stability of the p values is Stable2, another constant threshold value of the pulse width variance. In this case a value below means that a user has been motionless in front of the microcontroller in the period being measured.

The microcontroller also calculates a Target value, or average pulse width in the After8Sec status, and then checks whether the Target value is above (in the case of TargetInUp) or below (in the case of TargetInDown) a particular level above the background light intensity: BACKGROUND×(1+PERCENTAGEIN) for TargetInUp, and BACKGROUND×(1−PERCENTAGEIN) for TargetInDown. To check for TargetOutUp and TargetOutDown, the microcontroller uses a second set of values: BACKGROUND×(1+PERCENTAGEOUT) and BACKGROUND×(1−PERCENTAGEOUT).

Referring to FIG. 12, every 1 second (601), the microcontroller will wake up and measure the pulse width, p (602). The microcontroller will then determine which mode it was previously in: If it was previously in Mode 1 (604), it will enter Mode 1 (614) now. It will similarly enter Mode 2 (616) if it had been in Mode 2 in the previous cycle (606), or Mode 3 (618) if it had been in Mode 3 in the previous cycle (608). The microcontroller will enter Mode 2 as default mode (610), if it cannot determine which mode it entered in the previous cycle. Once the Mode subroutine is finished, the microcontroller will go into sleep mode (612) until the next cycle 600 starts with step 601.

Referring to FIG. 12A (MODE 1—bright mode), if the microcontroller was previously in Mode 1 based on the p value being less than or equal to 2 kΩ, and the value of p now remains as greater than or equal to 2 kΩ (620) for a time period measured by timer 1 as greater than 8 seconds, but less than 60 seconds (628), the microcontroller will cause a flush (640), all Mode 1 timers (timers 1 and 2) will be reset (630), and the microcontroller will go to sleep (612) until the next cycle 600 starts at step 601. However, if p changes while timer 1 counts for more than 8 seconds, or less than 60 (628), there will be no flush (640). Simply, all Mode 1 timers will be reset (630), the microcontroller will go to sleep (612), and Mode 1 will continue to be set as the microcontroller mode until the next cycle 600 starts.

If the microcontroller was previously in Mode 1, but the value of p is now greater than 2 kΩ but less than 2 MΩ) (622), for greater than 60 seconds (634) based on the timer 1 count (632), all Mode 1 timers will be reset (644), the microcontroller will set Mode 2 (646) as the system mode, so that the microcontroller will start in Mode 2 in the next cycle 600, and the microcontroller will go to sleep (612). However, if p changes while timer 1 counts for 60 seconds (134 to 148), Mode 1 will remain the microcontroller mode and the microcontroller will go to sleep (612) until the next cycle 600 starts.

If the microcontroller was previously in Mode 1, and p is now greater than or equal to 2 MΩ (624) while timer 2 counts (636) for greater than 8 seconds (638), all Mode 1 timers will be reset (650), the microcontroller will set Mode 3 (652) as the new system mode, and the microcontroller will go to sleep (612) until the next cycle 600 starts. However, if p changes while timer 2 counts for 8 seconds, the microcontroller will go to sleep (steps 638 to 612), and Mode 1 will continue to be set as the microcontroller mode until the start of the next cycle 600.

Referring to FIG. 12B (MODE 3—dark mode), if the microcontroller was previously in Mode 3 based on the value of p having been greater than or equal to 2 MΩ, but the value of p is now less than or equal to 2 kΩ (810) for a period measured by timer 3 (812) as greater than 8 seconds (814), the microcontroller will reset timers 3 and 4, or all Mode 3 timers (816), the microcontroller will set Mode 1 as the state (818) until the start of the next cycle 600, and the microcontroller will go to sleep (612). However, if the value of p changes while timer 3 counts for 8 seconds, the microcontroller will go from step 814 to 612, so that the microcontroller will go to sleep, and Mode 3 will continue to be set as the microcontroller mode until the next cycle 600 starts.

If the microcontroller was previously in Mode 3 based on the value of p having been greater than or equal to 2 MΩ, and the value of p is still greater than or equal to 2 MΩ) (820), the microcontroller will reset timers 3 and 4 (822), the microcontroller will go to sleep (612), and Mode 3 will continue to be set as the microcontroller mode until the start of the next cycle 600.

If the microcontroller was previously in Mode 3, but p is now between 2 kΩ and 2 MΩ (824), for a period measured by timer 4 (826) as longer than 2 seconds (828), timers 3 and 4 will be reset (830), Mode 2 will be set as the mode (832) until the next cycle 600 starts, and the microcontroller will go to sleep (612). However, if p changes while timer 4 counts for longer than 2 seconds, Mode 3 will remain the microcontroller mode, and the microcontroller will go from step 828 to step 612, going to sleep until the next cycle 600 starts. If an abnormal value of p occurs, the microcontroller will go to sleep (612) until a new cycle starts.

Referring to FIG. 12C (MODE 2—normal mode), if the microcontroller mode was previously set as Mode 2, and now p is less than or equal to 2 kΩ (656), for a period measured by timer 5 (662) as more than 8 seconds (664), all Mode 2 timers will be reset (674), Mode 1 (Bright Mode) will be set as the microcontroller mode (676), and the microcontroller will go to sleep (612). However, if p changes while timer 5 counts for longer than 8 seconds, the microcontroller will go to sleep (steps 664 to 612), and Mode 2 will remain the microcontroller mode until the next cycle 600 starts.

However, if now p is greater than or equal to 2 MΩ (658) for a period measured by timer 6 (668) as longer than 8 seconds (670), the toilet is not in Idle status (i.e., there are background changes, 680), and p remains greater than or equal to 2 MΩ while timer 6 counts for over 5 minutes (688), the system will flush (690). After flushing, timers 5 and 6 will be reset (692), Mode 3 will be set as the microcontroller mode (694), and the microcontroller will go to sleep (612). Otherwise, if p changes while timer 6 counts for longer than 5 minutes, the system will go from step 688 to 612, and go to sleep.

If the microcontroller mode was previously set as Mode 2, now p is greater than or equal to 2 MΩ (658) for a period measured by timer 6 (668) as more than 8 seconds (670), but the toilet is in Idle status (680), timers 5 and 6 will be reset (682), Mode 3 will be set as microcontroller mode (684), and the microcontroller will go to sleep at step 612.

If p is greater or equal to 2 MΩ, but changes while timer 6 counts (668) to greater than 8 seconds (670), the microcontroller will go to sleep (612), and Mode 2 will remain as the microcontroller mode. If p is within a different value, the microcontroller will go to step 660 (shown in FIG. 12D).

Referring to FIG. 12D, alternatively, if the microcontroller mode was previously set as Mode 2, and p is greater than 2 kΩ and less than 2 MΩ (661), timers 5 and 6 will be reset (666), pulse width Stability will be checked by assessing the variance of the last four pulse width values (667), and the Target value is found by determining the pulse width average value (step 669).

At this point, when the status of the microcontroller is found to be Idle (672), the microcontroller goes on to step 675. In step 675, if the Stability is found to be greater than the constant Unstable value, meaning that there is a user present in front of the unit, and the Target value is larger than the Background×(1+PercentageIn) value, meaning that the light detected by the microcontroller has decreased, this leads to step 679 and a TargetInUp status (i.e., since a user came in, towards the unit, resistance increased because light was blocked or absorbed), and the microcontroller will go to sleep (612), with Mode 2 TargetInUp as the microcontroller mode and status.

When the conditions set in step 675 are not true, the microcontroller will check if those in 677 are. In step 677, if the Stability is found to be greater than the constant Unstable value, due to a user in front of the unit, but the Target value is less than the Background×(1−PercentageIn) value, due to the light detected increasing, this leads to a "TargetInDown" status in step 681, (i.e., since a user came in, resistance decreased because light off of his clothes is reflected), and the microcontroller will go to sleep (612), with Mode 2 TargetInDown as the microcontroller mode and status. However, if the microcontroller status is not Idle (672), the microcontroller will go to step 673 (shown in FIG. 12E).

Referring to FIG. 12E, if the system starts in the TargetInUp status (683), at step 689 the system will check whether the Stability value is less than the constant Stable2, and whether the Target value is greater than Background×(1+PercentageIn) (689). If both of these conditions are simultaneously met, which would mean that a user is motionless in front of the unit, blocking light, the microcontroller will now advance to In8SecUp status (697), and go to sleep (612). If the two conditions in step 689 are not met, the system will check whether Stability is less than Stable1 and Target is less than Background×(1+PercentageIn) at the same time (691), meaning that there is no user in front of the unit, and there is a large amount of light being detected by the unit. If this is the case, the system status will now be set as Mode 2 Idle (699), and the microcontroller will go to sleep (612). If neither of the sets of conditions in steps 689 and 691 is met, the system will go to sleep (612).

If the TargetInDown status (686) had been set in the previous cycle, the system will check whether Stability is less than Stable2 and Target is less than Background×(1−PercentageIn) at the same time in step 693. If this is so, which would mean that there is a user motionless in front of the unit, with more light being detected, the microcontroller will advance status to In8SecDown (701), and will then go to sleep (612).

If the two requirements in step 693 are not met, the microcontroller will check if Stability is less than Stable1 while at the same time Target is greater than Background×(1−PercentageIn) in step 698. If both are true, the status will be set as Mode 2 Idle (703), due to these conditions signaling that there is no activity in front of the unit, and that there is a large amount of light being detected by the unit, and it will go to sleep (612). If Stability and Target do not meet either set of requirements from steps 693 or 698, the microcontroller will go to sleep (612), and Mode 2 will continue to be the microcontroller status. If status is not Idle, TargetInUp or TargetInDown, the microcontroller will continue as in step 695 (shown in FIG. 12F)

Referring to FIG. 12F, if In8SecUp had been set as the status (700), it will check whether Stability is less than Stable2, and at the same time Target is greater than Background×(1+PercentageIn) in step 702. If these conditions are met, meaning that there is a motionless user before the unit, and that there is still less light being detected, the timer for the In8Sec status will start counting (708). If the two conditions, continue to be the same while the timer counts for longer than 8 seconds, timer 7 is reset (712), the microcontroller advances to After8SecUp status (714), and finally goes to sleep (612). If the two conditions change while the timer counts to above 8 seconds (710), the microcontroller will go to sleep (612). If in step 702 the requirements are not met by the values of Stability and Target, the In8Sec timer is reset (704), in step 706 the microcontroller status is set as TargetInUp, and the microcontroller will proceed to step 673 (FIG. 12E).

Referring to FIG. 12E, if the microcontroller status was set as In8SecDown (716), the microcontroller checks whether Stability is less than Stable2, and at the same time Target is less than Background×(1−PercentageIn) in step 718, to check whether the user is motionless before the unit, and whether it continues to detect a large amount of light. If the two values meet the simultaneous requirement, the In8Sec status timer will start counting (724). If it counts for longer than 8 seconds while the two conditions are met (726), timer 7 will be reset (728), the status will be advanced to After8SecDown (730), and the microcontroller will go to sleep (612).

If the timer does not count for longer than 8 seconds while Stability and Target remain at those ranges, the microcontroller will not advance the status, and will go to sleep (612). If the requirements of step 718 are not met by the Stability and Target values, the In8SecTimer will be reset (720), and the microcontroller status will be set to TargetInDown (722), where the microcontroller will continue to step 673 (FIG. 12E). If the Mode 2 state is none of those covered in FIGS. 12C-F, the system continues through step 732 (shown in FIG. 12G)

Referring to FIG. 12G, in step 734, if the system was in the After8SecUp status (734), it will check whether Stability is less than Stable1, that is, whether there is no activity before the unit. If so, timer 7 will start counting (742), and if Stability remains less than Stable1 until timer 7 counts for longer than 15 minutes (744), the microcontroller will flush (746), the Idle status will be set (748), and the microcontroller will go to sleep (612). If Stability does not remain less than the Stable1 value until timer 7 counts for longer than 15 minutes, the microcontroller will go to sleep (612) until the next cycle.

If Stability was not less than Stable1, the microcontroller checks whether it is greater than Unstable, and whether Target is greater than Background×(1+PercentageOut) (738). If both simultaneously meet these criteria, meaning that there is a user moving in front of the unit, but there is more light being detected because they are moving away, the microcontroller advances to Mode 2 TargetOutUp as the microcontroller status (740), and the microcontroller goes to sleep (612). If Stability and Target do not meet the two criteria in step 738, the microcontroller goes to sleep (612).

If the microcontroller was in After8SecDown (750), it will check whether the Stability is less than Stable1 at step 752. If so, timer 7 will begin to count (754), and if it counts for greater than 15 minutes (756), the microcontroller will flush (758), Idle status will be set (760), and the microcontroller will go to sleep (612). If Stability does not remain less than Stable1 until timer 7 counts to greater than 15 minutes, the microcontroller will go to sleep (612) until the next cycle.

If the Stability is not found to be less than Stable1 at step 752, the microcontroller will check whether Stability is greater than Unstable, while at the same time Target is less than Background×(1−PercentageOut) at step 762. If so, this means that there is a user in front of the unit, and that it detects less light because they are moving away, so that it will advance the status to TargetOutDown at step 764, and will go to sleep (612). Otherwise, if both conditions in step 762 are not met, the microcontroller will go to sleep (612). If the Mode 2 state is none of those covered in FIGS. 12C-G, system continues through step 770 (shown in FIG. 12H).

Referring to FIG. 12H, if TargetOutUp had been set as the status (772), the microcontroller will check whether Stability is less than Stable1 while Target is less than Background×(1+PercentageOut), in step 774. If so, it will set the status as In2Sec (776), and the microcontroller will go to sleep (612). However, if Stability and Target do not simultaneously meet the criteria in step 774, the microcontroller will check if Stability is greater than Unstable and at the same time Target is greater than Background×(1+PercentageOut) in step 778. If so, it will set the status as After8SecUp (780), and it will go to 732 where it will continue (See FIG. 12). If Stability and Target do not meet the criteria of either step 774 or 778, the microcontroller will go to sleep (612).

If the microcontroller is in TargetOutDown status (782), it will check whether Stability is less than Stable1, and Target greater than Background×(1−PercentageOut) simultaneously (783). If so, it would mean that there is no activity in front of the unit, and that there is less light reaching the unit, so that it will advance status to In2Sec (784), and go to sleep (612). However, if Stability and Target do not meet both criteria of step 783, the microcontroller will check whether Stability is greater than Unstable, and Target is less than Background×(1−PercentageOut) simultaneously in step 785. If so, the microcontroller will set status as After8SecDown (788), and go to step 732 where it will continue (See FIG. 12G). If Stability and Target meet neither set of criteria from steps 783 or 785, the microcontroller will go to sleep (612).

Referring to FIG. 12I, if the microcontroller set In2Sec status in the previous cycle (791), it will check whether Stability is less than Stable1 (792), which is the critical condition: since the user has left, there are no fluctuations in the light detected via resistance. It will also check whether the Target value is either greater than Background×(1−PercentageIn), or less than Background×(1+PercentageIn), in step 792. If this is the case, there is no activity in front of the unit, and the light detected is neither of the two levels required to signify a user blocking or reflecting light, which would indicate that there is no user in front of the unit. The system would then start the In2Sec status timer in step 794, and if it counts for longer than 2 seconds (796) with these conditions still at hand, the microcontroller will flush (798), all Mode 2 timers will be reset in step 799, the status will be set back to Idle in step 800, and the microcontroller will go to sleep (612). If the Stability and Target values change while the In2Sec timer counts to greater than 2 seconds (796), the microcontroller will go to sleep (612) until the start of the next 600 cycle.

If Stability and Target values do not meet the two criteria set in step 792, the In2Sec timer is reset (802), the status is changed back to either TargetOutUp or TargetOutDown in step 804, and the microcontroller goes to step 770 (FIG. 12H). If the microcontroller is not in In2Sec status either, the microcontroller will go to sleep (612), and start algorithm 600 again.

FIGS. 13, 13A, and 13B illustrate a control algorithm for faucets 10,10A and 10B. Algorithm 900 includes two modes. Mode 1 is used when the passive sensor is located outside the water stream (faucet 10B), and Mode 2 is used when the passive sensor's field of view is inside the water stream (faucets 10 and 10A). In Mode 1 (algorithm 920) the sensor located outside the water stream detects the blocking of the light by a nearby user's hands, and checks for how long the low light remains steady, interpreting it as the user at the sink, but also excluding a darkening of the room the unit is placed in as a similar signal. This sensor then will directly turn off the water once the user has left the faucet, or once it no longer detects unstable, low levels of light.

In Mode 2 (algorithm 1000), the photoresistor inside the water stream also uses the above variables, but takes an additional factor into consideration: running water can also reflect light, so that the sensor may not be able to completely verify the user having left the faucet. In this case, the algorithm also uses a timer to turn the water off, while then actively checking whether the user is still there. Modes 1 or 2 may be selectable, for example, by a dipswitch.

Referring to FIG. 13, algorithm 900 commences after the power goes on (901), and the unit initializes the module in step 902. The microcontroller then checks the battery status (904), resets all timers and counters (906), and closes the valve (shown in FIGS. 1, 2, 4 and 4A) in step 908. All electronics are calibrated (910), and the microcontroller establishes a background light threshold level, (BLTH), in step 912. The microcontroller will then determine which mode to use in step 914: In Mode 1, the microcontroller executes algorithm 920 (to step 922, FIG. 13A) and in Mode 2, the microcontroller executes algorithm 1000 (to step 1002, FIG. 13B).

Referring to FIG. 13A, if the microcontroller uses Mode 1, the passive sensor scans for a target every ⅛ of a second (924). The scan and sleep time may be different for different light sensors (photodiode, photoresistor, etc. and their read out circuits). For example, the scan frequency can be every ¼ second or every ¾ second. Also, just as in the algorithm shown in FIG. 12, the microcontroller will go through the algorithm and then go to sleep in between the executed cycles. After scanning, the microcontroller measures the sensor level (SL), or value corresponding to the resistance of the photoresistor, at step 925. It will then compare the sensor level to the background light threshold level (BLTH): if the SL is greater than or equal to 25% of the BLTH (926), the microcontroller will further determine whether it is greater than or equal to 85% of the BLTH (927). These comparisons determine the level of ambient light: if the SL is higher than or equal to 85% of the BLTH calculated in step 912, i would mean that it is now suddenly very dark in the room (947), so that the microcontroller will go into Idle Mode, and scan every 5 seconds (948) until it detects the SL being less than 80% of the BLTH, meaning there is now more ambient light (949). Once this is detected, the microcontroller will establish a new BLTH for the room (950), and cycle back to step 924, at which it will continue to scan for a target every ⅛ of a second with the new BLTH.

If SL is smaller than 25% of the previously established BLTH, this would mean that the light in the room has suddenly dramatically increased (direct sunlight, for example). The scan counter starts counting to see if this change is stable (928) as the microcontroller cycles through steps 924, 925, 926, 928 and 929, until it reaches five cycles (929). Once it does reach the five cycles under the same conditions, it will establish a new BLTH in step 930 for the now brightly lit room, and begin a cycle anew at step 922 using this new BLTH.

If, however, the SL is between 25% greater than or equal to, but no greater than 85% of the BLTH (at steps 926 and 927), light is not at an extreme range, but regular ambient light, and the microcontroller will set the scan counter to zero at step 932, measure SL once more to check for a user (934), and assess whether the SL is between greater than 20% BLTH or less than 25% BLTH (20% BLTH<SL<25% BLTH) at step 936. If not, this would mean that there is a user in front of the unit sensor, as the light is lower than regular ambient light, causing the microcontroller to move on to step 944, where it will turn the water on for the user. Once the water is on, the microcontroller will set the scan counter to zero (946), scan for the target every ⅛ of a second (948), and continue to check for a high SL, that is, for low light, in step 950 by checking whether the SL is less than 20% of the BLTH. When SL decreases to less than 20% of BLTH (950), meaning that the light detected increased, the microcontroller will move on to step 952, turning on a scan counter. The scan counter will cause the microcontroller to continue scanning every ⅛ of a second and checking that SL is still less than 20% of BLTH until over 5 cycles through 948, 950, 952 and 954 have passed (954), which would mean that there now has been an increase in light which has lasted for more than 5 of these cycles, and that the user is no longer present. At this point the microcontroller will turn the water off (956). Once the water is turned off, the whole cycle is repeated from the beginning.

Referring to FIG. 13B (algorithm 1000 for faucet 10), the microcontroller scans for a target every ⅛ of a second (1004), although, again, the time it takes between any of the scans could be changed to another period, for example, every ¼ of a second. Once more, the microcontroller will go through the algorithm and then go to sleep in between cycles just as in the algorithm shown in FIG. 12. After scanning, the microcontroller will measure the sensor level (1006), and compare the SL against the BLTH. Once again, if the SL is greater than or equal to 25% of the BLTH, the microcontroller will check whether it is greater than or equal to 85% of the BLTH. If it is, It will take it to mean that the room must have been suddenly darkened (1040). The microcontroller will then go into Idle Mode at step 1042, and scan every 5 seconds until it detects the SL being less than 80% of the BLTH, meaning it now detects more light (1044). Once it does, the microcontroller will establish a new BLTH for the newly lit room (1046), and it will cycle back to step 1004, starting the cycle anew with the new BLTH for the room.

If the SL is between greater than or equal to 25% or less than 85% of the BLTH, the microcontroller will continue through step 1015, and setting the scan counter to zero. It will measure the SL at step 1016, and assess if it is greater than 20% BLTH, but smaller than 25% BLTH (20% BLTH<SL<25% BLTH), at step 1017. If it is not, meaning there is something blocking light to the sensor, the microcontroller will turn water on (1024); this also turns on a Water Off timer, or WOFF (1026). Then, the microcontroller will continue to scan for a target every ⅛ of a second (1028). The new SL is checked against the BLTH, and if the value of SL is not between less than 25% BLTH, but greater than 20% BLTH (20% BLTH<SL<25% BLTH), the microcontroller will loop back to step 1028 and continue to scan for the target while the water runs. If the SL is within this range (1030), the WOFF timer now starts to count (1032), looping back to the cycle at step 1028. The timer's function is simply to allow some time to pass between when the user is no longer detected and when the water is turned off, since, for example, the user could be moving the hands, or getting soap, and not be in the field of the sensor for some time. The time given (2 seconds) could be set differently depending upon the use of the unit. Once 2 seconds have gone by, the microcontroller will turn the water off at step 1036, and it will cycle back to 1002, where it will repeat the entire cycle.

However, if at step 1017 SL is greater than 20% BLTH, but smaller than 25% BLTH (20% BLTH<SL<25% BLTH), the scan counter will begin to count the number of times the microcontroller cycles through steps 1016, 1017, 1018 and 1020, until more than five cycles are reached. Then, it will go to step 1022, where a new BLTH will be established for the light in the room, and the microcontroller will cycle back to step 1002, where a new cycle through algorithm 1000 will occur, using the new BLTH value.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications, all of which are incorporated by reference as if fully reproduced herein. The functions of any one element may be carried out in various ways in alternative embodiments. Also, the functions of several elements may, in alternative embodiments, be carried out by fewer, or a single, element.

The invention claimed is:

1. A system including optical sensor for controlling a flow valve of an electronic faucet or bathroom flusher, comprising
an optical element located at an optical input port and arranged to partially define a detection field having a selected size and orientation that eliminate invalid targets;
a light detector optically coupled to said optical element and said input port, said light detector being constructed to detect ambient light; and
a control circuit for controlling opening and closing of said flow valve, said control circuit being constructed to receive periodically signal from said light detector corresponding to the detected ambient light and to control said opening and closing by executing a detection algorithm employing detection of increases and decreases of said ambient light due to the presence of a user within said detection field for several time intervals and background levels of said ambient light.

2. The system of claim 1 wherein said control circuit is constructed to execute a calibration routine that accounts for size and orientation of said detection field by said optical element.

3. The system of claim 2 wherein said control circuit is constructed to sample periodically said detector based on the amount of previously detected light.

4. The system of claim 1 wherein said control circuit is constructed to open and close said flow valve based on first detecting arrival of a user and then detecting departure of said user.

5. The system of claim 1 wherein said control circuit is constructed to open and close said flow valve based on detecting presence of a user.

6. The system of claim 1 wherein said optical element includes an array of pinholes.

7. The system of claim 1 wherein said valve controls a bathroom flusher.

8. The system of claim 1 wherein said optical element is further constructed to provide said detection field angled below the horizontal (H).

9. The system of claim 1 wherein said optical element is further constructed to provide said detection field angled below the horizontal and symmetrically with respect to a toilet or urinal.

10. The system of claim 1 wherein said optical element is further constructed to provide said detection field angled below the horizontal and asymmetrically with respect to a toilet or urinal.

11. The system of claim 1 wherein said optical element is further constructed to provide said detection field angled above the horizontal (H).

12. The system of claim 1 wherein said light detector is constructed to detect light in the range of 400 to 1000 nanometers.

13. A method of controlling a flow valve of an electronic faucet or bathroom flusher using an optical sensor, comprising
providing an optical element located at an optical input port and arranged to partially define a detection field having a selected size and orientation that eliminate invalid targets;
providing a light detector optically coupled to said optical element and said input port,
detecting ambient light arriving at said light detector by periodically sampling said light detector;
providing a signal corresponding to said detected light from said light detector to a control circuit; and
controlling opening and closing of said flow valve using said control circuit and said signal corresponding to the detected ambient light, said controlling including executing a detection algorithm employing detection of increases and decreases of said ambient light due to the presence of a user within said detection field for several time intervals and background levels of said ambient light.

14. The method of controlling a valve according to claim 13 including and executing a calibration routine that accounts for size and orientation of said detection field by said optical element.

15. The method of controlling a valve according to claim 14 wherein said control circuit is constructed to constructed to perform said periodic sampling of said detector based on the amount of the amount of light previously detected.

16. The method of controlling a valve according to claim 13 including determining by said control circuit said opening and closing of said flow valve based on a background level of said ambient light and a present level of said ambient light.

17. The method of controlling a valve according to claim 13 wherein said control circuit is constructed to adjust a sample period based on the detected amount of light after determining whether a facility is in use.

18. The method of controlling a valve according to claim 13 wherein said control circuit is constructed to cycle sleep and measurement periods.

19. A sensor-based automatic flusher system, comprising:
a flusher body including a water conduit having at least one inlet for receiving water and at least one outlet for providing water to a toilet of a urinal;
an optical sensor constructed and arranged to generate sensor output signals corresponding to detected ambient light;
a control circuit arranged to control operation of said optical sensor and receive periodically from said optical sensor a signal corresponding to the detected ambient light; and
a main valve controlled by an actuator receiving control signals from said control circuit for switching between an open state of said valve and a closed state of said valve; said open state permitting water flow, and a closed state of said valve preventing fluid flow from said outlet, said control circuit being constructed to control said opening and closing by executing a detection algorithm employing increases and decreases of said ambient light due to presence of a user within a detection field of said optical sensor for several time intervals and based on background levels of said ambient light.

20. The sensor-based automatic flusher system of claim 19 wherein said control circuit is constructed to execute a calibration routine that accounts for size and orientation of said detection field by said optical element.

21. The sensor-based automatic flusher system of claim 20 wherein said control circuit is constructed to sample periodically said optical sensor based on the amount of previously detected light.

22. The sensor-based automatic flusher system of claim 19 wherein said control circuit is constructed to open and close said flow valve based on first detecting arrival of a user and then detecting departure of said user.

23. The sensor-based automatic flusher system of claim 19 wherein said control circuit is constructed to open and close said flow valve based on detecting presence of a user.

24. The sensor-based automatic flusher system of claim 19 wherein an optical element is further constructed to provide said detection field angled below the horizontal (H).

25. The sensor-based automatic flusher system of claim 19 wherein an optical element is further constructed to provide said detection field angled below the horizontal and symmetrically with respect to a toilet or urinal.

26. The sensor-based automatic flusher system of claim 19 wherein an optical element is further constructed to provide said detection field angled below the horizontal and asymmetrically with respect to a toilet or urinal.

27. The sensor-based automatic flusher system of claim 19 wherein an optical element is further constructed to provide said detection field angled above the horizontal (H).

28. The sensor-based automatic flusher system of claim 19 wherein said optical sensor is constructed to detect light in the range of 400 to 1000 nanometers.

* * * * *